United States Patent [19]
Kaufman et al.

[11] Patent Number: 6,070,805
[45] Date of Patent: Jun. 6, 2000

[54] DISTORTION RESISTANT DOUBLE-DATA CORRECTING COLOR TRANSITION BARCODE AND METHOD OF GENERATING AND USING SAME

[75] Inventors: Jeffrey R. Kaufman, Vernon Hills; Clive Hohberger, Gurnee, both of Ill.

[73] Assignee: Zebra Technologies Corporation, Vernon Hills, Ill.

[21] Appl. No.: 09/057,415

[22] Filed: Apr. 8, 1998

Related U.S. Application Data

[60] Provisional application No. 60/043,441, Apr. 8, 1997.

[51] Int. Cl.$^7$ ...................................................... G06K 7/10
[52] U.S. Cl. ...................... 235/494; 235/462.04; 235/469
[58] Field of Search ............................... 235/494, 462.04, 235/462.07, 462.1, 462.01, 469

[56] References Cited

U.S. PATENT DOCUMENTS

| | | |
|---|---|---|
| 3,663,801 | 5/1972 | Wahli et al. . |
| 4,251,798 | 2/1981 | Swartz et al. .......................... 235/462 |
| 4,283,622 | 8/1981 | Passer et al. ............................. 235/462 |
| 4,783,838 | 11/1988 | Matsunawa ................................ 382/51 |
| 4,856,820 | 8/1989 | Kasprzak et al. . |
| 4,924,078 | 5/1990 | Sant' Anselmo et al. .............. 235/494 |
| 5,153,928 | 10/1992 | Iizuka . |
| 5,311,001 | 5/1994 | Joseph et al. . |

*Primary Examiner*—Thien M. Le
*Attorney, Agent, or Firm*—Trexler, Bushnell, Giangiorgi & Blackstone, Ltd.

[57] ABSTRACT

A color barcode symbology is disclosed that can be accurately decoded despite severe distortions, misreads or altered symbols. This disclosed barcode is a color transition barcode having linear growth properties designed to resist the single or combined effects of: scaling distortions, perspective distortions, shear distortions, and wave distortions of both the uniform and non-uniform type distributed across the barcode's vertical or horizontal axis. This color barcode symbology is also resistant to missing symbols and altered symbols while offering, high security, error checking, and double error correcting capability.

40 Claims, 22 Drawing Sheets

(3 of 22 Drawing Sheet(s) Filed in Color)

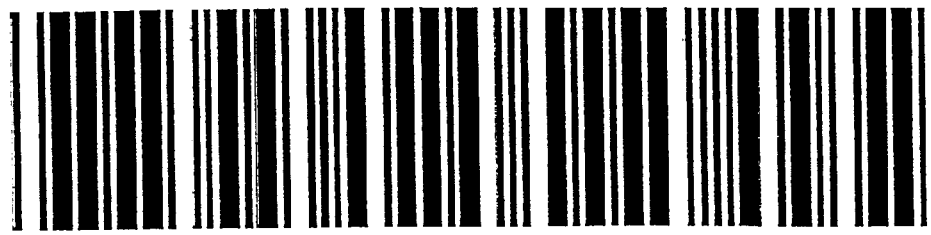
Prior art    Figure 1
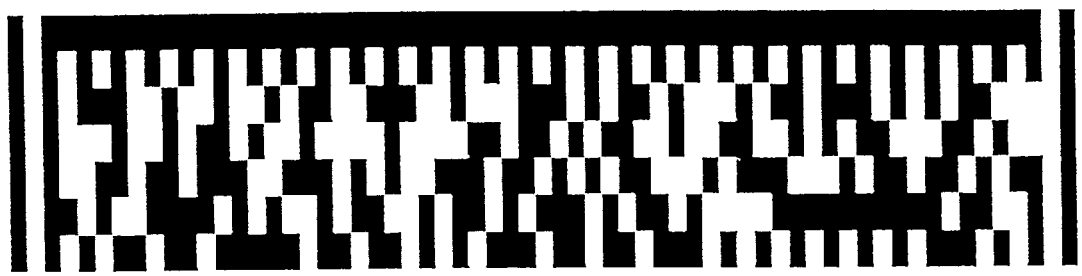
Prior art    Figure 2
Prior art    Figure 3

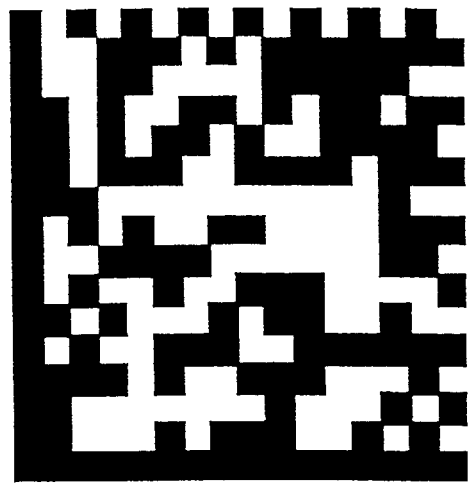
Prior art   Figure 4
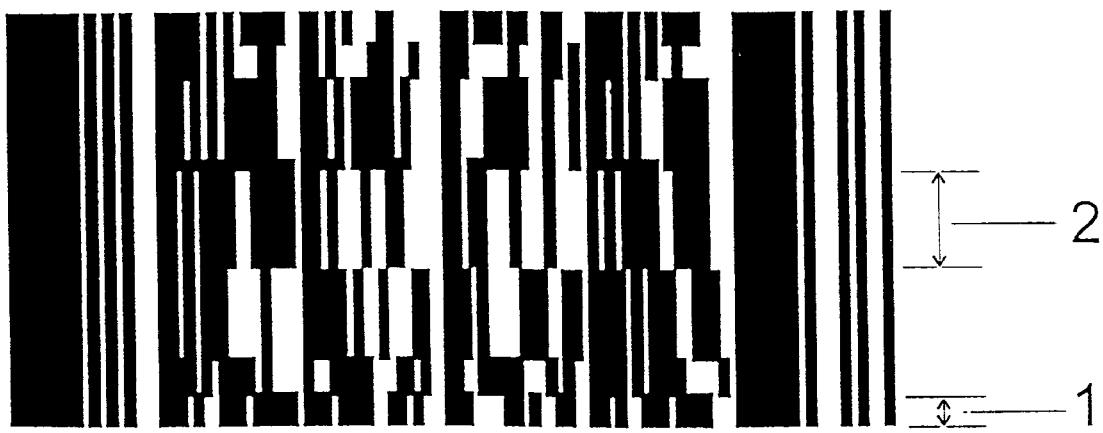
Prior art   Figure 5

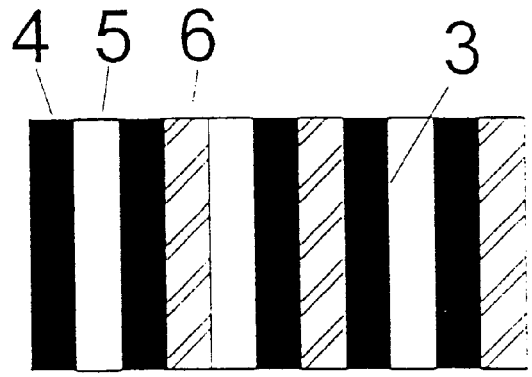
Prior art   Figure 6
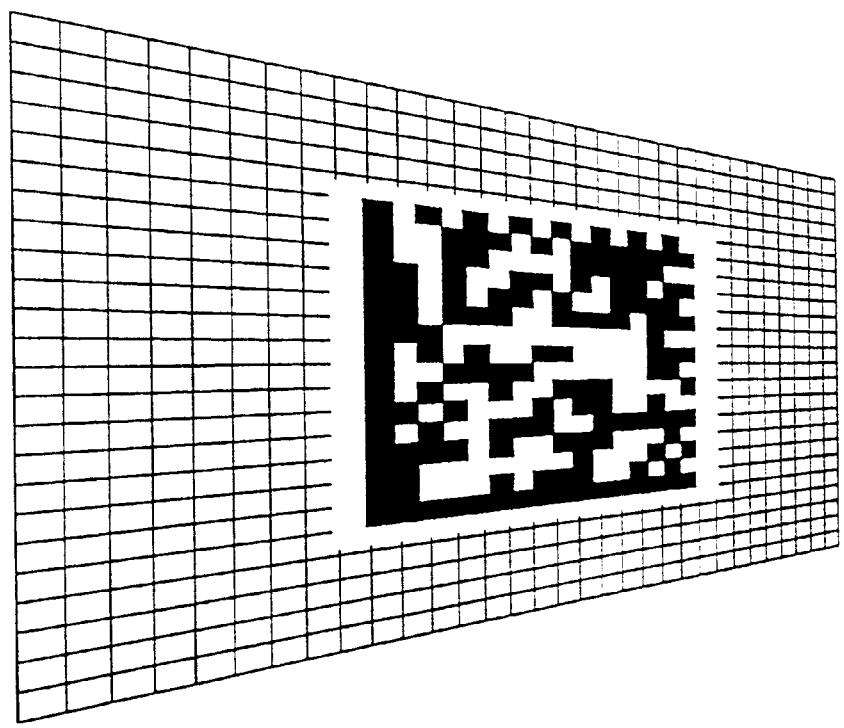
Figure 7

DISTORTION RESISTANT DOUBLE-DATA CORRECTING COLOR TRANSITION BARCODE AND METHOD OF GENERATING AND USING SAME

This application claims the priority of United States provisional application Ser. No. 60/043,441 filed on Apr. 8, 1997.

BACKGROUND OF THE INVENTION

The invention relates to a color barcode symbology that can be accurately decoded despite severe distortions, misreads or altered symbols. More particularly, the present invention relates to a color transition barcode having linear growth properties designed to resist the single or combined effects of: scaling distortions, perspective distortions, shear distortions and wave distortions of both the uniform type and non-uniform type distributed across the barcode's vertical or horizontal axis. The color barcode symbology of the present invention is also resistant to missing symbols and altered symbols while offering, high security, error checking, and double error correcting capability.

There are three major classification of barcodes: one-dimensional, two-dimensional, and transition codes.

One-dimensional codes are typically a linear array of elements that are either printed directly on an object or on labels that are affixed to the object. As shown in FIG. 1, barcode elements typically are comprised of parallel bars and spaces, with bars of varying widths representing strings binary ones and spaces of varying widths representing strings of binary zeros. The specific arrangement of elements defines the encoded data according to a set of rules and definitions specified by the specific type of encoding being used. The height of a one-dimensional barcode is the height of each of the parallel bars and spaces. As more information is encoded into the barcode, the barcode width changes and the barcode height stays constant. A barcode exhibiting these growth characteristics is referred to as having linear growth properties.

As noted above, the parallel bars and spaces of one-dimensional barcodes have varying widths. Generally, the bars and spaces can be no smaller than a specified minimum width termed the barcode's "x dimension". While the theoretical minimum "x dimension" size is the wavelength of the light being used to read the barcode, other practical limitations exist. Among these limitations are the desired depth of field of the reading equipment, the limitations of a given printing process and the robustness of the printed image to be correctly read despite dust, dirt, and minor physical damage. The relative size of the bars and spaces is determined by the type of coding use. The number of characters per unit length represented by the barcode symbol is referred to as the density of the symbol.

To encode a desired sequence of characters, a collection of element arrangements are concatenated together to form the complete barcode symbol, with each character of the message being represented by its own corresponding group of elements. In some symbologies, a "start" and "stop" character is used to indicate where the barcode begins and ends. A limitation of barcodes that use start and stop patterns is that these patterns take up wasted space because they are not used to encode any data.

Because most one-dimensional codes can get unusably long as lengthy data strings are encoded, most one-dimensional barcodes contain only five or six letters or digits. In view of the relatively small amount of data contained in a typical one-dimensional barcode, the most typical applications of a one-dimensional barcode is to use the encoded data merely as an index to a file or data base associated with the computer system where more comprehensive information is available. A number of different one-dimensional barcode symbologies exist including UPC/EAN, Coder 39, Code 93, Code 128, and Interleaved 2 of 5.

There are multiple variations of two-dimensional barcodes that currently exist. As for one-dimensional codes, two-dimensional codes can either printed directly on an object or on labels that are affixed to the object. One such two-dimensional barcode variation is an extension of a one-dimensional barcode in that one-dimensional barcodes are stacked with horizontal guard bars between them to increase the density. An example of such a barcode is shown in U.S. Pat. No. 4,794,239 to Allais. Other two-dimensional codes do not require a guard bar.

An example of a barcode not requiring a guard bar can be seen in U.S. Pat. No. 5,304,786 to Pavlidis et al and is referred to as PDF417 and is shown in FIG. 3. The '786 patent eliminates the use of guard bars by having data values (codewords) in alternating rows being selected from mutually exclusive subsets of bar and space patterns. The subsets are defined in terms of particular values of discriminator function which is a function of the bar and space pattern in a given codeword. Alternating rows of bar and space patterns selected from mutually exclusive subsets of bar and space patterns allows the scanner to recognize whether a scan line has crossed a row in the middle of a codeword, because if a row has been crossed, the codewords scanned will not yield the same discriminator value as the previous row.

A limitation of two-dimensional barcodes which are comprised of a plurality of stacked one-dimensional codes is that they are sensitive to printing variations. This limitation occurs because the relative widths of the bars and spaces determine the data encoded in the barcode and any variation thereof will cause data errors to be incurred when scanning. The '786 patent also discloses the broad concept of using codewords of different colors in alternate rows. That is, all rows of a multi-row label could use the same subset of bar and space patterns as codewords, but in different colors; the determination whether a row has been crossed would be made based on whether a color change had occurred.

Another type of two-dimensional barcode that exists is one containing a matrix of cells. The matrix has a respective width and height. DATA CODE is an example of this type of barcode and is shown in FIG. 4. These types of codes currently are formed under an invisible square grid. Cells under the grid are selectively darkened to be read by an optical scanning device. Decoding two-dimensional barcodes composed out of a matrix of cells is performed by laying down an imaginary grid over the matrix of cells and sampling over each grid center to determine if each cell is darkened or not darkened. Depending on the specification for the code, certain combinations of cells being darkened and other cells not being darkened can be translated by the optical scanning device into numeric or character data depending on the specification for the barcode.

Most two-dimensional barcodes are capable of storing much more information than one-dimensional barcodes as described in the '786 patent. The size of two-dimensional barcodes containing a matrix of cells is proportional to the amount of data being stored in the barcode. Most two-dimensional barcodes containing a matrix of cells have an equal width and height but that is not always a requirement.

Other two-dimensional barcodes which are comprised of stacked one-dimensional barcodes generally do not keep their width and height constant. In the case of PDF417, the height of each stacked linear barcode is allowed to variably change at each linear row as shown in FIG. 5 where rows 1 and 2 are of different heights.

Transition barcodes encode information by inserting transition indicia between adjacent barcode elements. One such transition code is shown in FIG. 2. This barcode is a one-dimensional barcode symbology in which solid bars and spaces of specified widths are replaced by cell columns of no required width. The barcode contains a plurality of cell column combinations that are concatenated together to form the complete barcode symbol, with each character of the message being represented by its own corresponding group of cell columns. The barcode uses "start" and "stop" characters to indicate where the barcode begins and ends. Only certain cell column combinations are chosen to form the complete barcode symbol. The cell column pattern chosen to represent a data value is dependent on the cell column pattern of the previous cell column to guarantee that enough change between adjoining cell columns is present. The change between adjacent cell columns is a form of transition indicia. Because the barcode is guaranteed on having a certain amount of change between each adjoining cell column, this type of barcode can be scanned by a barcode scanner having a variable scanning rate without using an additional clock track on the barcode or a positional encoder on the barcode scanner. This can be accomplished because the change between each adjacent cell column is used to signal that the cell column has been traversed. Because of this, the barcode symbology is fairly robust against distortions caused by low quality printing process, direct marking processes and hand-held scanning with linear CCD barcode scanners as will be discussed hereinafter.

The barcode symbology of FIG. 2 can also be viewed as a two-dimensional symbology formed as a matrix of cells. As additional data is encoded in the barcode, the barcode grows in a linear direction and the height of the barcode does not change unless subjected to a printing or scanning anomaly. The barcode symbology of FIG. 2 can additionally be viewed as a sparse matrix symbology where there is guaranteed absence of cells in the symbology depending on the data being encoded. This absence of cells coupled with the data encoding specification for the barcode is a form of transition indicia and aids in distortion resistance.

Another type of transition code can be found in U.S. Pat. No. 3,637,993 to Christie et al and is shown in FIG. 6. The '993 patent discloses a linear barcode comprised of a plurality of contiguous colored bars, where each colored bar is of a color different from the color of its neighboring color bars. FIG. 6 shows an embodiment of this prior art barcode having three different colored bars 4, 5 and 6. The color change between adjacent colored bars is a form of transition indicia. Like the barcode of FIG. 2, this type of barcode can be scanned by a barcode scanner having a variable scanning rate without using an additional clock track on the barcode or a positional encoder on the barcode scanner. This barcode has the advantage of being distortion resistant and is approximately half the size of a similar color barcode having an integrated clock track. However, because the barcode is linear, the data encoding capacity of the barcode is limited and the barcode does not contain any means for error detection and correction as described next.

To resist against damage, one-dimensional, two-dimensional, and transition codes can contain error detection and error correction check-digits. One well known method for performing error detection and error correction is to use Reed-Soloman encoding and decoding and is described in U.S. Pat. No. 5,479,515 to Longacre Jr. Some linear barcodes and most two-dimensional barcodes and transition barcodes use Reed-Soloman encoding.

Reed-Soloman encoding requires the use of check-digits to be appended to the data portion of the barcode symbology. If a group of barcode elements (cells or bar and space patterns) in any type of barcode symbology that forms a single data value is damaged, error detection and correction check-digits will detect the error and correct the error. This is referred to as single or level error correction. The number of errors that can be corrected is proportional to the number of check-digits present in the symbology. Often times, additional check-digits are used to diminish the possibility of misdecodes. These additional check-digits can either be additional Reed-Soloman check-digits or Cyclic Redundancy Check digits.

In existing two-dimensional matrix type barcodes and transition barcodes, a grouping of cells is generally used to represent one data value. Traditionally, if one cell out of that group of cells is damaged, the data value assigned to that group of cells cannot be determined. As previously discussed, however, the data value associated with that group of cells can be detected and corrected by the error detection and correction check-digits.

It is a continuous goal to improve the error correction capability of any barcode symbology. To the inventors' knowledge, single level error correction has only been done. The present invention improves data correcting capability by creating cell groups that are either self-correcting or yield a restricted set of possible solutions in absence of any error correcting or error detecting digits. This type of error correction system of the present invention is defined to be double level error correction.

Distortions common among printing and hand-held scanning devices include wave, shear, scale and perspective and combinations thereof. Any of these distortions can be oriented in the horizontal or vertical direction and be uniform or non-uniform in nature. A consistent three word naming system is used to classify distortion types. The first term explains the consistency of the code and is always uniform or non-uniform. The second term describes the major axis or the distortion and is always either horizontal or vertical. The final term describes the distortion type and is either wave, shear, scale or perspective. For example, codes could be named uniform vertical wave, or non-uniform horizontal shear. This allows a consistent language to describe the distortions, and nearly any imaginable mutation of a barcode can be described by the composition of one or more of these distortion types. Non-uniform distortions simply indicate that a distortion is not consistent across the major axis listed in the distortion naming description.

A first type of distortion is perspective distortion or sometimes referred to as a projection distortion. Perspective distortion is generally caused by an artifact in the scanning system where the imaging plane of the scanner is not placed parallel to the image plane of the barcode being scanned. Perspective distortion can either be uniform or non-uniform in nature. Uniform perspective distortion can be horizontal or vertical as shown in FIGS. 7 and 8, respectively. An example of non-uniform horizontal and vertical perspective distortion is shown in FIGS. 26 and 27, respectively.

Existing one-dimensional barcode symbologies can be difficult to decode under uniform perspective distortions because the relative spacing of bars and spaces is not preserved as shown in FIG. 13. The exception to this is when CCD two-dimensional scanners are used where the magnitude of perspective distortion can be calculated and the perspectively distorted scanned image can then be corrected. When decoding two-dimensional matrix symbologies, a grid is constructed over the symbology as described previously except the grid is uniformly scaled to fit over the perspectively distorted image. Unfortunately, this process is computationally intensive, requires extensive computer processing power, and takes time to perform. Transition symbologies, like the barcode of FIG. 2, can generally be easily decoded under uniform perspective distortions but, at times, require some processing to determine the extent and parameters of the perspective distortion. Transition barcodes as disclosed in the '993 patent are not affected by perspective distortions.

A second type of distortion is scaling distortion. Scaling distortions can be caused by errors in the printing system or caused by artifacts in the scanning system. Scaling distortions can uniformly occur over both the horizontal and vertical axis as shown in FIGS. 9 and 10, respectively, and can be non-uniformly distributed over the horizontal and vertical axis as shown in FIGS. 11 and 12, respectively.

Most linear barcode symbologies are not affected by uniform scaling distortions because the relative size of the bars and spaces remain constant. However, some linear barcode symbologies, like UPC, require that the barcode be of a specific length. Uniform horizontal scaling distortions would cause the overall linear barcode length to shrink or expand rendering a barcode, like the UPC symbology, to be out of tolerance and, likewise, unscannable. Two-dimensional barcode symbologies are not affected by uniform horizontal or vertical scaling distortions unless the distortions causes the element sizes or the aspect ratio of the code to exceed the maximum specified for that specific barcode symbology. Because all transition codes in the '993 patent have no aspect ratio requirements or element size restrictions, they are not rendered unscannable under uniform horizontal or vertical scaling distortions.

Linear barcode symbologies are not affected by non-uniform vertical scaling distortions as the appearance of the bars and spaces would not change. However, non-uniform horizontal scaling distortions are disastrous to linear barcode symbologies as the relative sizes of the bars and spaces will change rendering the barcode unreadable as shown in FIG. 14. The exception to this are linear barcodes having clock tracks formed within, such as the barcode known as Postnet. These types of linear barcodes can be non-uniformly horizontally distorted and still be scanable.

As for linear barcode symbologies, linear stacked two-dimensional symbologies are most affected by non-uniform horizontal scaling distortions as the relative sizes of the bars and spaces will change causing the barcode to be unscannable.

Generally, two-dimensional matrix symbologies are more tolerant of non-uniform scaling distortions across any major axis. Decoding two-dimensional matrix symbologies having non-uniform horizontal or vertical scaling distortions requires that an imaginary grid be non-uniformly distorted in the same fashion as the distorted barcode and placed over the distorted barcode. Forming a non-uniformly distorted imaginary grid is difficult to do in absence of any indicia on the barcode to indicate how the barcode is non-uniformly distorted. Clock tracks are often added to two-dimensional matrix symbologies to aid in forming this imaginary grid but with any major scaling distortions will still render these codes unscannable. In addition, mathematically forming a non-uniformly distorted imaginary grid is time consuming and requires a substantial amount of computing capability.

All existing transition codes are highly resistant to all types of non-uniform horizontal and vertical scaling distortions because varying element widths and heights does not affect the decodability of the code as a result of the presence of transition indica inherent in the symbology. Examples of the transition code of FIG. 2 being subjected to non-uniform horizontal and vertical scaling distortion may be found in FIGS. 15 and 16, respectively.

A third type of distortion is shear distortion. This type of distortion is often caused by the elements of a printhead not being exactly perpendicular to the direction of movement of the substrate being marked. Shear distortion can be created as an artifact of the scanning apparatus. For example, FIG. 25 shows a hand-held, one-dimensional scanning apparatus 7 scanning a non-distorted barcode 8 on a piece of paper. The scanning apparatus 7 will view the barcode 8 as having a shear distortion if axis 9 of the scanning elements of the scanning apparatus 7 is not perpendicular to the major axis 10 of the barcode 8 being scanned.

FIG. 17 shows an example of uniform horizontal shear distortion and FIG. 18 shows an example of uniform vertical shear distortion. All barcode types are generally resistant to mild forms of uniform shear distortion. However, excessive amounts of this distortion will render most existing barcode symbologies unscannable except the color transition code disclosed in the '993 patent. Scanning under severe shear distortions becomes difficult because bar and space widths become difficult to determine in linear and stacked two-dimensional symbologies and element locations in two-dimensional matrix symbologies also become difficult to determine without extensive processing. Transition codes, such as the barcode of FIG. 2, are more tolerant of uniform shear distortions but they can become very difficult to decode under severe shear distortions because the transition point of each cell column becomes difficult to determine. The color transition barcode disclosed in the '993 patent is not affected by uniform shear distortions because the intersection angle between each adjoining colored bar changes but does not affect scanability.

Non-uniform horizontal and vertical shear distortions as shown in FIGS. 19 and 20, respectively, are disastrous for all existing types of barcodes because the positions and relative spacing of the elements of these barcodes cannot be reliably determined. There are two exceptions however. The color transition barcode disclosed in the '993 patent is not affected by non-uniform shear distortions because the intersection angle between each adjoining colored bar changes but does not affect scanability. The transition code of FIG. 2 is resistant to small amounts of this type of non-uniform shear distortion but excessive amounts of this distortion type will render this barcode unscannable because the transition point of each cell column becomes impossible to determine.

Referring again to FIG. 25, non-uniform horizontal and vertical shear distortions are most commonly caused by artifacts of the scanning process when the longitudinal axis 9 of the scanning elements of the hand-held barcode scanner 7 variably change in relationship to the major axis 10 of the barcode 8 being scanned. This can occur when the hand-held barcode scanner 7 is rotated around its longitudinal axis 11 as the barcode 8 is being scanned.

The last type of barcode distortion is wave distortion. Wave distortion can occur over the horizontal or vertical axis of a barcode and can be both uniform and non-uniform in type. Wave, in the context of this disclosure, implies a disturbance or oscillation between two points across the barcode in the direction parallel to the major axis of distortion. The disturbance or oscillation can be any type, such as sinusoidal, triangle, square, or saw. FIGS. 21 and 22, show examples of both uniform horizontal and vertical distortions having a sinusoidal waveform type. One characteristic attribute of uniform wave distortion is that the wave type is the same magnitude and phase on each end of the barcode. Non-uniform horizontal and vertical wave distortions shown in FIGS. 23 and 24, respectively, do not have the same magnitude and phase on each opposing end of the barcode.

Wave distortions can occur during the printing process where the object being marked moves relative to the printing apparatus. Wave distortions can be caused by an artifact of the scanning system. Referring again to FIG. 25, ideally, the barcode scanner 7 should not move along axis 12 of barcode 8 and only travel along the major axis 10 of barcode 8. Uniform wave distortions will be created if the hand-held scanner 7 begins to oscillate along axis 12 as the barcode is being scanned along axis 10.

Linear barcodes are very tolerant of uniform horizontal wave distortions. However, they are not very tolerant of uniform vertical wave distortions because a scanner may perceive improper bar and space widths if the barcode scanner is not scanning exactly parallel to the axis of the barcode being scanned.

Two-dimensional barcodes are not tolerant of any type of wave distortion as attempting to compute an imaginary grid over the barcode symbology to decode it is time consuming, requires a substantial amount of computing power and may be impossible without the aid of any suitable indicia from the barcode symbology indicating how the barcode is wave distorted. Barcode finder patterns and clock tracks help but under any substantial wave distortion, these indicia are generally not sufficient.

Transition codes, such as the barcode of FIG. 2, are extremely tolerant of uniform horizontal wave distortion. However, transition indica becomes lost under the remaining types of wave distortions and, likewise, the barcode of FIG. 2 becomes increasingly difficult to decode under these types of distortions. The color transition code disclosed in the '993 patent and shown in FIG. 6, would be resistant to any type of uniform or non-uniform wave distortion because no transition indicia is lost under any type of wave distortion.

A propagation error in a barcode symbology occurs when an error in one element of the barcode propagates to the next or preceding element of the barcode. Therefore, one error becomes two or more errors. This phenomenon generally is caused by elements values of a barcode symbology being dependent on the value or structure of an adjacent element. The barcode of FIG. 2 is one example of a barcode symbology that is subject to propagation errors.

Propagation errors can also occur in color barcodes. U.S. Pat. No. 5,576,528 to Chew et al. describes a method for increasing information density of a barcode symbology by generating multiple constituent barcode symbols where each symbol is formed in a different color selected from a group of various primary colors. Each colored symbol is then overlaid on top of each other thus forming an aggregate barcode symbol of various colors. In areas where the differently colored bars overlap each other, colors distinct from those in the original group of colors are formed. Using a reverse process, each individual barcode can then be separated and individually processed.

Although this encoding method increases information density, robustness of the aggregate barcode symbology decreases as a result of propagation error phenomenon. This occurs because an error or color change in one element of the barcode may, under most circumstances, prevent the remaining color layers of the barcode from being determined.

The only barcode symbology that exhibits extraordinary resistance to all types of damage and distortions and is not subject to propagation errors is the color transition barcode disclosed in the '993 patent. This barcode, however, is limited in its data capacity, does not contain a space efficient data encoding method, and does not contain any means for error correction and detection.

Distortion and damage resistance is very important in barcode symbologies when using hand-held printers and hand-held scanners because the human hand tends to be unsteady which can cause variations in the printing and scanning processes. A barcode having inherent distortion resistance is easier and quicker to scan with area and linear barcode scanning devices.

Damage and distortion resistance is also important when low quality printing processes are used, such as industrial ink-jet marking machines. Providing high quality marking and scanning machines is expensive and unnecessary if the barcode symbology being used is highly distortion resistant and contains a substantial amount of error detection and correction means. Distortion resistance is also important for most types of scanning applications because artifacts of the scanning system can cause the barcode to appear distorted.

With inexpensive color printing and scanning means becoming more prevalent, using color information in a barcode symbology is not unreasonable and quite desirable because color information, when used properly, aids in damage and distortion resistance while increasing the informational density of the barcode. Color is also eye appealing and desirable for marking consumer goods.

For the foregoing reasons, there is a need for a color transition barcode symbology that is resistant to the effects of all types of damage and distortions discussed hereinabove coupled with a space-efficient data encoding structure, and double error correction capability.

OBJECTS AND SUMMARY OF THE INVENTION

An object of the present invention to provide a color barcode symbology where the relative sizes of its elements is not critical, thereby rendering the barcode resistant to any type of distortion or combinations thereof discussed hereinabove.

Another object of the present invention to provide a color transition barcode symbology that can be decoded using a simple decoding algorithm without determining the type and magnitude of its distortion.

Yet another object of the present invention to provide a color transition barcode symbology that can be scanned by an area imager or a linear imager with and without positional feedback.

A further object of the present invention to provide a color transition barcode symbology that does not require start and stop patterns.

An even further object of the present invention to provide a color transition barcode symbology that incorporates a space efficient data encoding system.

Another object of the present invention to provide a color transition barcode symbology that can be printed at very high and low densities.

Yet another object of the present invention to provide a color transition barcode symbology that has double error correction capabilities.

An even further object of the present invention to provide a color transition barcode symbology that does not exhibit propagation error phenomenon.

Briefly, and in accordance with the foregoing, the present invention is directed to a color transition barcode symbology that satisfies the need for a barcode symbology that is resistant to the effects of all types of damage and distortions discussed previously, coupled with a space-efficient data encoding structure and double error correction capability.

A color transition barcode symbology having features of the present invention comprises a plurality of values that can be concatenated together according to a set of rules and definitions for encoding data. To represent each of these values, a plurality of mutually exclusive color sets is formed. A plurality of color cells is then created, each having a color chosen from any of the available colors contained in any of the color sets.

A plurality of unique color cell groups are then formed where each color cell group comprises a plurality of color cells chosen from the same color set. Each color cell group can then be referred to as have been formed from one of the available color sets. Each color cell in each color cell group is always bounded by a color cell of another color from the same color set creating a first form of transition indicia.

Each data value that the barcode symbology can encode is correlated to two or more color cell groups formed from different sets. As the barcode symbology is formed, each color cell group is bounded by a color cell group formed from a different color set creating a second form of transition indicia. To form a completed symbology, each data value to be concatenated together for encoding information is selected from one of the two or more color cell groups chosen to represent that data value. The actual color set of the color cell group chosen to represent that value depends on the color sets of the cell groups that will be bounding it in the barcode symbology so that two color cell groups from the same color set are never contiguous. A finder pattern is then constructed around the cell groups used to encode the data.

The combinations of cell elements forming color cell groups are strategically chosen to be able to unambiguously correct or minimize the number of possibilities the damaged color cell group could contain. When attempting to decode this barcode, the first process of attempting to correct each color cell group is performed before the second error correction process requiring check-digits is initiated. This process is, therefore, a form of double error correction which increases the error correction capability of this barcode symbology and further increases the barcode's resistance to damage and distortions by increasing the efficiency of the Reed-Soloman error correction algorithms. Also, because each color cell group represents a value directly, propagation phenomenon is not present.

The values for each of the check-digits are represented by a group of color cell groups that are exclusive from the group of color cell groups used to represent the encoded data. This eliminates the use of start and stop patterns in the barcode symbology because check-digits can be placed at the end of the barcode and data at the beginning of the barcode, thereby, inherently identifying the starting point and ending point of the barcode symbology.

These and other features, aspects, and advantages of the present invention will become better understood with regard to the following description, appended claims and accompanying drawings.

BRIEF DESCRIPTION OF THE DRAWINGS AND APPENDICES

The file of this patent contains at least one drawing executed in color. Copies of this patent with color drawing(s) will be provided by the Patent Office upon request and payment of necessary fee.

The organization and manner of the structure and operation of the invention, together with further objects and advantages thereof, may best be understood by reference to the following description, taken in connection with the accompanying drawings, wherein like reference numerals identify like elements in which:

FIG. 1 illustrates a prior art linear barcode symbology;

FIG. 2 illustrates a prior art transition barcode symbology;

FIG. 3 illustrates a prior art PDF417 barcode symbology;

FIG. 4 illustrates a prior art DATA CODE two-dimensional barcode symbology;

FIG. 5 illustrates a prior art PDF417 barcode symbology having been subjected to non-uniform vertical scaling distortion;

FIG. 6 illustrates a prior art color transition barcode symbology;

FIG. 7 illustrates a two-dimensional barcode symbology having been subjected to uniform horizontal perspective distortion;

Figure 8:
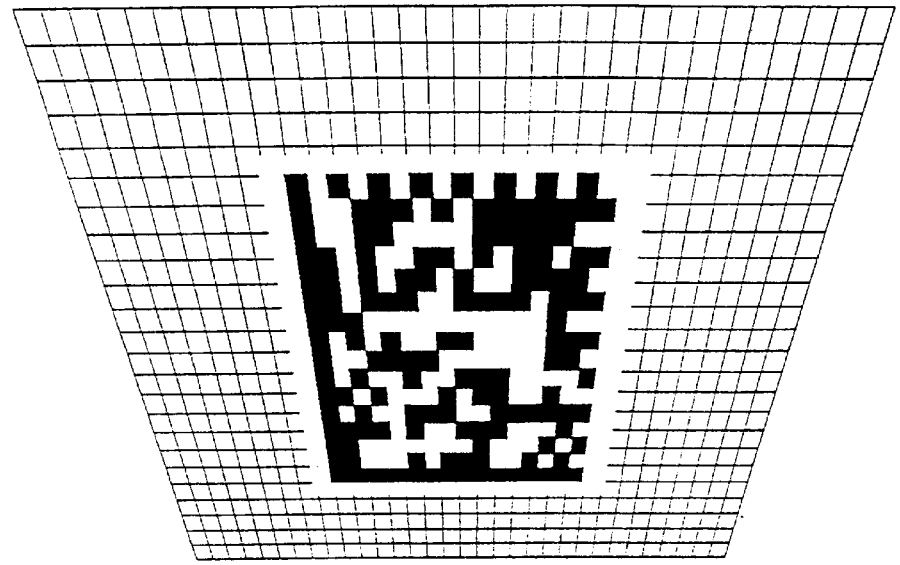
FIG. 8 illustrates a two-dimensional barcode symbology having been subjected to uniform vertical perspective distortion.
Figure 9:
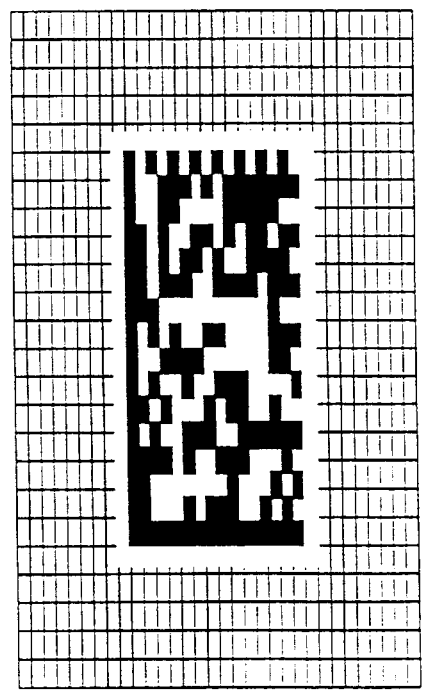
FIG. 9 illustrates a two-dimensional barcode symbology having been subjected to uniform horizontal scaling distortion.
Figure 10:
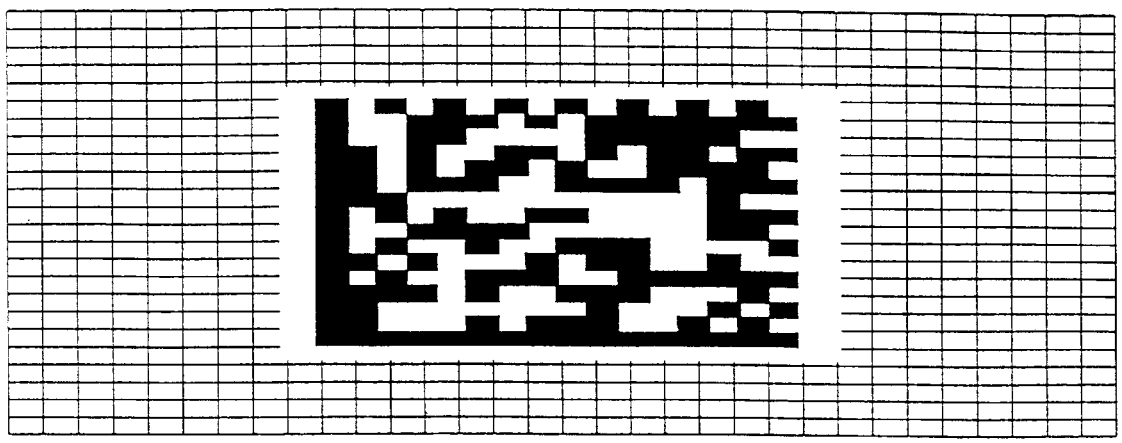
FIG. 10 illustrates a two-dimensional barcode symbology having been subjected to uniform vertical scaling distortion.
Figure 11:
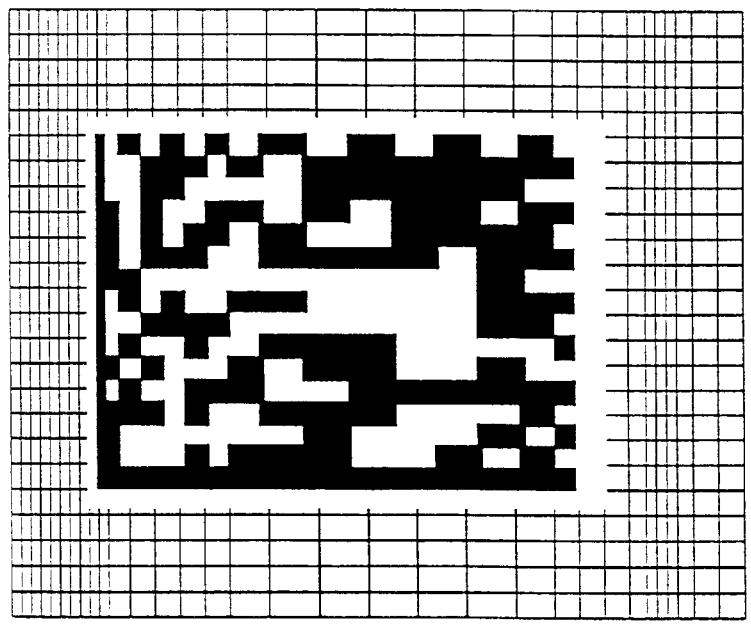
FIG. 11 illustrates a two-dimensional barcode symbology having been subjected to non-uniform horizontal scaling distortion.
Figure 12:
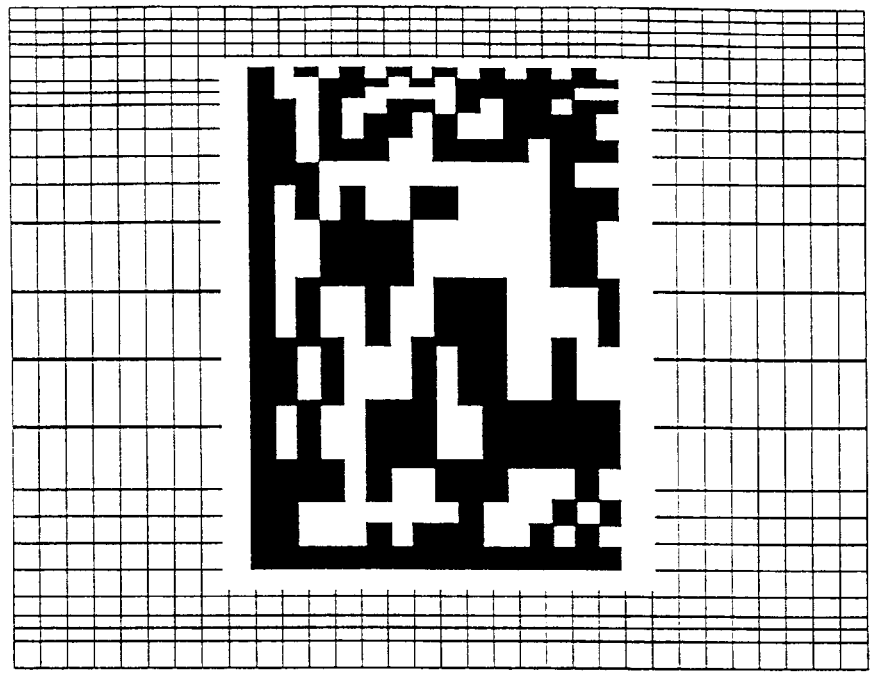
FIG. 12 illustrates a two-dimensional barcode symbology having been subjected to non-uniform vertical scaling distortion.
Figure 13:
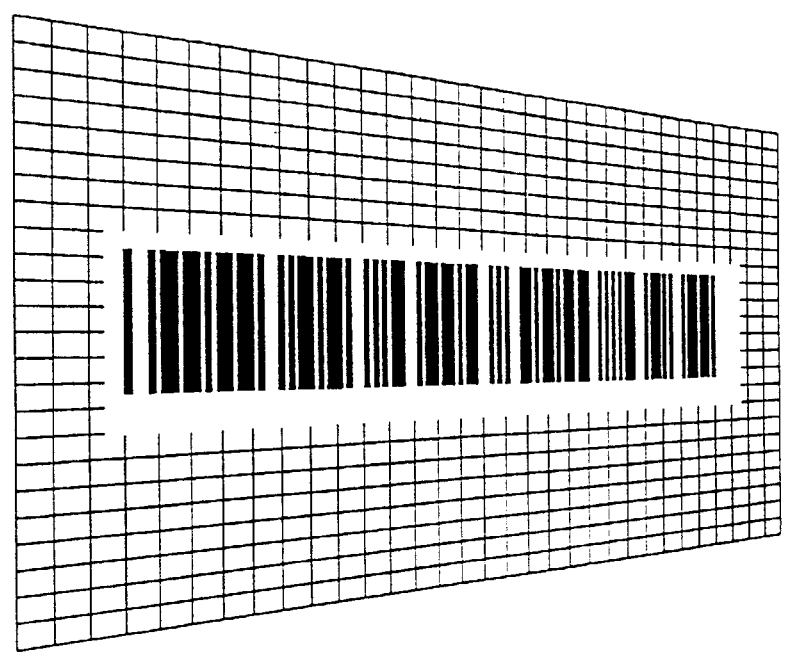
FIG. 13 illustrates a linear barcode symbology having been subjected to uniform horizontal perspective distortion.
Figure 14:
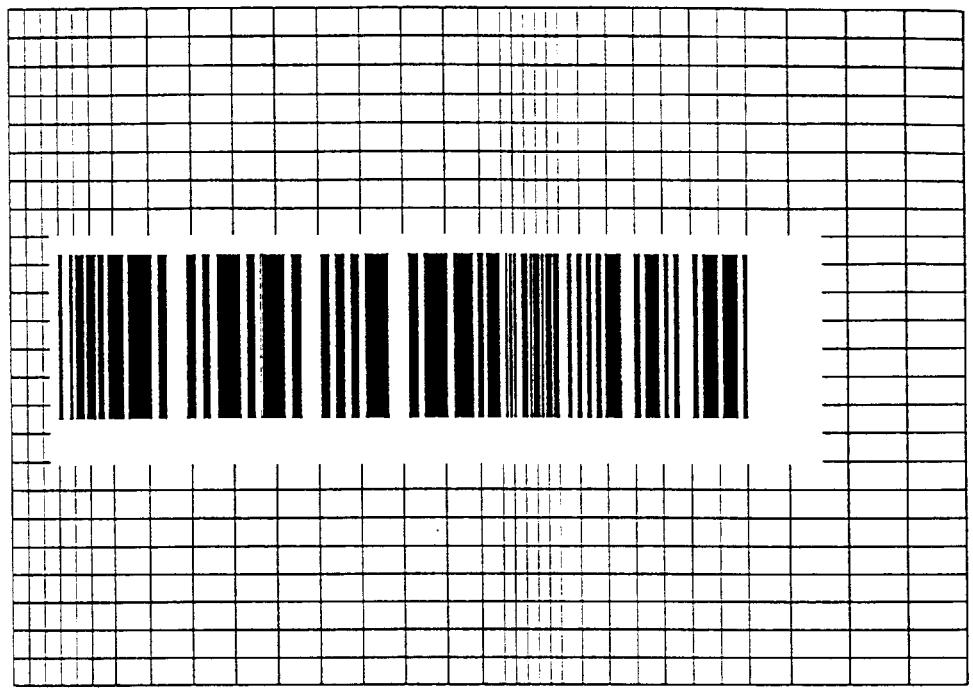
FIG. 14 illustrates a linear barcode symbology having been subjected to non-uniform horizontal scaling distortion.
Figure 15:
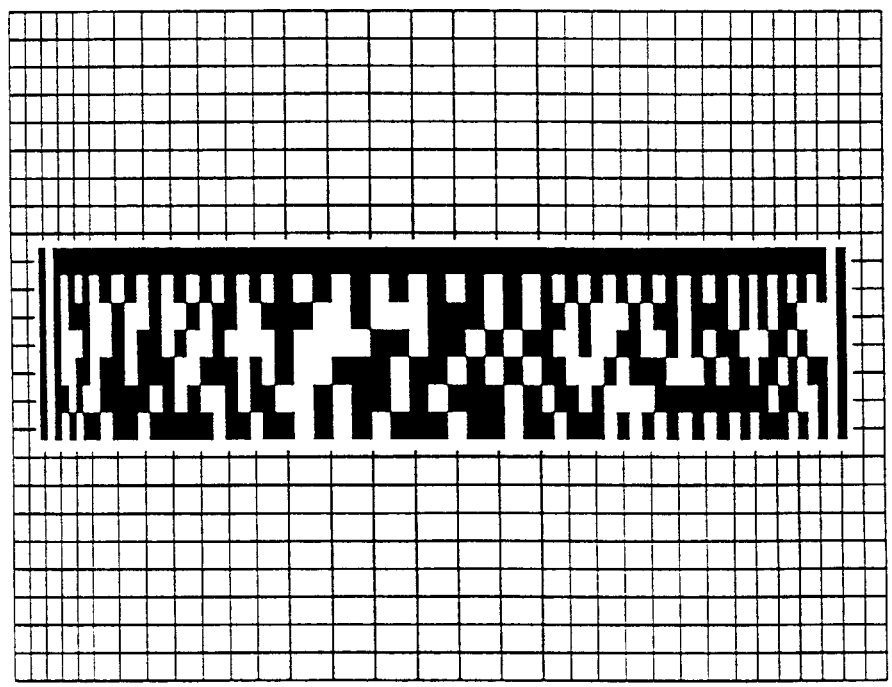
FIG. 15 illustrates a transition barcode symbology having been subjected to non-uniform horizontal scaling distortion.
Figure 16:
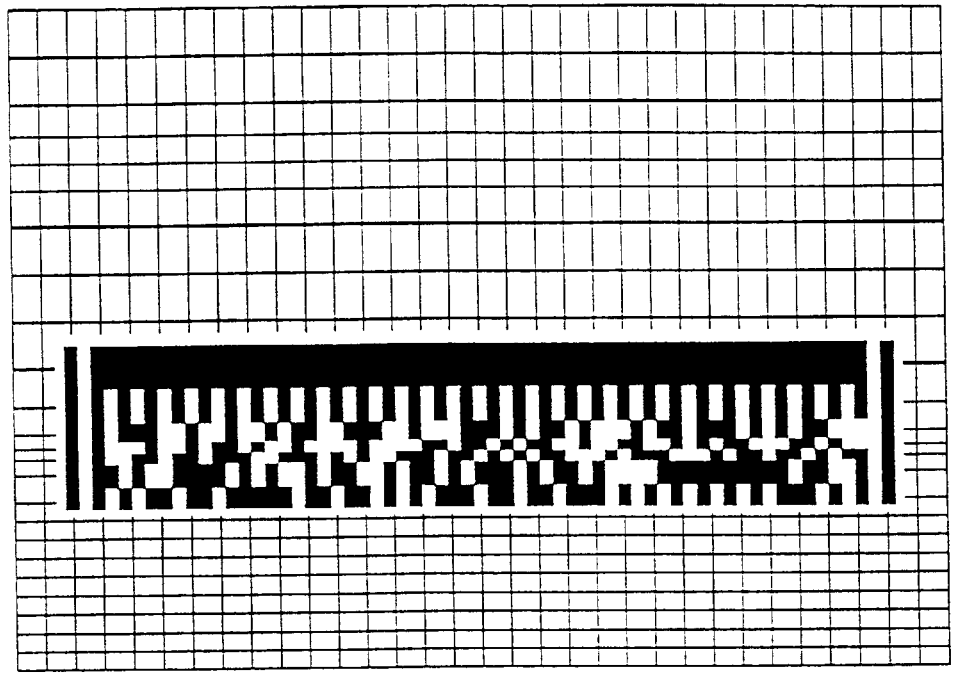
FIG. 16 illustrates a transition barcode symbology having been subjected to non-uniform vertical scaling distortion.
Figure 17:
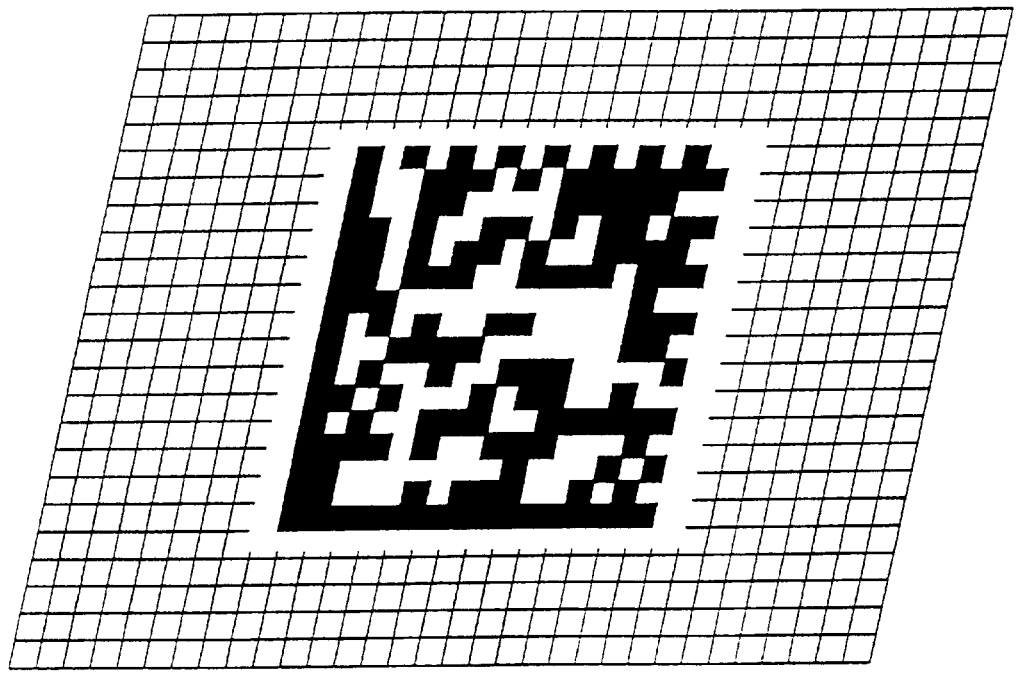
FIG. 17 illustrates a two-dimensional barcode symbology having been subjected to uniform horizontal shear distortion.
Figure 18:
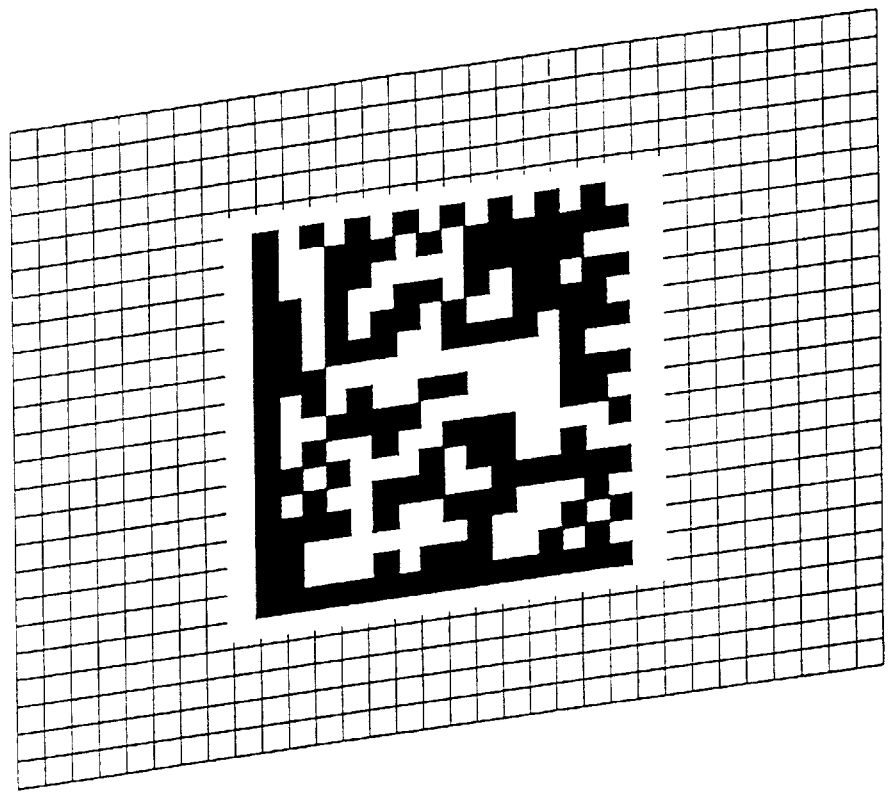
FIG. 18 illustrates a two-dimensional barcode symbology having been subjected to uniform vertical shear distortion.
Figure 19:
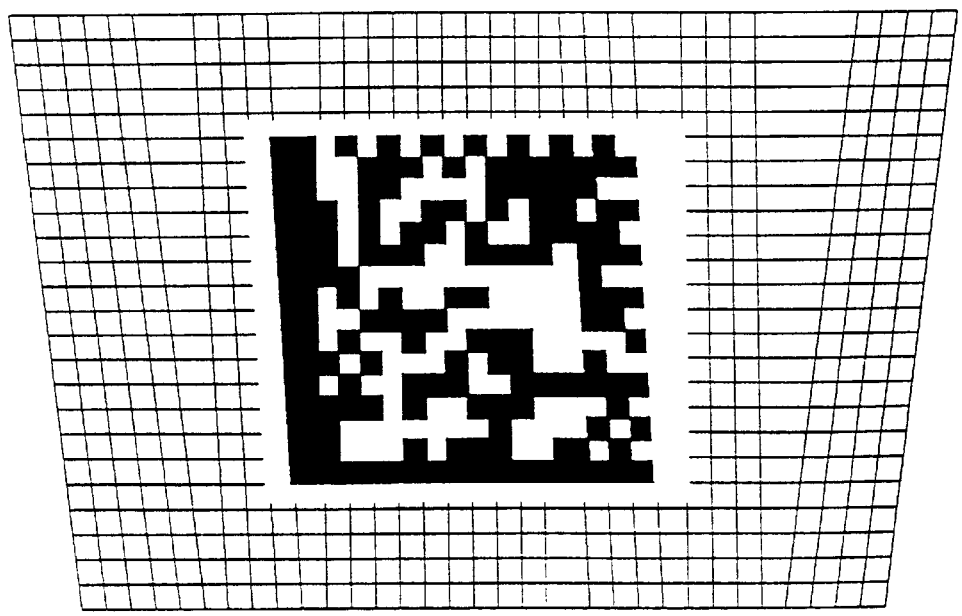
FIG. 19 illustrates a two-dimensional barcode symbology having been subjected to a non-uniform horizontal shear distortion.
Figure 20:
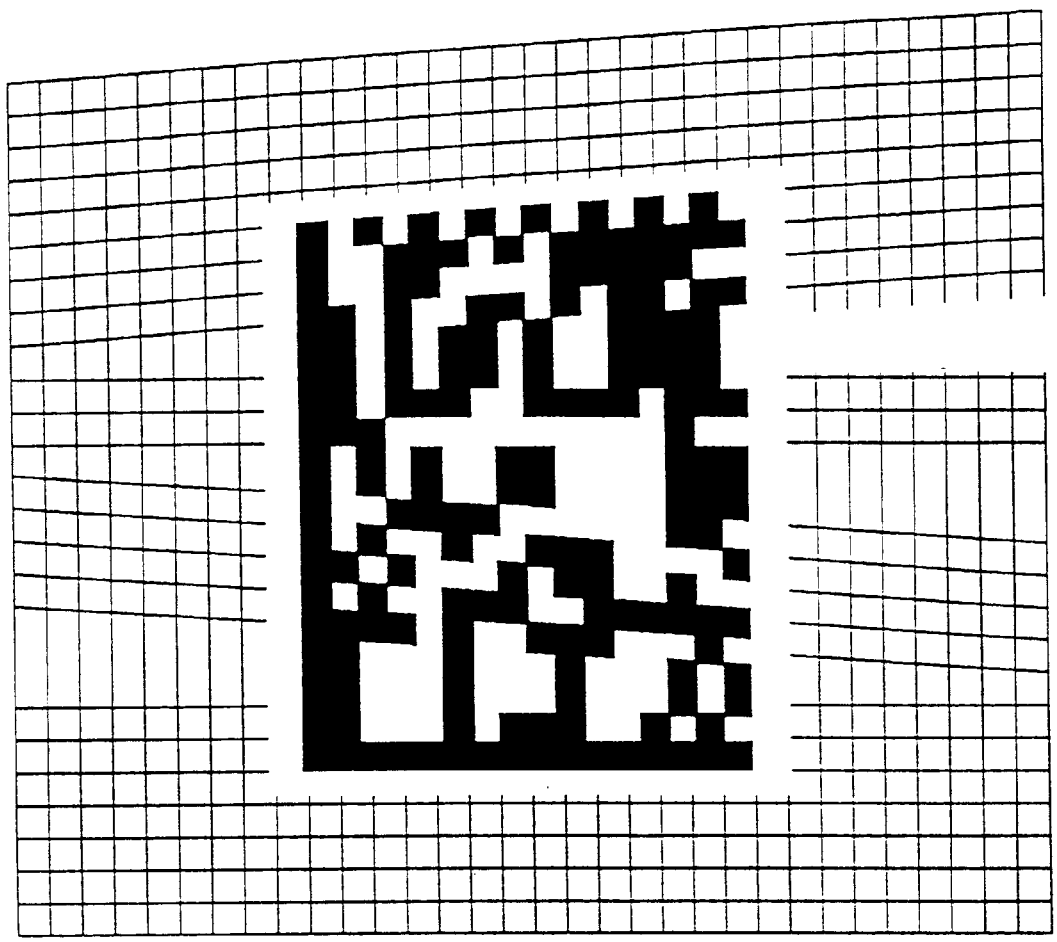
FIG. 20 illustrates a two-dimensional barcode symbology having been subjected to a non-uniform vertical shear distortion.
Figure 21:
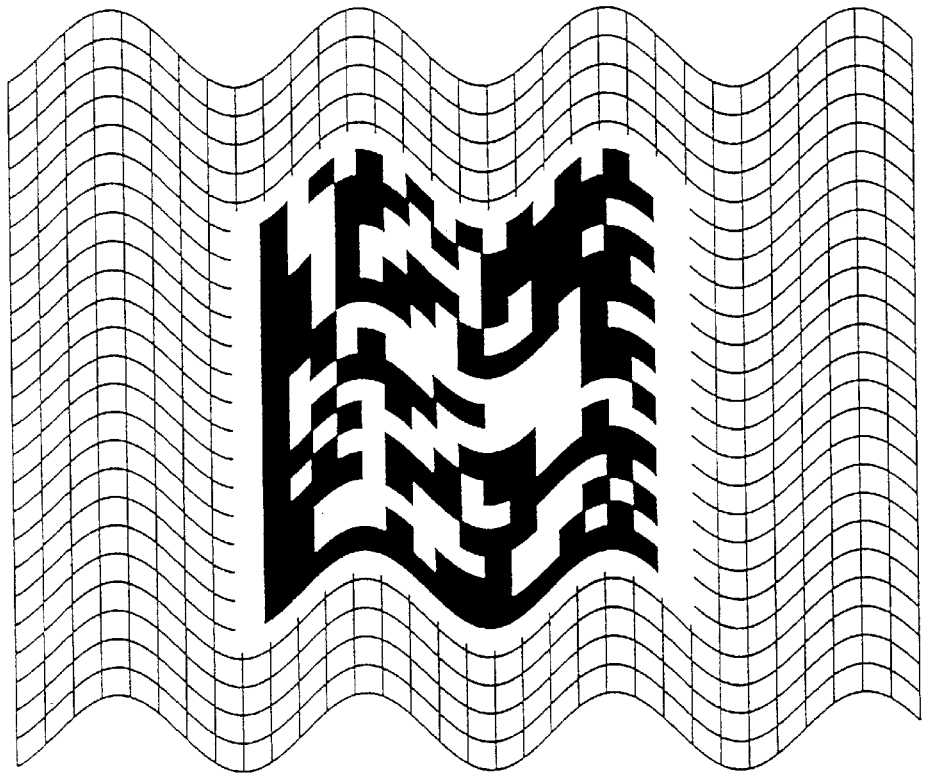
FIG. 21 illustrates a two-dimensional barcode symbology having been subjected to uniform horizontal wave distortion having a sine wave function.
Figure 22:
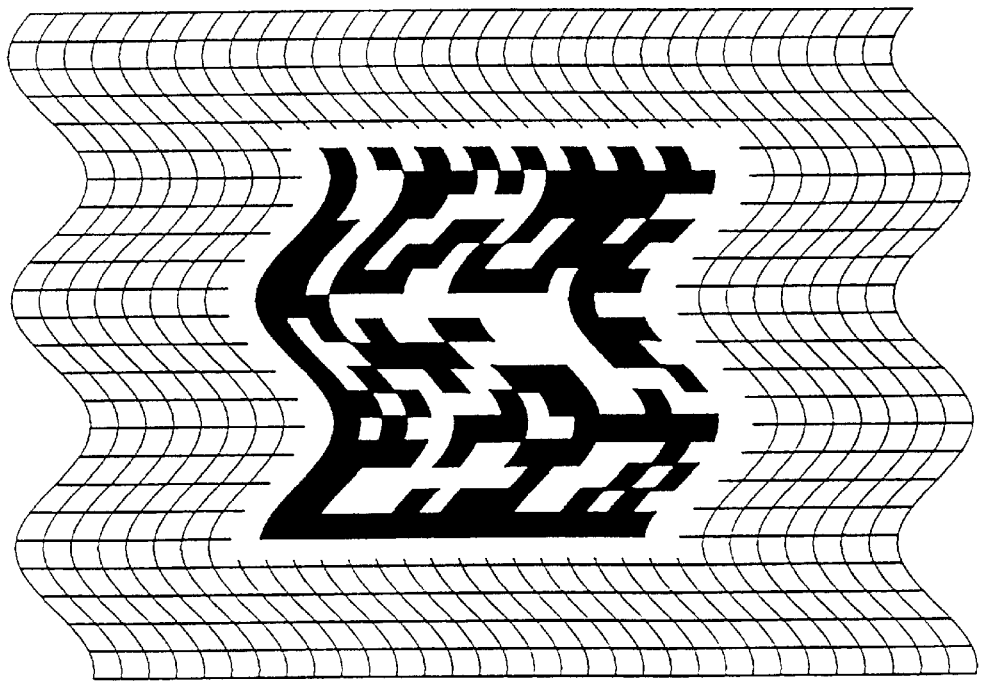
FIG. 22 illustrates a two-dimensional barcode symbology having been subjected to a uniform vertical wave distortion having a sine wave function.
Figure 23:
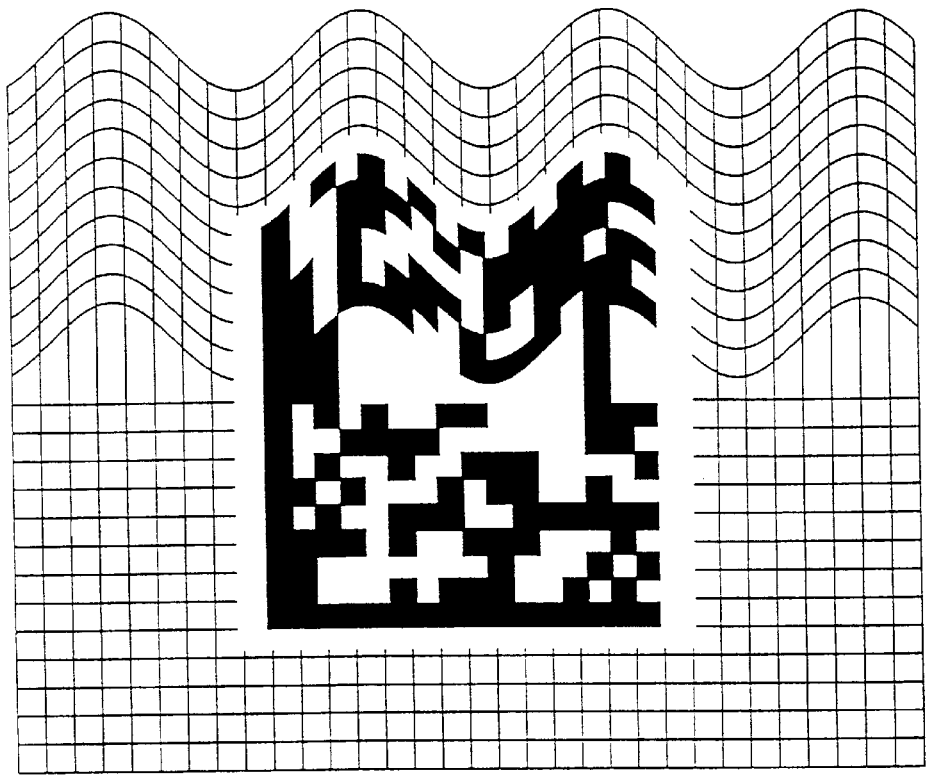
FIG. 23 illustrates a two-dimensional barcode symbology having been subjected to a non-uniform horizontal wave distortion having a sine wave function.
Figure 24:
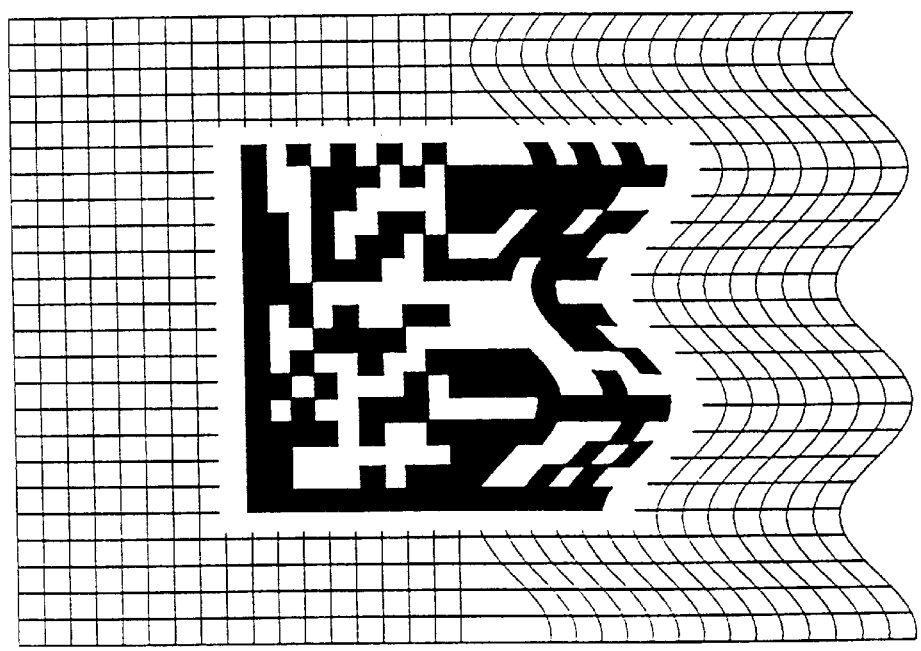
FIG. 24 illustrates a two-dimensional barcode symbology having been subjected to a non-uniform vertical wave distortion having a sine wave function.
Figure 25:
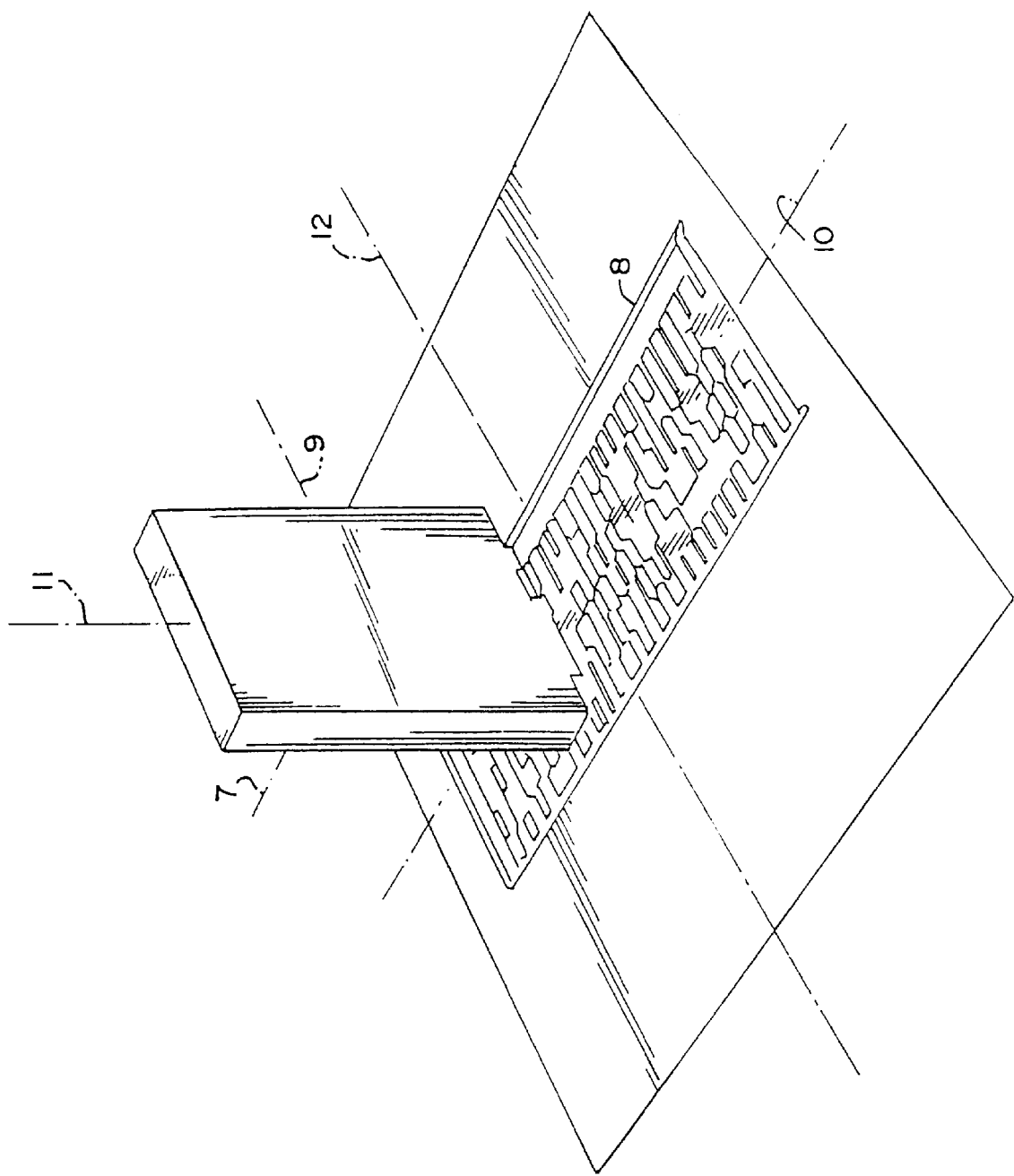
FIG. 25 illustrates a view of a hand-held barcode scanner scanning a barcode.
Figure 26:
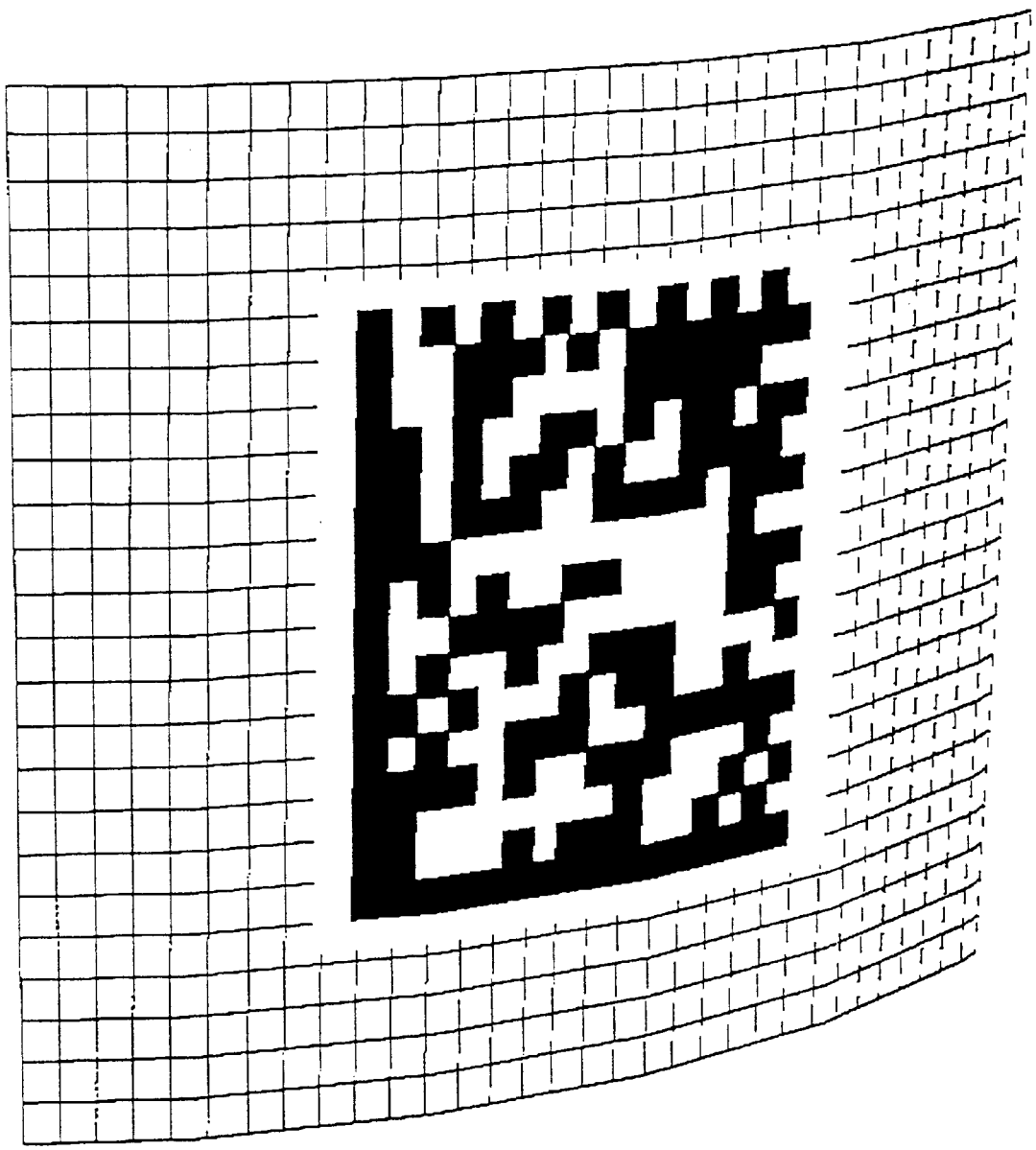
FIG. 26 illustrates a two-dimensional barcode symbology having been subjected to a non-uniform horizontal perspective distortion.
Figure 27:
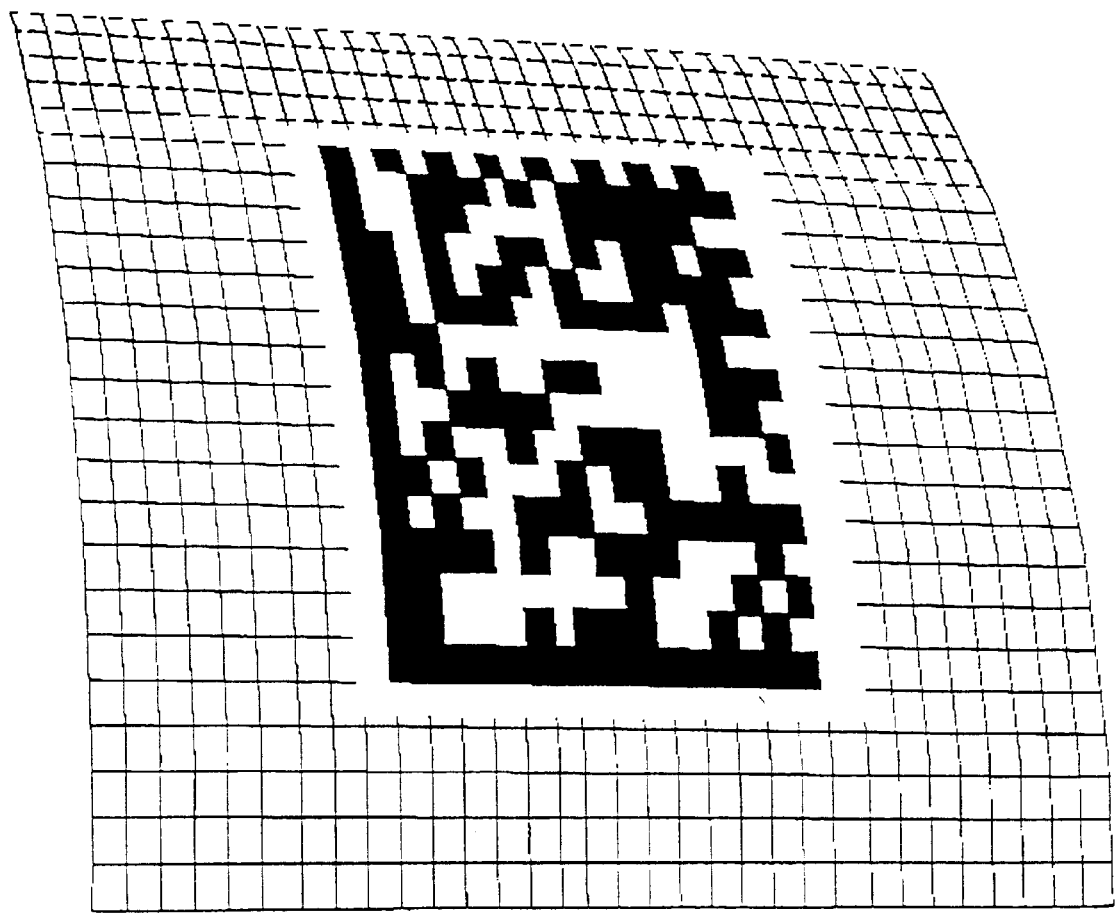
FIG. 27 illustrates a two-dimensional barcode symbology having been subjected to a non-uniform vertical perspective distortion.

APPENDIX A is a listing of an active set of cell columns;

APPENDIX B is a listing of the valid set of cell columns;

APPENDIX C shows the data cell column mapping;

APPENDIX D shows the Reed-Soloman cell column mapping;

APPENDIX E shows the miscellaneous cell column mapping;

APPENDIX F shows all the possible error types a cell column may be subjected to;

APPENDIX G shows a computer program listing in C++ for generating cell column solution statistics;

APPENDIX H shows a first sample output listing from the computer program in APPENDIX G showing the details regarding the correctability of cell columns in an active set; and APPENDIX I shows a second sample output listing from the computer program in APPENDIX G showing the average correctability of each cell column in an active set.

DESCRIPTION OF THE PREFERRED EMBODIMENTS

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 28:
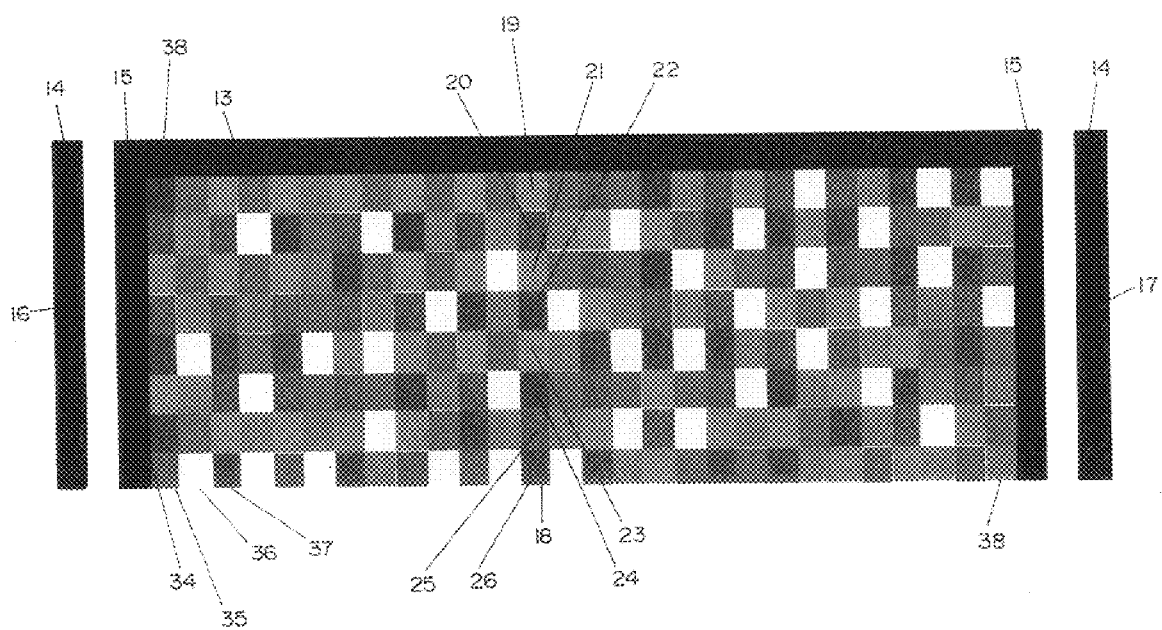
FIG. 28 illustrates a view of the two-dimensional color barcode which incorporates features of the present invention.

The preferred embodiment of the present invention is now described in detail. Referring to FIG. 28, a barcode of variable length is constructed. The barcode has a finder pattern of a unique pattern having two components: a solid horizontal line of contiguous black cells 13 on the top edge of the barcode, and two solid vertical lines 14 and 15 of contiguous black cells placed along the start side edge 16 of the barcode and along the stop side edge 17 of the barcode. This finder pattern is used to define physical size, orientation and symbol distortion. This finder pattern is also used to discriminate this barcode from other barcode symbologies.

Inside the finder pattern, a plurality of cell groups are formed and positioned. In the preferred embodiment, the amount of cell columns is always greater than one and increases and in proportion to the amount of data encoded inside the barcode. Each cell group is formed from a plurality of cells where each cell has a specific position within the cell group. In the preferred embodiment, each cell group is one cell wide by eight cells long and may be referred to as a cell column. Each cell in each cell column can be referenced by a cell position number where the lowest number, 0, represents the bottom cell in a cell column and the highest number, 7, represents the top cell in a cell column. These cell positions are referenced by a variable k. Each cell in each cell column has a color associated with it and the color chosen is either from a first set of colors or from a second set of colors. In the preferred embodiment, the first set of colors are RED, GREEN and BLUE otherwise known as additive colors. The second set of colors are CYAN, MAGENTA and YELLOW otherwise known as subtractive colors. The additive colors and subtractive colors are referred to as opposite color sets in this disclosure. An example of a cell column may be found in FIG. 28 where cell column 18 comprises of cells 19–26. The top cell 19 has a k value of 7 and the bottom cell 26 has a k value of 0.

There are three specific rules associated with each cell column. First, the color of the cells used in each cell column must only be from the additive color set or the subtractive color set. Combining cells of colors from both sets in one cell column is prohibited. Second, two cells of the same color in a cell column may not be contiguous. Third, a cell having a k value of 0 in a cell column may not have the same color as a cell having a k value of 7 in the same cell column.

In order to encode data into the barcode, each cell column must represent a data value. Likewise, unique combinations of cell colors in each cell column represent specific data values. Because working with color names is inconvenient, each color of the additive and subtractive color sets are correlated into numbers.

Because cell columns can either be formed from the additive set of colors or the subtractive set of colors, a single number can represent a color from both sets of colors. The following table shows the correlation:

| VALUE | ADDITIVE | SUBTRACTIVE |
|-------|----------|-------------|
| 0 | RED | CYAN |
| 1 | GREEN | MAGENTA |
| 2 | BLUE | YELLOW |

A cell column formed from either additive or subtractive sets of colors has the same cell column value. In other words, a value in the barcode can be represented two ways; by a cell column formed from cells having colors from the additive color set or by a cell column formed from cells having colors from the subtractive color set. Further reference to cell column values will now be made using the value associated with each cell, not the color of each cell.

For example, a cell column formed from cells having additive colors:

| CELL POSITION (k VALUE) | CELL COLOR | CELL VALUE |
|---|---|---|
| 0 | RED | 0 |
| 1 | GREEN | 1 |
| 2 | BLUE | 2 |
| 3 | RED | 0 |
| 4 | BLUE | 2 |
| 5 | RED | 0 |
| 6 | GREEN | 1 |
| 7 | BLUE | 2 | has an equivalent cell column value as a cell column formed from cells having the following subtractive colors:

| CELL POSITION (k VALUE) | CELL COLOR | CELL VALUE |
|---|---|---|
| 0 | CYAN | 0 |
| 1 | MAGENTA | 1 |
| 2 | YELLOW | 2 |
| 3 | CYAN | 0 |
| 4 | YELLOW | 2 |
| 5 | CYAN | 0 |
| 6 | MAGENTA | 1 |
| 7 | YELLOW | 2 |

These two cell columns represent the same cell column value because each respective cell in each of the above cell columns has the same value associated with it. For example, cell position 1 from the additive cell column is RED and has a corresponding value of 0 and cell position 1 from the subtractive cell column is CYAN which also has a corresponding value of 0.

Because each cell can represent three different values, 0, 1 and 2, each column could theoretically represent $3^8=6561$ different combinations.

There are a couple different ways of referencing the value of a cell column. A first way is by the cell column's raw value. Every unique combination of cells in a cell column is represented by a cell column raw number. The cell column raw number is computed by the following formula:

$$\sum_{k=0}^{7} 3^k \text{CellValue}(k)$$

In the two examples cited above, both cell columns have equivalent cell column values because each cell in each respective cell column have equivalent values. The raw cell column value is calculated as follows:

$3^0(0)+3^1(1)+3^2(2)+3^3(0)+3^4(2)+3^5(0)+3^6(1)+3^7(0)=912$

Every raw value representing every possible combination of cell values in a cell column forms the global set. However, not every raw cell column value between 0 and 6561 would represent a valid cell column. This is because of the rules stated previously where two of the same cell colors (or cell values) cannot be contiguous and the color or value of the top cell cannot be the same color or value as the bottom cell. Under these constraints, a valid set of cell columns can be constructed, known hereinafter as the valid set. The valid set is comprised of two hundred and fifty-eight cell column combinations and is a subset of the global set. The valid set of cell columns formed from the global set is found in APPENDIX B where each valid cell column combination is tagged or identified by its raw cell column number.

Because this invention uses Reed-Soloman error detection and correction, the barcode must be able to represent forty-seven different values which is the size of the Galois Field (GF) chosen in the preferred embodiment. In prior art barcodes, the set size of cell columns or groups chosen is the same size as the barcode's Galois Field (GF) and the same cell groups used for data encodation are also used to encode the check-digits. This can cause ambiguity when decoding damaged barcodes because, under damage, it can be difficult to determine if the specific cell group represents a data value or check-digit value.

The preferred embodiment uses ninety-four cell columns constructed from unique combinations of eight cell values. The first forty-seven cell columns represent data values and the second forty-seven cell groups represent Reed-Soloman check-digit values. Cell columns representing data values are described as data cell columns and cell columns representing Reed-Soloman check-digit values are described as Reed-Soloman cell columns. The actual value that each of the ninety-four cell columns represents has to be between 0 and 46 under a Galois Field of forty-seven but each cell column set is distinguishable from each other because they are now formed from unique combinations of cell values, thereby eliminating any ambiguity.

Other miscellaneous cell columns are needed for the barcode of the present invention as well. The miscellaneous cell column set provides information about the structure of the barcode. The preferred embodiment uses twelve miscellaneous cell columns.

Including the data value set, Reed-Soloman value set, and the miscellaneous set, the barcode requires a total of one hundred and six unique cell column combinations. As stated previously, each of the one hundred and six cell column combinations used in the barcode can either be represented with an additive set of colors or a subtractive set of colors. The one hundred and six cell column combinations used to encode the data value set, the Reed-Soloman value set, and the miscellaneous set are a subset of the two hundred and fifty-eight cell columns that comprise the valid set. These one hundred and six cell column combinations are referred to as the active set of cell columns and are shown in APPENDIX A.

Each active cell column may be subjected to a number of different types of errors. In fact, a cell column comprised of eight cells may be subjected to a total of two hundred and fifty-five different types of cell column errors as shown in APPENDIX F where the "?" represents an unknown cell value and a "-" represents a known cell value. For each cell column error type, a set of valid solutions can be generated. Each possible solution must conform to the rules where two of the same cell colors, or cell values, cannot be contiguous and the color or value of the top cell cannot be the same color or value as the bottom cell of a cell column. In addition, each solution must be a member of the active set. A valid solution that conforms to this final requirement is called an active solution. By using these three constraints, the amount of possible solutions for each cell column error type diminishes. To clarify, the number of valid solutions for each cell column error type is the same no matter what combination of cell columns are chosen for the active set. The number of active solutions is always less than the number of valid solutions, because the active set is smaller than and a subset of the valid set and depends on the combinations of cell columns used to construct the active set.

One of the objects of this invention is to incorporate double data correcting ability in the barcode symbology. Double data correcting ability involves attempting to correct errors in each cell column before the Reed-Soloman error correction algorithms are used to detect and correct errors. To create an effective double data correcting barcode, one hundred and six cell columns are strategically chosen from the available cell columns contained in the valid set, thereby forming an active set of cell columns.

The objective is to pick a group of one hundred and six cell columns from the valid set where the number of active solutions available for each cell column error type shown in APPENDIX F is minimized. This can best be demonstrated in reference to an active set of one hundred and six cell columns chosen as shown in APPENDIX A.

A computer program can be written by one skilled in the art that takes a cell column from the active set in APPENDIX A and subjects each cell column to each cell column error type listed in APPENDIX F. One such computer program is found in APPENDIX G. The number of valid and active solutions is then calculated for each error type. APPENDIX H is a small portion of the output of such a computer program for the cell column having a raw value of eight hundred and seventy-five from the active set shown in APPENDIX A.

The computer program shown in APPENDIX F also compiles the number of active solutions for each cell column error type in each cell column of the active set being analyzed. A summary of this information for the active set of APPENDIX A is shown in APPENDIX I. To explain this summary in APPENDIX I: column 27 represents the raw number of the cell column of the active set being analyzed; column 28 represents the cell values comprising each cell column referenced by k value, column 29 represents the percentage of cell column error types found in APPENDIX F subjected to each respective cell column that have only one active solution or, in other words, are unambiguously correctable; column 30 represents the percentage of cell column error types found in APPENDIX F subjected to each respective cell column that have two active solutions; and column 31 represents the percentage of cell column error types found in APPENDIX F subjected to each respective cell column that have three active solutions. An average of one, two, and three active solution percentages is computed for all cell columns in the active set and is shown on line 32 of APPENDIX I.

It is desired to find the most optimal set of cell columns for use in the active set. Because the valid set comprises two hundred and fifty-eight cell columns and the active set size in the preferred embodiment must be comprised of one hundred and six cell columns, the following formula describes the total number of possible active set combinations that can be formed from the valid set:

$$\frac{n!}{r!(n-r)!} = \frac{258!}{106!(258-106)!} = 4.33 \times 10^{244}$$

Because there are an overwhelming number of active set combinations, it would not be practical to evaluate the correctability of each cell column in each of the possible active set combinations for determining the best combination of cell columns to use for the final active set. Therefore, an algorithm needs to be used to converge on the most optimal solution. The inventor chose to use a genetic algorithm to attempt to find the most optimal solution set.

Figure 29:
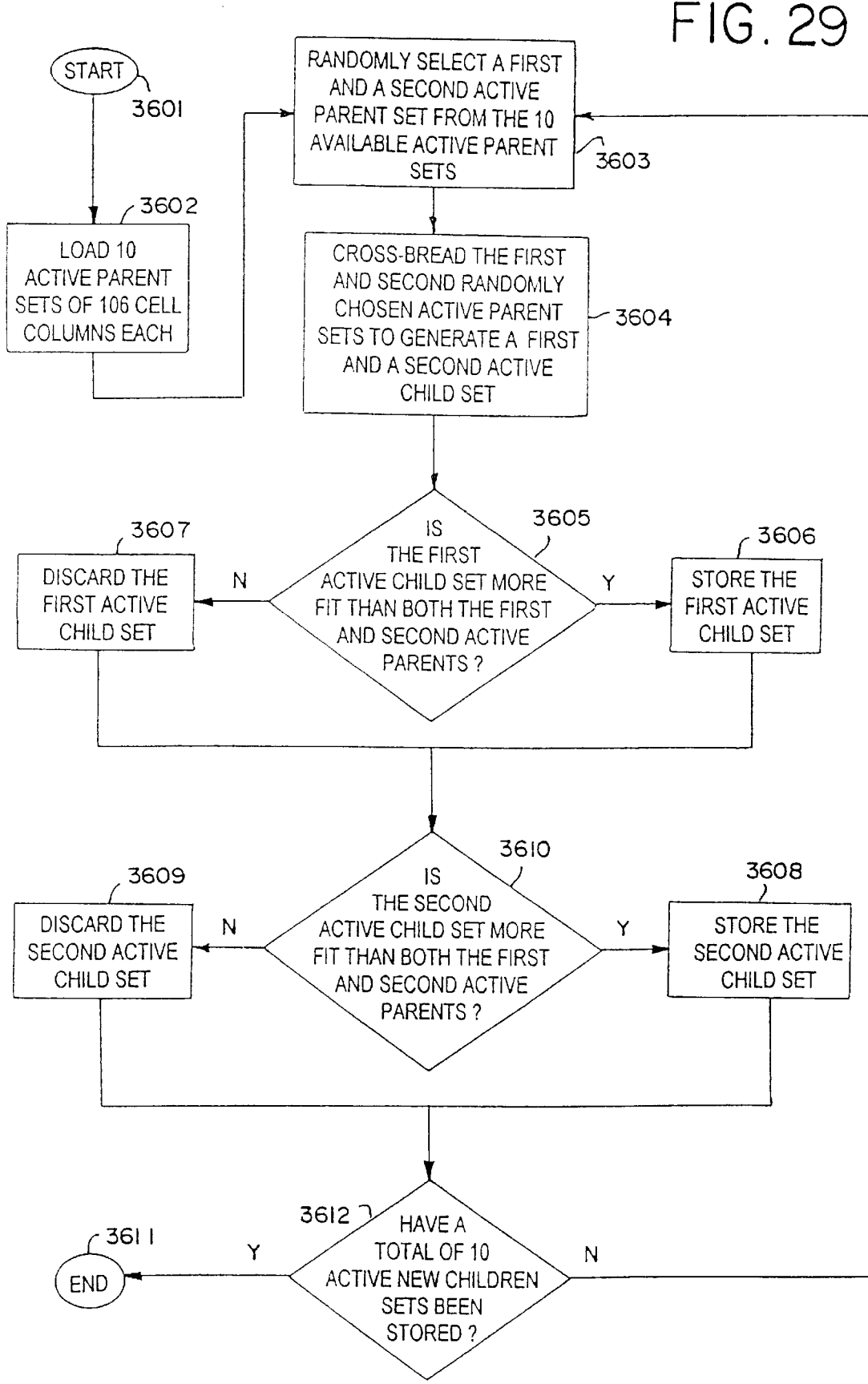
FIG. 29 illustrates a flow chart describing a genetic algorithm for generating an optimal active set combination.

The genetic algorithm used to find the best group of one hundred and six cell columns for the active set can be best understood when referencing FIG. 29. The genetic algorithm starts out in step 3601 and progresses to step 3602 where, a population of ten active sets are retrieved. These ten active sets are known as parent sets. Step 3603 randomly selects two active sets from the ten active sets created in step 3602. Step 3604 then crossbreeds the two random selected active sets from 3603 forming a first active child set and a second active child set. Step 3605 determines if the first child set is more fit than both its respective parents. If so, that first child set is stored in step 3606. If the first child set is not more fit than both its respective parents, then it is discarded in step 3607. Step 3610 then determines if the second child set is more fit than both its respective parents. If so, that second child set is stored in step 3608. If the second child set is not more fit than both its respective parents then it is discarded in step 3609. Step 3612 then determines if ten new children have been stored. If not, then step 3603 is re-executed to create in attempt to create more children that are more fit then their respective parents. If ten new children have been stored, then the algorithm terminates in step 3611.

Figure 30:
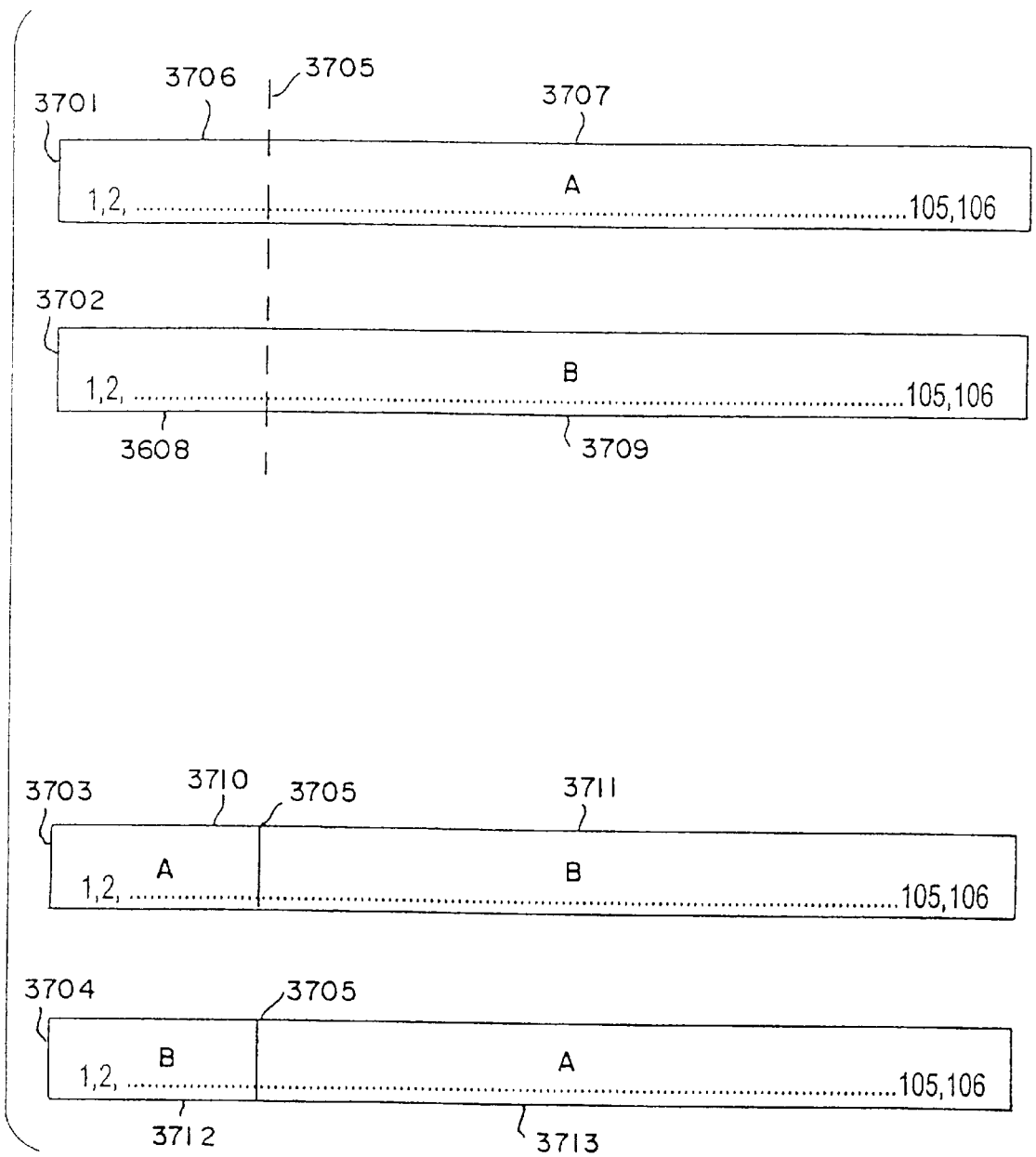
FIG. 30 illustrates a diagram showing two active sets being cross-bred.

The function of cross-breeding can best be understood when referencing FIG. 30. Two active sets 3701 and 3702 are chosen to be crossbred. Active set 3701 can also be referred to as active set A and active set 3702 can also be referred to as active set B. Active sets A and B are to be combined at crossover location 3705, thereby, forming two children 3703 and 3704. Crossover location 3705 is randomly changed to provide more variety in the offspring created every time the algorithm in FIG. 29 is executed. Children 3703 and 3704 are also known as child sets AB and BA, respectively. Child set AB is formed by combining cell columns left of crossover point 3705 in active set A with cell columns right of crossover point 3705 in active set B. Likewise, child set BA is formed by combining cell columns left of crossover point 3705 in active set B with cell columns right of crossover point 3705 in active set A.

Determining whether a child set is more fit than its parents is dependent on two factors. The first factor is whether or not the child set comprises a valid set of cell columns. A cell column set is only valid if it contains cell columns found in the valid set of cell columns and if none of the cell columns in the child set are repeated more than once. The second factor is whether or not the child set has a higher score than both its parents. In the preferred embodiment, each set is assigned a score which is the average percentage of all unambiguously correctable cell column errors for each cell column in the set being analyzed. This score is generated by the computer program in APPENDIX F and shown in APPENDIX I at location 33. Therefore, a higher score indicates that, on average, each cell column comprising that active set is more correctable than an active set with a comparable lower score.

The algorithm in FIG. 29 is repeated as many times as desired until a suitable active set is found. The first time the algorithm is executed, ten active sets of one hundred and six cell columns each are randomly created from the valid set of cell columns. Each subsequent time the algorithm in FIG. 29 is repeated, the ten active parent sets loaded in step 3602 are the resultant child sets from the last execution of the algorithm. Therefore, each generation of ten active sets generated by the algorithm are always more fit or have higher scores than the previous generation. As is well known in the art of genetic algorithms, a mutation is periodically introduced in one or more of the ten active parent sets in an attempt to create more variability of the active parent population and, likewise, create more fit offspring.

An active set generated from multiple iterations of such a genetic algorithm is shown in APPENDIX A. It should be obvious that other active set combinations could be used that may have higher scores using these methods. At the time of the priority date, the most fit active set found by the inventors was the active set found in APPENDIX A.

Now that the method in which the barcode's cell columns and respective values have been chosen, the inventor maps the data, Reed-Soloman, and miscellaneous values to actual cell columns to each cell column of the active set APPENDIX A. APPENDIX C shows the data cell column mapping, APPENDIX D shows the Reed-Soloman cell column mapping, and APPENDIX E shows the miscellaneous cell column mapping.

The barcode is formed by first determining which data values need to be concatenated together to encode the desired information according to the rules chosen to encode the desired information or data. Next, Reed-Soloman check-digits are computed. Finally, various miscellaneous values are determined that describe the data error correction format and structure of the barcode. All of these values are correlated to respective cell columns values (i.e. data values to data cell columns; Reed-Soloman values to Reed-Soloman cell columns; and miscellaneous values to miscellaneous cell columns) using the tables found in APPENDICES C, D and E. The cell columns values are then concatenated together in a sequence using specific rules of the symbology. In the preferred embodiment, the first cell column in the sequence is a miscellaneous cell column describing the starting mode of the barcode. Data cell columns are then added to the sequence. Reed-Soloman cell columns follow the data cell columns. The final cell column in the sequence is another miscellaneous cell column describing parameters for the Reed-Soloman error correction check-digits.

With reference to FIG. 28, cell columns are placed within the finder pattern starting from the left inner side 34 of the barcode finder pattern. It is required that when each cell column is placed in the barcode, that the cell columns alternate between the additive and subtractive color sets so that each cell column is always surrounded by a cell column of the opposite color set (i.e. additive cell columns are surrounded by subtractive cell columns etc.). The exception is the first and last cell columns where the left and right sides respectively are bounded by black finder pattern cells. For example, the first cell column placed in location 35 is chosen from the additive set of colors. The second cell column placed in location 36 must be formed from the subtractive colors and the third cell column placed in location 37 must be formed from the additive colors, etc. The last cell column placed at location 38 within the finder pattern must always be from the subtractive set of colors.

A completed barcode symbology has now been formed having resistance to the single or combined effects of: scaling distortions, perspective distortions, shear distortions, and wave distortions of both the uniform and non-uniform type traversing the barcode's vertical or horizontal axis. This can best be demonstrated by discussing methods of decoding this barcode symbology.

Referencing FIG. 28, the finder pattern is first located in the field of view of the barcode scanning apparatus. This process requires a two-dimensional barcode scanner or a linear barcode scanner that is capable of storing two-dimensional bitmap image for decoding. Next, it is required to find the top cell of the first cell column for decoding. This can be done by locating both the solid vertical line of the finder pattern 15 on side 16 of the barcode, and the top horizontal bar 13 of the finder pattern. The intersection point of both these finder pattern components surrounds the top left corner of the top cell of the first cell column 38. Before the actual decoding process is initiated, it is desirable to find the center of the top cell of the first cell column. Because the top left corner has been identified, it is a simple matter to first scan towards the right and towards the bottom of the barcode until the top right, bottom right, and bottom left corners are located which yields the general size and shape of the top cell. The center point of the top cell is approximated using this information.

Figure 31:
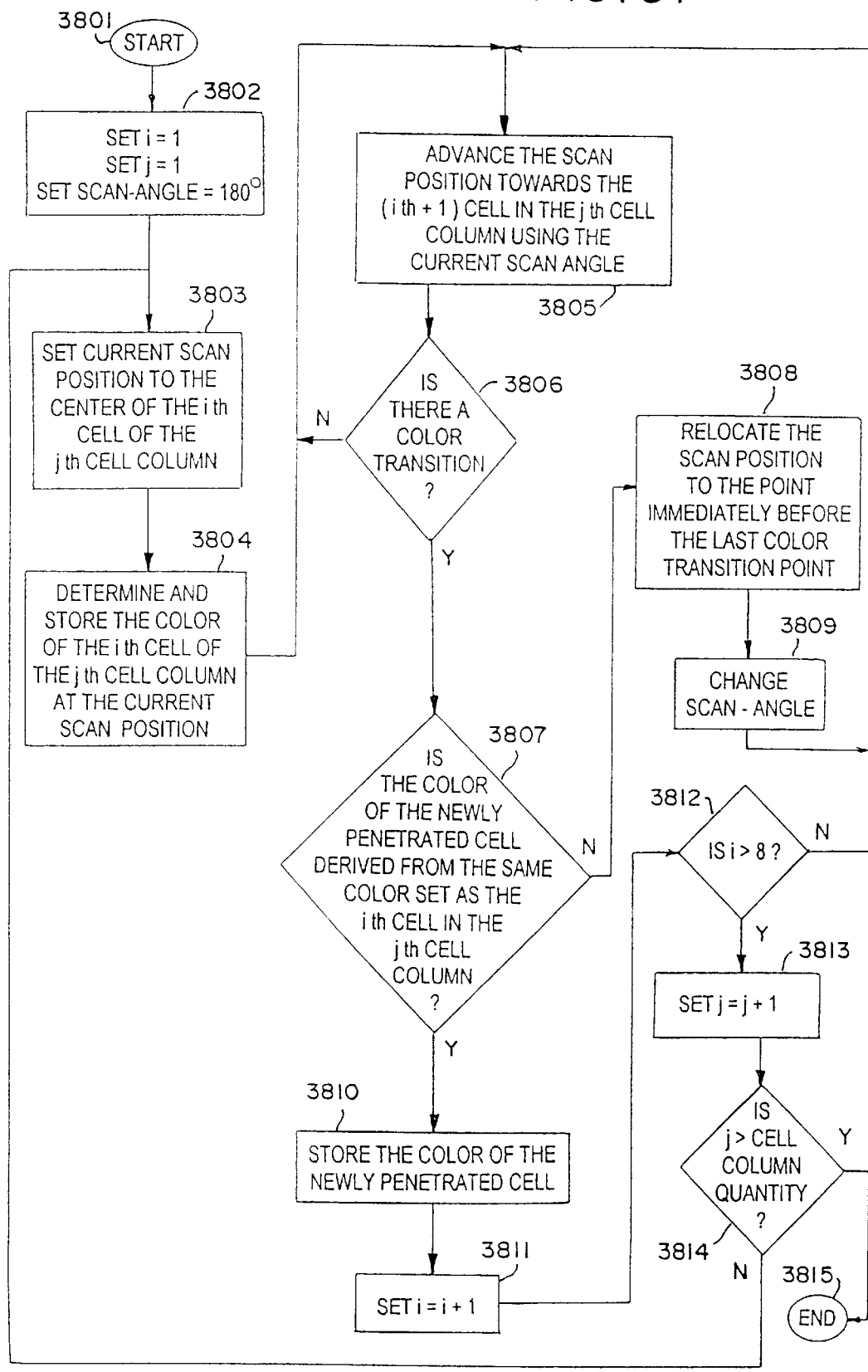
FIG. 31 illustrates a flow chart of a first decoding algorithm that starts at a top cell of a cell column.

The center of the top cell of the first cell column 38 is used as the starting point for the cell decoding algorithm shown in FIG. 31. In fact, the starting point for decoding all cell columns using the algorithm in FIG. 31 is always the center point of the top cell of the specific cell column being decoded.

Figure 33:
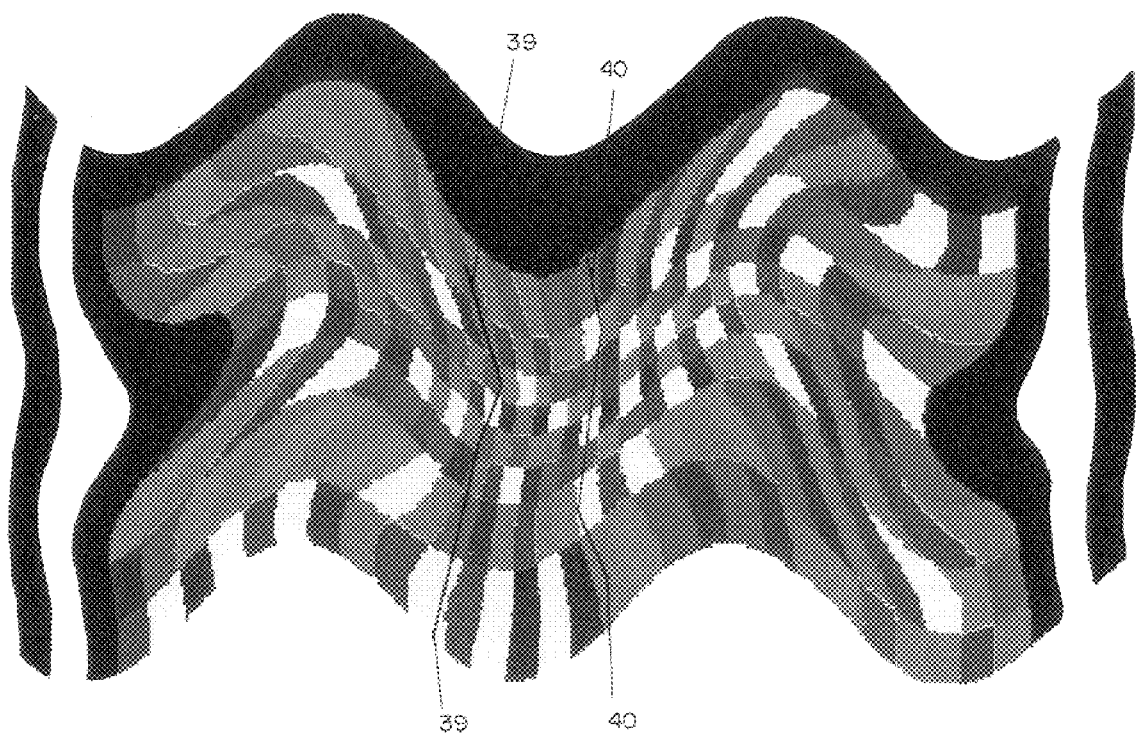
FIG. 33 illustrates a view of a distorted two-dimensional color barcode of this invention showing typical scan paths of the first and second decoding algorithms.

The operation of the decoding algorithm depicted in FIG. 31 will now be discussed. A visual representation of how this decoding algorithm works should be done in reference to FIG. 33 which depicts a moderately distorted barcode symbology of the type disclosed in this instant invention. The objective of the decoding algorithm in FIG. 31 is to scan along each cell column until all eight cells in the cell column have been traversed and decoded. Line 39, depicts a path that the scanning algorithm of FIG. 31 could incur.

The decoding algorithm of FIG. 31 starts out with step 3801. Step 3802 is next executed where initial data values and parameters are initialized. The variable i is a cell counter and represents the amount of cells traversed in the current cell column. The variable j represents the amount of cell columns that have been decoded and the current value of j always represents the current cell column being subjected to the decoding algorithm. Step 3802 initializes the scan angle to 180 degrees. Scan angles are always measured in degrees where a scan angle of 0 degrees or 360 degrees indicates a scan direction towards the top of the barcode. Step 3803 is executed next where the current scan position is placed in the center of the bottom cell of the current cell column being decoded using the procedure described previously. The color of that cell is determined and stored in step 3804. Step 3805 then advances the scan position towards the next cell immediately above the current cell using the current scan angle. Step 3806 then looks for a color transition, if there is no color transition, then the scan continues in step 3805 using the current scan angle along the same path. When step 3806 detects a color transition, step 3807 is executed which determines if the color of the newly penetrated cell is derived from the same color set as the recently exited cell. If this is not the case, then this is an indication that the newly penetrated cell is a member of an adjacent cell column or finder pattern. Step 3808 then relocates the scan position to the point immediately before the last color transition point and the new scan angle is chosen in step 3809. The new scan angle chosen should be chosen to avoid scanning in the reverse direction.

If the color of the newly penetrated cell in step 3807 is derived from the same color set as the recently exited cell, then this is indication that the newly penetrated cell is a member of the same cell column. In this case, step 3810 is executed storing the color of the newly penetrated cell. Step 3811 increments i to keep track of how many cells have been traversed in the current cell column. Step 3812 determines if all eight cells in the cell column have been decoded. If not, then step 3805 is reentered to continue scanning for additional cells. If all eight cells have been traversed, then step 3813 is executed which resets the cell counter i and increments the cell column counter j. Step 3814 checks to see if all of the cell columns have been scanned. If no, then step 3803 is reentered which initiates a new scan at the top cell of the next cell column. If step 3814 determines that all of the cell columns have been scanned, then the decoding algorithm terminates in step 3815.

Figure 32:
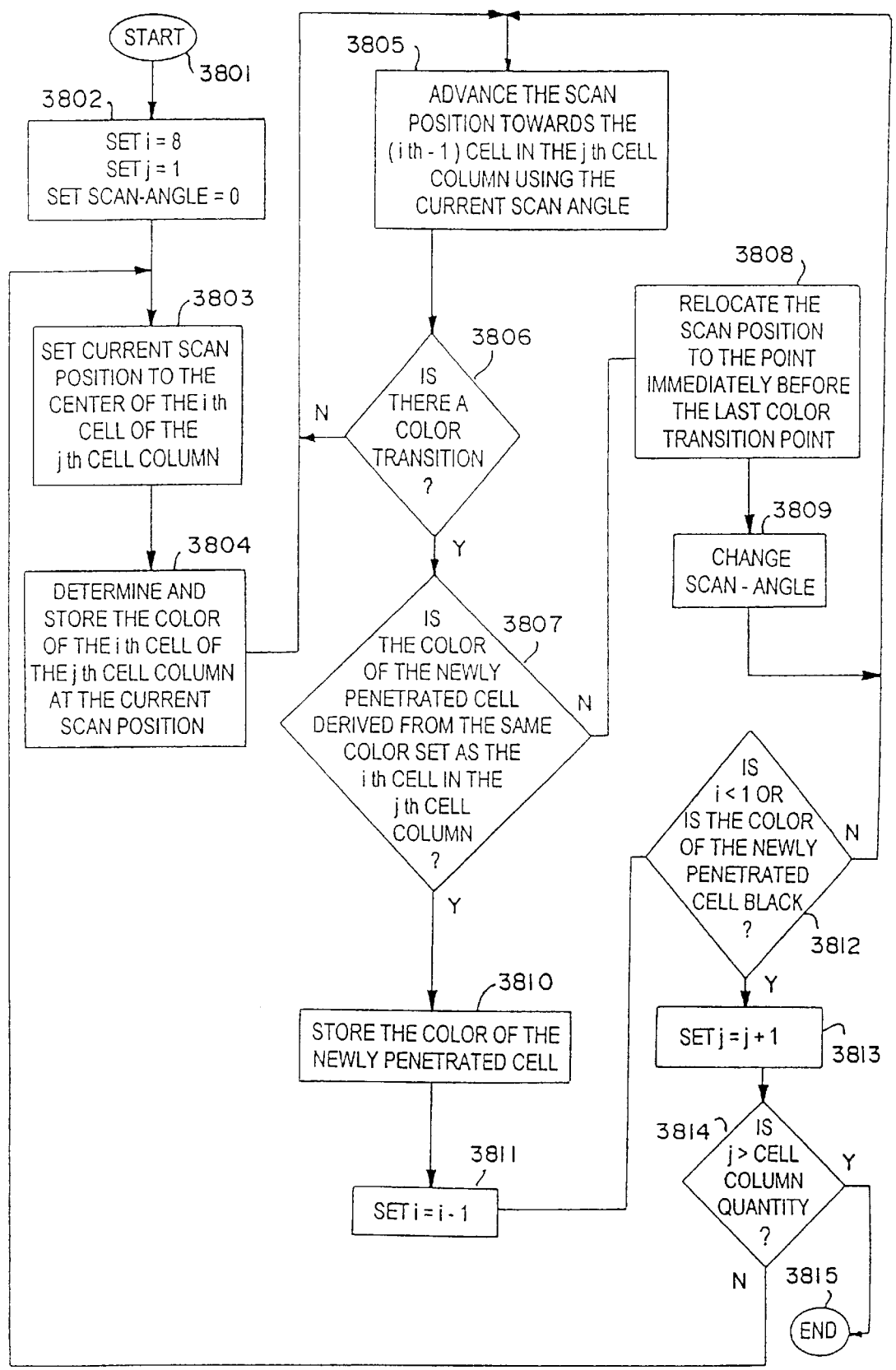
FIG. 32 illustrates a flow chart of a second decoding algorithm that starts at a bottom cell of a cell column.

Under cases of damage to the barcode symbology, the scanning algorithm may not be capable of crossing the entire length of each cell column. In this case, the data captured using the scanning algorithm of FIG. 31 is saved and the scanning algorithm shown in FIG. 32 is then used to attempt to capture the remaining cells of the cell column being scanned. This scanning algorithm is similar to the scanning algorithm shown in FIG. 31 except the scanning is initiated from the bottom cell of each cell column instead of the top cell. Normally the second scanning algorithm in FIG. 32 is only used if the first scanning algorithm shown in FIG. 31 cannot be successfully completed. Because the second scanning algorithm needs to start at the bottom cell of the cell column to be scanned, that bottom cell needs to be located. This can be done by scanning along the bottom row of the barcode and counting transitions until the desired cell column is located.

The operation of the decoding algorithm depicted in FIG. 32 will now be discussed. A visual representation of how this decoding algorithm works should be done in reference to FIG. 33 which depicts a moderately distorted barcode symbology of the type disclosed in this instant invention. The objective of the decoding algorithm in FIG. 32 is to scan along each cell column until all eight cells in the cell column have been traversed and decoded. Line 40 depicts the path on which the scanning algorithm of FIG. 32 could incur.

The decoding algorithm of FIG. 32 starts with step 3901. Step 3902 is next executed where initial data values and parameters are initialized. The variable i is a cell counter and represents the amount of cells traversed in the current cell column. The variable j represents the amount of cell columns that have been decoded and the current value of j always represents the current cell column being subjected to the decoding algorithm. In this scanning algorithm, i is set to seven so that the bottom cell of the cell column is scanned first and the scan-angle is set to 0 degrees so that the scanning direction generally proceeds towards the solid horizontal line of contiguous black cells 13. Step 3903 is executed next where the current scan position is placed in the center of the top cell of the current cell column being decoded using the procedure described previously. The color of that cell is determined and stored in step 3904. Step 3905 then advances the scan position towards the next cell immediately below the current cell using the current scan angle along path 40. Step 3906 then looks for a color transition, if there is no color transition, then the scan continues in step 3905 using the current scan angle along the same path. When step 3906 detects a color transition, step 3907 is executed which determines if the color of the newly penetrated cell is derived from the same color set as the recently exited cell. If this is not the case, then this is an indication that the newly penetrated cell is a member of an adjacent cell column or finder pattern. Step 3908 then relocates the scan position to the point immediately before the last color transition point and the new scan angle is chosen in step 3909. The new scan angle chosen should be close to the previous scan angle to avoid scanning in the reverse direction.

If the color of the newly penetrated cell in step 3907 is derived from the same color set as the recently exited cell, then this is indication that the newly penetrated cell is a member of the same cell column. In this case, step 3910 is executed storing the color of the newly penetrated cell. Step 3911 decrements i to keep track of how many cells have been crossed in the current cell column. Step 3912 determines if all eight cells in the cell column have been decoded. If not, then step 3905 is reentered to continue scanning for additional cells. If all eight cells have been traversed, then step 3913 is executed which resets the cell counter i and increments the cell column counter j. Step 3914 checks to see if all of the cell columns have scanned. If no, then step 3903 is reentered which initiates a new scan at the bottom cell of the next cell column. If step 3914 determines that all of the cell columns have been scanned, then the decoding algorithm terminates in step 3915.

Because of the structure of the barcode, the barcode can be decoded using the above two decoding algorithms and, likewise, is resistant to all types of distortions discussed in this disclosure for the following reasons: (1) Because the barcode is transition based, the length of each cell in each cell column is not critical. The decoding algorithm shown in FIG. 31 will successfully decode a cell of any length in a cell column by remaining in steps 3805 and 3806 until a color transition is detected. Therefore, any distortions that cause each cell height to variably change will not render the barcode unscannable. (2) When the decoding algorithm scans down each cell column, each color transition within the same color set serves as a clock track or indication that a new cell has been entered. Because each cell is always surrounded by a cell of a different color, a plethora of inherent clock tracks are formed within the barcode. Under practically any type of distortion, the clock tracks serve as indicators on how the barcode is distorted throughout the entire width and height of the barcode. This is advantageous under non-uniform distortions where the distortion is not uniformly distributed throughout the barcode symbology. (3) Lastly, because each cell column is surrounded by a cell column formed from cells of the opposite color system, each cell column is bounded by a form of indicia that indicates that the decoding algorithm has traversed an adjoining cell column. Because of this indicia, the decoding algorithm shown in FIG. 31 or FIG. 32 is able to accurately track along each cell column under extreme amounts of uniform and non-uniform wave, shear, scaling and perspective distortions.

The next step in the decoding process involves decoding the colors of the cells of each cell column into their respective data, Reed-Soloman, and miscellaneous values. As each cell in each cell column is decoded through both scanning algorithms, the corresponding value of the color of each cell is stored in an eight element array. The array is then converted into a raw value using the following formula:

$$\sum_{k=0}^{7} 3^k \text{CellValue}(k)$$

where k is the position within the array and CellValue(k) represents the value of a cell placed in array position k.

The raw value is then correlated, through a look-up table, to a data value, a Reed-Soloman value, or a miscellaneous value.

In the case that some of the elements in the eight element array are unknown as a result of damage in the cell column, a determination of the cell column value may still be made without resorting to the Reed-Soloman check-digits. This is the first step in double data correction. This is done by substituting every available cell value combination in the unknown element positions in the eight element array until one or more active solutions are found. For example, the following eight element array is filled with cell value data extracted from a cell column except that the first or top cell (Cell position k=7) of the cell column could not be determined.

| Cell Position (k) | 0 | 1 | 2 | 3 | 4 | 5 | 6 | 7 |
|---|---|---|---|---|---|---|---|---|
| Cell Value | ? | 0 | 1 | 2 | 1 | 0 | 1 | 0 |

Cell position 0 can only take three possible values: 0, 1 or 2. Substituting each of these three possible values into the unknown cell position 0 yields the following three cell column possibilities.

Cell Column Raw Value=873

| Cell Position (k) | 0 | 1 | 2 | 3 | 4 | 5 | 6 | 7 |
|---|---|---|---|---|---|---|---|---|
| Cell Value | 0 | 0 | 1 | 2 | 1 | 0 | 1 | 0 |

Cell Column Raw Value=874

| Cell Position (k) | 0 | 1 | 2 | 3 | 4 | 5 | 6 | 7 |
|---|---|---|---|---|---|---|---|---|
| Cell Value | 1 | 0 | 1 | 2 | 1 | 0 | 1 | 0 |

Cell Column Raw Value=875

| Cell Position (k) | 0 | 1 | 2 | 3 | 4 | 5 | 6 | 7 |
|---|---|---|---|---|---|---|---|---|
| Cell Value | 2 | 0 | 1 | 2 | 1 | 0 | 1 | 0 |

The first possibility having a cell column raw value of 873 is an invalid cell column combination because contiguous cell positions 0 and 1 both contain a cell value of 0. The second possibility having a cell column raw value of 874 is a valid cell column but it is not part of the active set found in APPENDIX A, therefore, it is not an active solution. The third possibility having a cell column raw value of 875 is a member of the active set in APPENDIX A and is the only possible active solution. In this case, the damaged cell column can be immediately corrected. Because the active set in APPENDIX A has been optimally chosen using genetic algorithms, the number of active possibilities, in the case of damage, for all cell columns in the active set has been minimized.

In the case where more than one active solution is possible or when a cell column is missing or severely damaged, the cell column can be treated as an erasure and corrected using Reed-Soloman error correction algorithms. After each cell column has been successfully decoded, the desired information encoded in the barcode is extracted using the symbology's data encodation rules.

Figure 34:
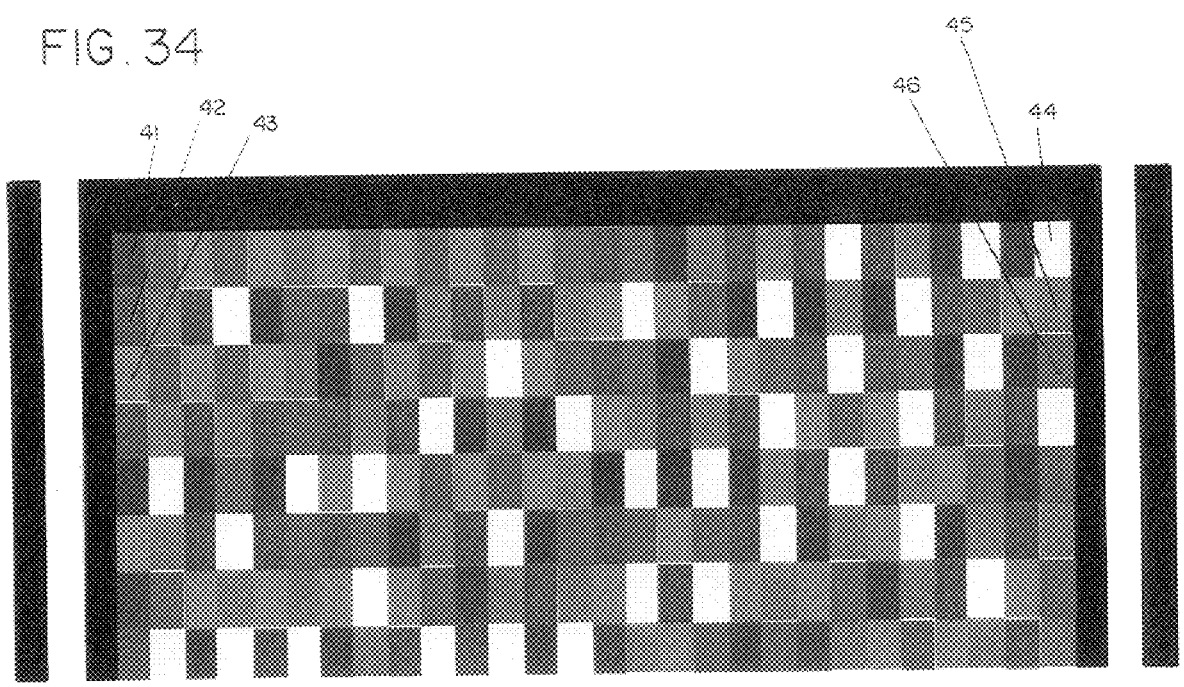
FIG. 34 illustrates a bar code.

When decoding symbologies that have had substantial environmental exposures, fading can occur which can render them difficult to decode as a result of the barcode's cells changing in contrast, brightness and color. The instant invention attempts to eliminate that problem by strategically placing color cells that inform the scanning apparatus what the contrast, brightness and color thresholds are at various points within the barcode. These color cells are incorporated within the miscellaneous cell column values shown in APPENDIX E. Each of these miscellaneous cell columns has the last three cells (k=5, 6, 7) being 0, 1 and 2, respectively. Because a miscellaneous cell column is always placed at the beginning and at the end of the symbology in the preferred embodiment, a cell value of 0, 1 and 2 is always present at cells 41, 42 and 43, respectively, at the beginning of the symbology and at cells 44, 45 and 46 at the end of the symbology, see FIG. 34. Because the first cell column at the beginning of the symbology is composed of cells from the additive set, cell 44 is always BLUE, cell 45 is always GREEN, and cell 46 is always RED. Likewise, because the last cell column at the end of the symbology is composed of cells from the subtractive set, cell 47 is always YELLOW, cell 48 is always MAGENTA, and cell 49 is always CYAN. Because cells 41, 42, 43, 44, 45, and 46 are all abeam the barcode's finder pattern, they are all easily found by the decoding algorithm before decoding of each cell column commences.

While a preferred embodiment of the present invention is shown and described, it is envisioned that those skilled in the art may devise various modifications of the present invention without departing from the spirit and scope of the appended claims.

ACTIVE SET

| RAW NUMBER | CELL COLUMN COMBINATION k Value-> 0 1 2 3 4 5 6 7 |
|---|---|
| 369 | 2,1,0,2,1,0,1,0 |
| 875 | 2,0,1,2,1,0,1,0 |
| 902 | 2,0,1,0,2,0,1,0 |
| 907 | 1,2,1,0,2,0,1,0 |
| 914 | 2,1,2,0,2,0,1,0 |
| 923 | 2,1,0,1,2,0,1,0 |
| 938 | 2,0,2,1,2,0,1,0 |
| 1247 | 2,1,0,1,0,2,1,0 |
| 1249 | 1,2,0,1,0,2,1,0 |
| 1265 | 2,1,2,1,0,2,1,0 |
| 1280 | 2,0,1,2,0,2,1,0 |
| 1285 | 1,2,1,2,0,2,1,0 |
| 1307 | 2,0,1,0,1,2,1,0 |
| 1312 | 1,2,1,0,1,2,1,0 |
| 1315 | 1,0,2,0,1,2,1,0 |
| 1319 | 2,1,2,0,1,2,1,0 |
| 1357 | 1,2,0,2,1,2,1,0 |
| 1555 | 1,2,1,0,1,0,2,0 |
| 1558 | 1,0,2,0,1,0,2,0 |
| 1562 | 2,1,2,0,1,0,2,0 |
| 1600 | 1,2,0,2,1,0,2,0 |
| 1603 | 1,0,1,2,1,0,2,0 |
| 1666 | 1,0,2,1,2,0,2,0 |
| 1735 | 1,2,0,1,0,1,2,0 |
| 1747 | 1,0,2,1,0,1,2,0 |
| 1751 | 2,1,2,1,0,1,2,0 |
| 1760 | 2,1,0,2,0,1,2,0 |
| 1765 | 1,0,1,2,0,1,2,0 |
| 1874 | 2,0,1,0,2,1,2,0 |
| 1879 | 1,2,1,0,2,1,2,0 |
| 1882 | 1,0,2,0,2,1,2,0 |
| 1886 | 2,1,2,0,2,1,2,0 |
| 1895 | 2,1,0,1,2,1,2,0 |
| 2489 | 2,1,0,2,0,1,0,1 |
| 2495 | 2,0,1,2,0,1,0,1 |
| 2603 | 2,0,1,0,2,1,0,1 |
| 2607 | 0,2,1,0,2,1,0,1 |
| 2615 | 2,1,2,0,2,1,0,1 |
| 2624 | 2,1,0,1,2,1,0,1 |
| 2625 | 0,2,0,1,2,1,0,1 |
| 2639 | 2,0,2,1,2,1,0,1 |
| 2705 | 2,1,0,1,0,2,0,1 |
| 2706 | 0,2,0,1,0,2,0,1 |
| 2720 | 2,0,2,1,0,2,0,1 |

ACTIVE SET

| RAW NUMBER | CELL COLUMN COMBINATION k Value-> 0 1 2 3 4 5 6 7 |
|---|---|
| 2721 | 0,1,2,1,0,2,0,1 |
| 2733 | 2,0,1,2,0,2,0,1 |
| 2769 | 0,2,1,0,1,2,0,1 |
| 2777 | 2,1,2,0,1,2,0,1 |
| 2813 | 2,1,0,2,1,2,0,1 |
| 2814 | 0,2,0,2,1,2,0,1 |
| 2819 | 2,0,1,2,1,2,0,1 |
| 3741 | 0,2,1,0,1,0,2,1 |
| 3746 | 2,0,2,0,1,0,2,1 |
| 3747 | 0,1,2,0,1,0,2,1 |
| 3791 | 2,0,1,2,1,0,2,1 |
| 3795 | 0,2,1,2,1,0,2,1 |
| 3818 | 2,0,1,0,2,0,2,1 |
| 3822 | 0,2,1,0,2,0,2,1 |
| 3839 | 2,1,0,1,2,0,2,1 |
| 3840 | 0,2,0,1,2,0,2,1 |
| 3854 | 2,0,2,1,2,0,2,1 |
| 3855 | 0,1,2,1,2,0,2,1 |
| 3921 | 0,2,0,1,0,1,2,1 |
| 3935 | 2,0,2,1,0,1,2,1 |
| 3936 | 0,1,2,1,0,1,2,1 |
| 3945 | 0,1,0,2,0,1,2,1 |
| 3957 | 0,2,1,2,0,1,2,1 |
| 4071 | 0,1,2,0,2,1,2,1 |
| 4663 | 1,0,2,1,0,1,0,2 |
| 4674 | 0,1,0,2,0,1,0,2 |
| 4678 | 1,2,0,2,0,1,0,2 |
| 4681 | 1,0,1,2,0,1,0,2 |
| 4686 | 0,2,1,2,0,1,0,2 |
| 4739 | 1,0,1,0,2,1,0,2 |
| 4795 | 1,2,1,0,2,1,0,2 |
| 4798 | 1,0,2,0,2,1,0,2 |
| 4800 | 0,1,2,0,2,1,0,2 |
| 4809 | 0,1,0,1,2,1,0,2 |
| 4894 | 1,2,0,1,0,2,0,2 |
| 4906 | 1,0,2,1,0,2,0,2 |
| 4957 | 1,2,1,0,1,2,0,2 |
| 4960 | 1,0,2,0,1,2,0,2 |
| 4962 | 0,1,2,0,1,2,0,2 |
| 4998 | 0,1,0,2,1,2,0,2 |
| 5002 | 1,2,0,2,1,2,0,2 |
| 5005 | 1,0,1,2,1,2,0,2 |
| 5203 | 1,0,2,0,1,0,1,2 |
| 5205 | 0,1,2,0,1,0,1,2 |
| 5241 | 0,1,0,2,0,1,1,2 |
| 5245 | 1,2,0,2,0,1,1,2 |
| 5248 | 1,0,1,2,0,1,1,2 |
| 5253 | 0,2,1,2,0,1,1,2 |
| 5275 | 1,0,1,0,2,0,1,2 |
| 5280 | 0,2,1,0,2,0,1,2 |
| 5298 | 0,2,0,1,2,0,1,2 |

APPENDIX A

| | |
|---|---|
| 5299 | 1,2,0,1,2,0,1,2 |
| 5311 | 1,0,2,1,2,0,1,2 |
| 5313 | 0,1,2,1,2,0,1,2 |
| 5622 | 0,2,0,1,0,2,1,2 |
| 5635 | 1,0,2,1,0,2,1,2 |
| 5637 | 0,1,2,1,0,2,1,2 |
| 5646 | 0,1,0,2,0,2,1,2 |
| 5653 | 1,0,1,2,0,2,1,2 |
| 5658 | 0,2,1,2,0,2,1,2 |
| 5685 | 0,2,1,0,1,2,1,2 |
| 5691 | 0,1,2,0,1,2,1,2 |

APPENDIX A

VALID SET

| RAW NUMBER | CELL COLUMN COMBINATION k Value-> 0 1 2 3 4 5 6 7 |
|---|---|
| 820 | 1,0,1,0,1,0,1,0 |
| 821 | 2,0,1,0,1,0,1,0 |
| 826 | 1,2,1,0,1,0,1,0 |
| 829 | 1,0,2,0,1,0,1,0 |
| 830 | 2,0,2,0,1,0,1,0 |
| 833 | 2,1,2,0,1,0,1,0 |
| 869 | 2,1,0,2,1,0,1,0 |
| 871 | 1,2,0,2,1,0,1,0 |
| 874 | 1,0,1,2,1,0,1,0 |
| 875 | 2,0,1,2,1,0,1,0 |
| 880 | 1,2,1,2,1,0,1,0 |
| 901 | 1,0,1,0,2,0,1,0 |
| 902 | 2,0,1,0,2,0,1,0 |
| 907 | 1,2,1,0,2,0,1,0 |
| 910 | 1,0,2,0,2,0,1,0 |
| 911 | 2,0,2,0,2,0,1,0 |
| 914 | 2,1,2,0,2,0,1,0 |
| 923 | 2,1,0,1,2,0,1,0 |
| 925 | 1,2,0,1,2,0,1,0 |
| 937 | 1,0,2,1,2,0,1,0 |
| 938 | 2,0,2,1,2,0,1,0 |
| 941 | 2,1,2,1,2,0,1,0 |
| 1244 | 2,1,0,1,0,2,1,0 |
| 1249 | 1,2,0,1,0,2,1,0 |
| 1261 | 1,0,2,1,0,2,1,0 |
| 1262 | 2,0,2,1,0,2,1,0 |
| 1265 | 2,1,2,1,0,2,1,0 |
| 1274 | 2,1,0,2,0,2,1,0 |
| 1276 | 1,2,0,2,0,2,1,0 |
| 1279 | 1,0,1,2,0,2,1,0 |
| 1280 | 2,0,1,2,0,2,1,0 |
| 1285 | 1,2,1,2,0,2,1,0 |
| 1306 | 1,0,1,0,1,2,1,0 |
| 1307 | 2,0,1,0,1,2,1,0 |
| 1312 | 1,2,1,0,1,2,1,0 |
| 1315 | 1,0,2,0,1,2,1,0 |
| 1316 | 2,0,2,0,1,2,1,0 |
| 1319 | 2,1,2,0,1,2,1,0 |
| 1355 | 2,1,0,2,1,2,1,0 |
| 1357 | 1,2,0,2,1,2,1,0 |
| 1360 | 1,0,1,2,1,2,1,0 |
| 1361 | 2,0,1,2,1,2,1,0 |
| 1366 | 1,2,1,2,1,2,1,0 |
| 1549 | 1,0,1,0,1,0,2,0 |

VALID SET

| RAW NUMBER | CELL COLUMN COMBINATION k Value-> 0 1 2 3 4 5 6 7 |
|---|---|
| 1550 | 2,0,1,0,1,0,2,0 |
| 1555 | 1,2,1,0,1,0,2,0 |
| 1558 | 1,0,2,0,1,0,2,0 |
| 1559 | 2,0,2,0,1,0,2,0 |
| 1562 | 2,1,2,0,1,0,2,0 |
| 1598 | 2,1,0,2,1,0,2,0 |
| 1600 | 1,2,0,2,1,0,2,0 |
| 1603 | 1,0,1,2,1,0,2,0 |
| 1604 | 2,0,1,2,1,0,2,0 |
| 1609 | 1,2,1,2,1,0,2,0 |
| 1630 | 1,0,1,0,2,0,2,0 |
| 1631 | 2,0,1,0,2,0,2,0 |
| 1636 | 1,2,1,0,2,0,2,0 |
| 1639 | 1,0,2,0,2,0,2,0 |
| 1640 | 2,0,2,0,2,0,2,0 |
| 1643 | 2,1,2,0,2,0,2,0 |
| 1652 | 2,1,0,1,2,0,2,0 |
| 1654 | 1,2,0,1,2,0,2,0 |
| 1666 | 1,0,2,1,2,0,2,0 |
| 1667 | 2,0,2,1,2,0,2,0 |
| 1670 | 2,1,2,1,2,0,2,0 |
| 1733 | 2,1,0,1,0,1,2,0 |
| 1735 | 1,2,0,1,0,1,2,0 |
| 1747 | 1,0,2,1,0,1,2,0 |
| 1748 | 2,0,2,1,0,1,2,0 |
| 1751 | 2,1,2,1,0,1,2,0 |
| 1760 | 2,1,0,2,0,1,2,0 |
| 1762 | 1,2,0,2,0,1,2,0 |
| 1765 | 1,0,1,2,0,1,2,0 |
| 1766 | 2,0,1,2,0,1,2,0 |
| 1771 | 1,2,1,2,0,1,2,0 |
| 1873 | 1,0,1,0,2,1,2,0 |
| 1874 | 2,0,1,0,2,1,2,0 |
| 1879 | 1,2,1,0,2,1,2,0 |
| 1882 | 1,0,2,0,2,1,2,0 |
| 1883 | 2,0,2,0,2,1,2,0 |
| 1886 | 2,1,2,0,2,1,2,0 |
| 1895 | 2,1,0,1,2,1,2,0 |
| 1897 | 1,2,0,1,2,1,2,0 |
| 1909 | 1,0,2,1,2,1,2,0 |
| 1910 | 2,0,2,1,2,1,2,0 |
| 1913 | 2,1,2,1,2,1,2,0 |
| 2460 | 0,1,0,1,0,1,0,1 |
| 2462 | 2,1,0,1,0,1,0,1 |
| 2463 | 0,2,0,1,0,1,0,1 |
| 2477 | 2,0,2,1,0,1,0,1 |
| 2478 | 0,1,2,1,0,1,0,1 |
| 2480 | 2,1,2,1,0,1,0,1 |
| 2487 | 0,1,0,2,0,1,0,1 |
| 2489 | 2,1,0,2,0,1,0,1 |
| 2490 | 0,2,0,2,0,1,0,1 |

APPENDIX B

| | | | |
|---|---|---|---|
| 2495 | 2,0,1,2,0,1,0,1 | 3840 | 0,2,0,1,2,0,2,1 |
| 2499 | 0,2,1,2,0,1,0,1 | 3854 | 2,0,2,1,2,0,2,1 |
| 2603 | 2,0,1,0,2,1,0,1 | 3855 | 0,1,2,1,2,0,2,1 |
| 2607 | 0,2,1,0,2,1,0,1 | 3857 | 2,1,2,1,2,0,2,1 |
| 2612 | 2,0,2,0,2,1,0,1 | 3918 | 0,1,0,1,0,1,2,1 |
| 2613 | 0,1,2,0,2,1,0,1 | 3920 | 2,1,0,1,0,1,2,1 |
| 2615 | 2,1,2,0,2,1,0,1 | 3921 | 0,2,0,1,0,1,2,1 |
| 2622 | 0,1,0,1,2,1,0,1 | 3935 | 2,0,2,1,0,1,2,1 |
| 2624 | 2,1,0,1,2,1,0,1 | 3936 | 0,1,2,1,0,1,2,1 |
| 2625 | 0,2,0,1,2,1,0,1 | 3938 | 2,1,2,1,0,1,2,1 |
| 2639 | 2,0,2,1,2,1,0,1 | 3945 | 0,1,0,2,0,1,2,1 |
| 2640 | 0,1,2,1,2,1,0,1 | 3947 | 2,1,0,2,0,1,2,1 |
| 2642 | 2,1,2,1,2,1,0,1 | 3948 | 0,2,0,2,0,1,2,1 |
| 2703 | 0,1,0,1,0,2,0,1 | 3953 | 2,0,1,2,0,1,2,1 |
| 2705 | 2,1,0,1,0,2,0,1 | 3957 | 0,2,1,2,0,1,2,1 |
| 2706 | 0,2,0,1,0,2,0,1 | 4061 | 2,0,1,0,2,1,2,1 |
| 2720 | 2,0,2,1,0,2,0,1 | 4065 | 0,2,1,0,2,1,2,1 |
| 2721 | 0,1,2,1,0,2,0,1 | 4070 | 2,0,2,0,2,1,2,1 |
| 2723 | 2,1,2,1,0,2,0,1 | 4071 | 0,1,2,0,2,1,2,1 |
| 2730 | 0,1,0,2,0,2,0,1 | 4073 | 2,1,2,0,2,1,2,1 |
| 2732 | 2,1,0,2,0,2,0,1 | 4080 | 0,1,0,1,2,1,2,1 |
| 2733 | 0,2,0,2,0,2,0,1 | 4082 | 2,1,0,1,2,1,2,1 |
| 2738 | 2,0,1,2,0,2,0,1 | 4083 | 0,2,0,1,2,1,2,1 |
| 2742 | 0,2,1,2,0,2,0,1 | 4097 | 2,0,2,1,2,1,2,1 |
| 2765 | 2,0,1,0,1,2,0,1 | 4098 | 0,1,2,1,2,1,2,1 |
| 2769 | 0,2,1,0,1,2,0,1 | 4100 | 2,1,2,1,2,1,2,1 |
| 2774 | 2,0,2,0,1,2,0,1 | 4647 | 0,1,0,1,0,1,0,2 |
| 2775 | 0,1,2,0,1,2,0,1 | 4650 | 0,2,0,1,0,1,0,2 |
| 2777 | 2,1,2,0,1,2,0,1 | 4651 | 1,2,0,1,0,1,0,2 |
| 2811 | 0,1,0,2,1,2,0,1 | 4663 | 1,0,2,1,0,1,0,2 |
| 2813 | 2,1,0,2,1,2,0,1 | 4665 | 0,1,2,1,0,1,0,2 |
| 2814 | 0,2,0,2,1,2,0,1 | 4674 | 0,1,0,2,0,1,0,2 |
| 2819 | 2,0,1,2,1,2,0,1 | 4677 | 0,2,0,2,0,1,0,2 |
| 2823 | 0,2,1,2,1,2,0,1 | 4678 | 1,2,0,2,0,1,0,2 |
| 3737 | 2,0,1,0,1,0,2,1 | 4681 | 1,0,1,2,0,1,0,2 |
| 3741 | 0,2,1,0,1,0,2,1 | 4686 | 0,2,1,2,0,1,0,2 |
| 3746 | 2,0,2,0,1,0,2,1 | 4687 | 1,2,1,2,0,1,0,2 |
| 3747 | 0,1,2,0,1,0,2,1 | 4789 | 1,0,1,0,2,1,0,2 |
| 3749 | 2,1,2,0,1,0,2,1 | 4794 | 0,2,1,0,2,1,0,2 |
| 3783 | 0,1,0,2,1,0,2,1 | 4795 | 1,2,1,0,2,1,0,2 |
| 3785 | 2,1,0,2,1,0,2,1 | 4798 | 1,0,2,0,2,1,0,2 |
| 3786 | 0,2,0,2,1,0,2,1 | 4800 | 0,1,2,0,2,1,0,2 |
| 3791 | 2,0,1,2,1,0,2,1 | 4809 | 0,1,0,1,2,1,0,2 |
| 3795 | 0,2,1,2,1,0,2,1 | 4812 | 0,2,0,1,2,1,0,2 |
| 3818 | 2,0,1,0,2,0,2,1 | 4813 | 1,2,0,1,2,1,0,2 |
| 3822 | 0,2,1,0,2,0,2,1 | 4825 | 1,0,2,1,2,1,0,2 |
| 3827 | 2,0,2,0,2,0,2,1 | 4827 | 0,1,2,1,2,1,0,2 |
| 3828 | 0,1,2,0,2,0,2,1 | 4890 | 0,1,0,1,0,2,0,2 |
| 3830 | 2,1,2,0,2,0,2,1 | 4893 | 0,2,0,1,0,2,0,2 |
| 3837 | 0,1,0,1,2,0,2,1 | 4894 | 1,2,0,1,0,2,0,2 |
| 3839 | 2,1,0,1,2,0,2,1 | 4906 | 1,0,2,1,0,2,0,2 |

APPENDIX B

| | | | |
|---|---|---|---|
| 4908 | 0,1,2,1,0,2,0,2 | 5685 | 0,2,1,0,1,2,1,2 |
| 4917 | 0,1,0,2,0,2,0,2 | 5686 | 1,2,1,0,1,2,1,2 |
| 4920 | 0,2,0,2,0,2,0,2 | 5689 | 1,0,2,0,1,2,1,2 |
| 4921 | 1,2,0,2,0,2,0,2 | 5691 | 0,1,2,0,1,2,1,2 |
| 4924 | 1,0,1,2,0,2,0,2 | 5727 | 0,1,0,2,1,2,1,2 |
| 4929 | 0,2,1,2,0,2,0,2 | 5730 | 0,2,0,2,1,2,1,2 |
| 4930 | 1,2,1,2,0,2,0,2 | 5731 | 1,2,0,2,1,2,1,2 |
| 4951 | 1,0,1,0,1,2,0,2 | 5734 | 1,0,1,2,1,2,1,2 |
| 4956 | 0,2,1,0,1,2,0,2 | 5739 | 0,2,1,2,1,2,1,2 |
| 4957 | 1,2,1,0,1,2,0,2 | 5740 | 1,2,1,2,1,2,1,2 |
| 4960 | 1,0,2,0,1,2,0,2 | | |
| 4962 | 0,1,2,0,1,2,0,2 | | |
| 4998 | 0,1,0,2,1,2,0,2 | | |
| 5001 | 0,2,0,2,1,2,0,2 | | |
| 5002 | 1,2,0,2,1,2,0,2 | | |
| 5005 | 1,0,1,2,1,2,0,2 | | |
| 5010 | 0,2,1,2,1,2,0,2 | | |
| 5011 | 1,2,1,2,1,2,0,2 | | |
| 5194 | 1,0,1,0,1,0,1,2 | | |
| 5199 | 0,2,1,0,1,0,1,2 | | |
| 5200 | 1,2,1,0,1,0,1,2 | | |
| 5203 | 1,0,2,0,1,0,1,2 | | |
| 5205 | 0,1,2,0,1,0,1,2 | | |
| 5241 | 0,1,0,2,1,0,1,2 | | |
| 5244 | 0,2,0,2,1,0,1,2 | | |
| 5245 | 1,2,0,2,1,0,1,2 | | |
| 5248 | 1,0,1,2,1,0,1,2 | | |
| 5253 | 0,2,1,2,1,0,1,2 | | |
| 5254 | 1,2,1,2,1,0,1,2 | | |
| 5275 | 1,0,1,0,2,0,1,2 | | |
| 5280 | 0,2,1,0,2,0,1,2 | | |
| 5281 | 1,2,1,0,2,0,1,2 | | |
| 5284 | 1,0,2,0,2,0,1,2 | | |
| 5286 | 0,1,2,0,2,0,1,2 | | |
| 5295 | 0,1,0,1,2,0,1,2 | | |
| 5298 | 0,2,0,1,2,0,1,2 | | |
| 5299 | 1,2,0,1,2,0,1,2 | | |
| 5311 | 1,0,2,1,2,0,1,2 | | |
| 5313 | 0,1,2,1,2,0,1,2 | | |
| 5619 | 0,1,0,1,0,2,1,2 | | |
| 5622 | 0,2,0,1,0,2,1,2 | | |
| 5623 | 1,2,0,1,0,2,1,2 | | |
| 5635 | 1,0,2,1,0,2,1,2 | | |
| 5637 | 0,1,2,1,0,2,1,2 | | |
| 5646 | 0,1,0,2,0,2,1,2 | | |
| 5649 | 0,2,0,2,0,2,1,2 | | |
| 5650 | 1,2,0,2,0,2,1,2 | | |
| 5653 | 1,0,1,2,0,2,1,2 | | |
| 5658 | 0,2,1,2,0,2,1,2 | | |
| 5659 | 1,2,1,2,0,2,1,2 | | |
| 5680 | 1,0,1,0,1,2,1,2 | | |

APPENDIX B

ACTIVE SET DATA VALUES

| RAW NUMBER | CELL COLUMN COMBINATION k Value->0 1 2 3 4 5 6 7 | DATA VALUE | RAW NUMBER | CELL COLUMN COMBINATION k Value->0 1 2 3 4 5 6 7 | DATA VALUE |
|---|---|---|---|---|---|
| 869 | 2,1,0,2,1,0,1,0 | 0 | 2705 | 2,1,0,1,0,2,0,1 | 41 |
| 875 | 2,0,1,2,1,0,1,0 | 1 | 2706 | 0,2,0,1,0,2,0,1 | 42 |
| 902 | 2,0,1,0,2,0,1,0 | 2 | 2720 | 2,0,2,1,0,2,0,1 | 43 |
| 907 | 1,2,1,0,2,0,1,0 | 3 | 2721 | 0,1,2,1,0,2,0,1 | 44 |
| 914 | 2,1,2,0,2,0,1,0 | 4 | 2738 | 2,0,1,2,0,2,0,1 | 45 |
| 923 | 2,1,0,1,2,0,1,0 | 5 | 2769 | 0,2,1,0,1,2,0,1 | 46 |
| 933 | 2,0,2,1,2,0,1,0 | 6 | | | |
| 1247 | 2,1,0,1,0,2,1,0 | 7 | | | |
| 1249 | 1,2,0,1,0,2,1,0 | 8 | | | |
| 1265 | 2,1,2,1,0,2,1,0 | 9 | | | |
| 1280 | 2,0,1,2,0,2,1,0 | 10 | | | |
| 1285 | 1,2,1,2,0,2,1,0 | 11 | | | |
| 1307 | 2,0,1,0,1,2,1,0 | 12 | | | |
| 1312 | 1,2,1,0,1,2,1,0 | 13 | | | |
| 1315 | 1,0,2,0,1,2,1,0 | 14 | | | |
| 1319 | 2,1,2,0,1,2,1,0 | 15 | | | |
| 1357 | 1,2,0,2,1,2,1,0 | 16 | | | |
| 1555 | 1,2,1,0,1,0,2,0 | 17 | | | |
| 1558 | 1,0,2,0,1,0,2,0 | 18 | | | |
| 1562 | 2,1,2,0,1,0,2,0 | 19 | | | |
| 1600 | 1,2,0,2,1,0,2,0 | 20 | | | |
| 1603 | 1,0,1,2,1,0,2,0 | 21 | | | |
| 1666 | 1,0,2,1,2,0,2,0 | 22 | | | |
| 1735 | 1,2,0,1,0,1,2,0 | 23 | | | |
| 1747 | 1,0,2,1,0,1,2,0 | 24 | | | |
| 1751 | 2,1,2,1,0,1,2,0 | 25 | | | |
| 1760 | 2,1,0,2,0,1,2,0 | 26 | | | |
| 1765 | 1,0,1,2,0,1,2,0 | 27 | | | |
| 1874 | 2,0,1,0,2,1,2,0 | 28 | | | |
| 1879 | 1,2,1,0,2,1,2,0 | 29 | | | |
| 1882 | 1,0,2,0,2,1,2,0 | 30 | | | |
| 1886 | 2,1,2,0,2,1,2,0 | 31 | | | |
| 1895 | 2,1,0,1,2,1,2,0 | 32 | | | |
| 2489 | 2,1,0,2,0,1,0,1 | 33 | | | |
| 2495 | 2,0,1,2,0,1,0,1 | 34 | | | |
| 2603 | 2,0,1,0,2,1,0,1 | 35 | | | |
| 2607 | 0,2,1,0,2,1,0,1 | 36 | | | |
| 2615 | 2,1,2,0,2,1,0,1 | 37 | | | |
| 2624 | 2,1,0,1,2,1,0,1 | 38 | | | |
| 2625 | 0,2,0,1,2,1,0,1 | 39 | | | |
| 2639 | 2,0,2,1,2,1,0,1 | 40 | | | |

APPENDIX C

ACTIVE SET
REED-SOLOMAN VALUES

| RAW NUMBER | CELL COLUMN COMBINATION k Value-> 0 1 2 3 4 5 6 7 | REED SOLOMAN VALUE | RAW NUMBER | CELL COLUMN COMBINATION k Value-> 0 1 2 3 4 5 6 7 | REED SOLOMAN VALUE |
|---|---|---|---|---|---|
| 2777 | 2,1,2,0,1,2,0,1 | 0 | 4962 | 0,1,2,0,1,2,0,2 | 35 |
| 2813 | 2,1,0,2,1,2,0,1 | 1 | 4998 | 0,1,0,2,1,2,0,2 | 36 |
| 2814 | 0,2,0,2,1,2,0,1 | 2 | 5002 | 1,2,0,2,1,2,0,2 | 37 |
| 2819 | 2,0,1,2,1,2,0,1 | 3 | 5005 | 1,0,1,2,1,2,0,2 | 38 |
| 3741 | 0,2,1,0,1,0,2,1 | 4 | 5622 | 0,2,0,1,0,2,1,2 | 39 |
| 3746 | 2,0,2,0,1,0,2,1 | 5 | 5635 | 1,0,2,1,0,2,1,2 | 40 |
| 3747 | 0,1,2,0,1,0,2,1 | 6 | 5637 | 0,1,2,1,0,2,1,2 | 41 |
| 3791 | 2,0,1,2,1,0,2,1 | 7 | 5646 | 0,1,0,2,0,2,1,2 | 42 |
| 3795 | 0,2,1,2,1,0,2,1 | 8 | 5653 | 1,0,1,2,0,2,1,2 | 43 |
| 3818 | 2,0,1,0,2,0,2,1 | 9 | 5658 | 0,2,1,2,0,2,1,2 | 44 |
| 3822 | 0,2,1,0,2,0,2,1 | 10 | 5685 | 0,2,1,0,1,2,1,2 | 45 |
| 3839 | 2,1,0,1,2,0,2,1 | 11 | 5691 | 0,1,2,0,1,2,1,2 | 46 |
| 3840 | 0,2,0,1,2,0,2,1 | 12 | | | |
| 3854 | 2,0,2,1,2,0,2,1 | 13 | | | |
| 3855 | 0,1,2,1,2,0,2,1 | 14 | | | |
| 3921 | 0,2,0,1,0,1,2,1 | 15 | | | |
| 3935 | 2,0,2,1,0,1,2,1 | 16 | | | |
| 3936 | 0,1,2,1,0,1,2,1 | 17 | | | |
| 3945 | 0,1,0,2,0,1,2,1 | 18 | | | |
| 3957 | 0,2,1,2,0,1,2,1 | 19 | | | |
| 4071 | 0,1,2,0,2,1,2,1 | 20 | | | |
| 4663 | 1,0,2,1,0,1,0,2 | 21 | | | |
| 4674 | 0,1,0,2,0,1,0,2 | 22 | | | |
| 4673 | 1,2,0,2,0,1,0,2 | 23 | | | |
| 4681 | 1,0,1,2,0,1,0,2 | 24 | | | |
| 4686 | 0,2,1,2,0,1,0,2 | 25 | | | |
| 4789 | 1,0,1,0,2,1,0,2 | 26 | | | |
| 4795 | 1,2,1,0,2,1,0,2 | 27 | | | |
| 4798 | 1,0,2,0,2,1,0,2 | 28 | | | |
| 4800 | 0,1,2,0,2,1,0,2 | 29 | | | |
| 4809 | 0,1,0,1,2,1,0,2 | 30 | | | |
| 4894 | 1,2,0,1,0,2,0,2 | 31 | | | |
| 4906 | 1,0,2,1,0,2,0,2 | 32 | | | |
| 4957 | 1,2,1,0,1,2,0,2 | 33 | | | |
| 4960 | 1,0,2,0,1,2,0,2 | 34 | | | |

APPENDIX D

57

ACTIVE SET MISCELCANEOUS VALUES

| RAW NUMBER | CELL COLUMN COMBINATION k'Value-> 0 1 2 3 4 5 6 7 | MISCELANEOUS VALUE |
|---|---|---|
| 5203 | 1,0,2,0,1,0,1,2 | 0 |
| 5205 | 0,1,2,0,1,0,1,2 | 1 |
| 5241 | 0,1,0,2,1,0,1,2 | 2 |
| 5245 | 1,2,0,2,1,0,1,2 | 3 |
| 5248 | 1,0,1,2,1,0,1,2 | 4 |
| 5253 | 0,2,1,2,1,0,1,2 | 5 |
| 5275 | -1,0,1,0,2,0,1,2 | 6 |
| 5280 | 0,2,1,0,2,0,1,2 | 7 |
| 5298 | 0,2,0,1,2,0,1,2 | 8 |
| 5299 | 1,2,0,1,2,0,1,2 | 9 |
| 5311 | 1,0,2,1,2,0,1,2 | 10 |
| 5313 | 0,1,2,1,2,0,1,2 | 11 |

APPENDIX E

ERROR TYPES

| ERROR NUMBER | ERROR DESCRIPTION | ERROR NUMBER | ERROR DESCRIPTION |
|---|---|---|---|
| 1 | ?------- | 56 | ---???-- |
| 2 | -?------ | 57 | ?--???-- |
| 3 | ??------ | 58 | -?-???-- |
| 4 | --?----- | 59 | ??-???-- |
| 5 | ?-?----- | 60 | --????-- |
| 6 | -??----- | 61 | ?-????-- |
| 7 | ???----- | 62 | -?????-- |
| 8 | ---?---- | 63 | ??????-- |
| 9 | ?--?---- | 64 | ------?- |
| 10 | -?-?---- | 65 | ?-----?- |
| 11 | ??-?---- | 66 | -?----?- |
| 12 | --??---- | 67 | ??----?- |
| 13 | ?-??---- | 68 | --?---?- |
| 14 | -???---- | 69 | ?-?---?- |
| 15 | ????---- | 70 | -??---?- |
| 16 | ----?--- | 71 | ???---?- |
| 17 | ?---?--- | 72 | ---?--?- |
| 18 | -?--?--- | 73 | ?--?--?- |
| 19 | ??--?--- | 74 | -?-?--?- |
| 20 | --?-?--- | 75 | ??-?--?- |
| 21 | ?-?-?--- | 76 | --??--?- |
| 22 | -??-?--- | 77 | ?-??--?- |
| 23 | ???-?--- | 78 | -???--?- |
| 24 | ---??--- | 79 | ????--?- |
| 25 | ?--??--- | 80 | ----?-?- |
| 26 | -?-??--- | 81 | ?---?-?- |
| 27 | ??-??--- | 82 | -?--?-?- |
| 28 | --???--- | 83 | ??--?-?- |
| 29 | ?-???--- | 84 | --?-?-?- |
| 30 | -????--- | 85 | ?-?-?-?- |
| 31 | ?????--- | 86 | -??-?-?- |
| 32 | -----?-- | 87 | ???-?-?- |
| 33 | ?----?-- | 88 | ---??-?- |
| 34 | -?---?-- | 89 | ?--??-?- |
| 35 | ??---?-- | 90 | -?-??-?- |
| 36 | --?--?-- | 91 | ??-??-?- |
| 37 | ?-?--?-- | 92 | --???-?- |
| 38 | -??--?-- | 93 | ?-???-?- |
| 39 | ???--?-- | 94 | -????-?- |
| 40 | ---?-?-- | 95 | ?????-?- |
| 41 | ?--?-?-- | 96 | -----??- |
| 42 | -?-?-?-- | 97 | ?----??- |
| 43 | ??-?-?-- | 98 | -?---??- |
| 44 | --??-?-- | 99 | ??---??- |
| 45 | ?-??-?-- | 100 | --?--??- |
| 46 | -???-?-- | 101 | ?-?--??- |
| 47 | ????-?-- | 102 | -??--??- |
| 48 | ----??-- | 103 | ???--??- |
| 49 | ?---??-- | 104 | ---?-??- |
| 50 | -?--??-- | 105 | ?--?-??- |
| 51 | ??--??-- | 106 | -?-?-??- |
| 52 | --?-??-- | 107 | ??-?-??- |
| 53 | ?-?-??-- | 108 | --??-??- |
| 54 | -??-??-- | 109 | ?-??-??- |
| 55 | ???-??-- | 110 | -???-??- |
|  |  | 111 | ????-??- |
|  |  | 112 | ----???- |

APPENDIX F

| | |
|---|---|
| 113 | ?---???- |
| 114 | -?--???- |
| 115 | ??--???- |
| 116 | --?-???- |
| 117 | ?-?-???- |
| 118 | -??-???- |
| 119 | ???-???- |
| 120 | ---????- |
| 121 | ?--????- |
| 122 | -?-????- |
| 123 | ??-????- |
| 124 | --?????- |
| 125 | ?-?????- |
| 126 | -??????- |
| 127 | ???????- |
| 128 | -------? |
| 129 | ?------? |
| 130 | --?-----? |
| 131 | ??------? |
| 132 | --?----? |
| 133 | ?-?----? |
| 134 | -??----? |
| 135 | ???----? |
| 136 | ---?---? |
| 137 | ?--?---? |
| 138 | -?-?---? |
| 139 | ??-?---? |
| 140 | --??---? |
| 141 | ?-??---? |
| 142 | -???---? |
| 143 | ????---? |
| 144 | ----?--? |
| 145 | ?---?--? |
| 146 | -?--?--? |
| 147 | ??--?--? |
| 148 | --?-?--? |
| 149 | ?-?-?--? |
| 150 | -??-?--? |
| 151 | ???-?--? |
| 152 | ---??--? |
| 153 | ?--??--? |
| 154 | -?-??--? |
| 155 | ??-??--? |
| 156 | --???--? |
| 157 | ?-???--? |
| 158 | -????--? |
| 159 | ?????--? |
| 160 | -----?-? |
| 161 | ?----?-? |
| 162 | -?---?-? |
| 163 | ??---?-? |
| 164 | --?--?-? |
| 165 | ?-?--?-? |
| 166 | -??--?-? |
| 167 | ???--?-? |
| 168 | ---?-?-? |
| 169 | ?--?-?-? |
| 170 | -?-?-?-? |
| 171 | ??-?-?-? |
| 172 | --??-?-? |
| 173 | ?-??-?-? |
| 174 | -???-?-? |
| 175 | ????-?-? |
| 176 | ----??-? |
| 177 | ?---??-? |
| 178 | -?--??-? |
| 179 | ??--??-? |
| 180 | --?-??-? |
| 181 | ?-?-??-? |
| 182 | -??-??-? |
| 183 | ???-??-? |
| 184 | ---???-? |
| 185 | ?--???-? |
| 186 | -?-???-? |
| 187 | -??-???-? |
| 188 | --????-? |
| 189 | ?-????-? |
| 190 | -?????-? |
| 191 | ??????-? |
| 192 | ------?? |
| 193 | ?-----?? |
| 194 | -?----?? |
| 195 | ??----?? |
| 196 | --?---?? |
| 197 | ?-?---?? |
| 198 | -??---?? |
| 199 | ???---?? |
| 200 | ---?--?? |
| 201 | ?--?--?? |
| 202 | -?-?--?? |
| 203 | ??-?--?? |
| 204 | --??--?? |
| 205 | ?-??--?? |
| 206 | -???--?? |
| 207 | ????--?? |
| 208 | ----?-?? |
| 209 | ?---?-?? |
| 210 | -?--?-?? |
| 211 | ??--?-?? |
| 212 | --?-?-?? |
| 213 | ?-?-?-?? |
| 214 | -??-?-?? |
| 215 | ???-?-?? |
| 216 | ---??-?? |
| 217 | ?--??-?? |
| 218 | -?-??-?? |
| 219 | ??-??-?? |
| 220 | --???-?? |
| 221 | ?-???-?? |
| 222 | -????-?? |
| 223 | ?????-?? |
| 224 | -----??? |
| 225 | ?----??? |
| 226 | -?---??? |
| 227 | ??---??? |

APPENDIX F

```
228      --?--???
229      ?-?--???
230      -??--???
231      ???--???
232      ---?-???
233      ?--?-???
234      -?-?-???
235      ??-?-???
236      --??-???
237      ?-??-???
238      -???-???
239      ????-???
240      ----????
241      ?---????
242      -?--????
243      ??--????
244      --?-????
245      ?-?-????
246      -??-????
247      ???-????
248      ---?????
249      ?--?????
250      -?-?????
251      ??-?????
252      --??????
253      ?-??????
254      -???????
255      ????????
```

APPENDIX F

// main.cpp

```cpp
#include <stdio.h>
#include <math.h>
#include "def.h"
#include "global.h"
#include "Element.h"
#include "Pixel_column.h"
#include "Utilities.h"

void main( void )
{
        UWORD i,j;
        UWORD temp, attempt;
        FILE *stream;
        ACTIVE_PC_STRUCT the_actual_stats;
        stream = fopen( "text.out", "w" );
        stream1 = fopen( "dump.out", "w" );
        stream1_flag = FALSE;
        Utilities utility_object;
        utility_object.create_global_set();
        utility_object.print_global_set(stream);
        utility_object.create_valid_set();
        utility_object.print_valid_set(stream);
        utility_object.create_active_set();
        utility_object.print_active_set(stream);

Pixel_column tc;

for ( attempt=0; attempt<1; attempt++ ) {
                utility_object.create_active_set();
                printf( "\r\nATTEMPT # %u", attempt );
                for ( i=0; i<ACTIVE_SET_SIZE; i++ ) {
                        trials[0].active_set[i].raw_num = 0;
                        trials[0].active_set[i].single_bit_solutions = (float)0;
                        trials[0].active_set[i].double_bit_solutions = (float)0;
                        trials[0].active_set[i].triple_bit_solutions = (float)0;
                        trials[0].active_set[i].tripleplus_bit_solutions = (float)0;
                }
                trials[0].single_bit_solutions_avg = (float)0;
                trials[0].double_bit_solutions_avg = (float)0;
```

APPENDIX G

```
trials[0].triple_bit_solutions_avg = (float)0;
trials[0].tripleplus_bit_solutions_avg = (float)0;
trials[0].single_bit_solutions_std_dev = (float)0;
trials[0].double_bit_solutions_std_dev = (float)0;
trials[0].triple_bit_solutions_std_dev = (float)0;
trials[0].tripleplus_bit_solutions_std_dev = (float)0;

for ( i=0; i<ACTIVE_SET_SIZE; i++ ) {
        tc.set_raw_value(active_set[i].get_raw_value());
        tc.generate_stats();
        tc.get_actual_stats( &the_actual_stats );
        trials[0].active_set[i].raw_num = tc.get_raw_value();
        trials[0].active_set[i].single_bit_solutions     =
(float)((float)(the_actual_stats.single_bit_solutions*(float)100)/(float)(pow(2,HEIGHT)-
1));
        trials[0].active_set[i].double_bit_solutions     =
(float)((float)(the_actual_stats.double_bit_solutions*(float)100)/(float)(pow(2,HEIGHT)-
1));
        trials[0].active_set[i].triple_bit_solutions     =
(float)((float)(the_actual_stats.triple_bit_solutions*(float)100)/(float)(pow(2,HEIGHT)-
1));
        trials[0].active_set[i].tripleplus_bit_solutions     =
(float)((float)(the_actual_stats.tripleplus_bit_solutions*(float)100)/(float)(pow(2,HEIGHT)-1));
        }
// calculate average and std_dev information
for ( i=0; i< ACTIVE_SET_SIZE; i++ ) {
        trials[0].single_bit_solutions_avg      +=
trials[0].active_set[i].single_bit_solutions;
        trials[0].double_bit_solutions_avg      +=
trials[0].active_set[i].double_bit_solutions;
        trials[0].triple_bit_solutions_avg      +=
trials[0].active_set[i].triple_bit_solutions;
        trials[0].tripleplus_bit_solutions_avg  +=
trials[0].active_set[i].tripleplus_bit_solutions;
        }
trials[0].single_bit_solutions_avg /= (float)ACTIVE_SET_SIZE;
trials[0].double_bit_solutions_avg /= (float)ACTIVE_SET_SIZE;
trials[0].triple_bit_solutions_avg /= (float)ACTIVE_SET_SIZE;
trials[0].tripleplus_bit_solutions_avg /= (float)ACTIVE_SET_SIZE;

for ( i=0; i< ACTIVE_SET_SIZE; i++ ) {
        trials[0].single_bit_solutions_std_dev     +=     (float)pow(
```

APPENDIX G

```
                (trials[0].active_set[i].single_bit_solutions - trials[0].single_bit_solutions_avg), 2 );
                            trials[0].double_bit_solutions_std_dev    +=      (float)pow(
                (trials[0].active_set[i].double_bit_solutions - trials[0].double_bit_solutions_avg), 2 );
                            trials[0].triple_bit_solutions_std_dev    +=      (float)pow(
 5              (trials[0].active_set[i].triple_bit_solutions - trials[0].triple_bit_solutions_avg), 2 );
                            trials[0].tripleplus_bit_solutions_std_dev  +=    (float)pow(
                (trials[0].active_set[i].tripleplus_bit_solutions - trials[0].tripleplus_bit_solutions_avg),
                2 );
                        }

10                      trials[0].single_bit_solutions_std_dev /= ((float)ACTIVE_SET_SIZE -1);
                        trials[0].single_bit_solutions_std_dev    =
                (float)sqrt(trials[0].single_bit_solutions_std_dev);
                        trials[0].double_bit_solutions_std_dev/=((float)ACTIVE_SET_SIZE-1);
                        trials[0].double_bit_solutions_std_dev    =
15              (float)sqrt(trials[0].double_bit_solutions_std_dev);
                        trials[0].triple_bit_solutions_std_dev /= ((float)ACTIVE_SET_SIZE -1);
                        trials[0].triple_bit_solutions_std_dev    =
                (float)sqrt(trials[0].triple_bit_solutions_std_dev);
                        trials[0].tripleplus_bit_solutions_std_dev /= ((float)ACTIVE_SET_SIZE
20              -1);
                        trials[0].tripleplus_bit_solutions_std_dev    =
                (float)sqrt(trials[0].tripleplus_bit_solutions_std_dev);

// compare and save to the storage area if better
25                      if ( trials[0].single_bit_solutions_avg > trials[1].single_bit_solutions_avg
                ) {
                                // this one is better so save it in area #1
                                fprintf( stream, "\r\nATTEMPT #%u\r\n", attempt );
                                printf ( "\r\nBest Attempt So Far #%u", attempt );

30                              for ( i=0; i<ACTIVE_SET_SIZE; i++ ) {
                                        trials[1].active_set[i].raw_num   =
                trials[0].active_set[i].raw_num;
                                        tc.set_raw_value(trials[1].active_set[i].raw_num);
                                        trials[1].active_set[i].single_bit_solutions   =
35              trials[0].active_set[i].single_bit_solutions;
                                        trials[1].active_set[i].double_bit_solutions   =
                trials[0].active_set[i].double_bit_solutions;
                                        trials[1].active_set[i].triple_bit_solutions   =
                trials[0].active_set[i].triple_bit_solutions;
40                                      trials[1].active_set[i].tripleplus_bit_solutions   =
                trials[0].active_set[i].tripleplus_bit_solutions;
```

APPENDIX G

```
                        tc.fprint_pixel_column(stream);
                        fprintf( stream, "\t%.2f\t%.2f\t%.2f\t%.2f\r\n",
                                (float)trials[1].active_set[i].single_bit_solutions,
                                (float)trials[1].active_set[i].double_bit_solutions,
                                (float)trials[1].active_set[i].triple_bit_solutions,
                                (float)trials[1].active_set[i].tripleplus_bit_solutions
        );
                    }
                    trials[1].single_bit_solutions_avg        =
    trials[0].single_bit_solutions_avg;
                    trials[1].double_bit_solutions_avg        =
    trials[0].double_bit_solutions_avg;
                    trials[1].triple_bit_solutions_avg        =
    trials[0].triple_bit_solutions_avg;
                    trials[1].tripleplus_bit_solutions_avg    =
    trials[0].tripleplus_bit_solutions_avg;
                    trials[1].single_bit_solutions_std_dev    =
    trials[0].single_bit_solutions_std_dev;
                    trials[1].double_bit_solutions_std_dev    =
    trials[0].double_bit_solutions_std_dev;
                    trials[1].triple_bit_solutions_std_dev    =
    trials[0].triple_bit_solutions_std_dev;
                    trials[1].tripleplus_bit_solutions_std_dev =
    trials[0].tripleplus_bit_solutions_std_dev;

fprintf( stream, "\t\t\t%.2f\t%.2f\t%.2f\t%.2f\r\n",
                            (float)trials[1].single_bit_solutions_avg,
                            (float)trials[1].double_bit_solutions_avg,
                            (float)trials[1].triple_bit_solutions_avg,
                            (float)trials[1].tripleplus_bit_solutions_avg );
                    fprintf( stream, "\t\t\t%.2f\t%.2f\t%.2f\t%.2f\r\n",
                            (float)trials[1].single_bit_solutions_std_dev,
                            (float)trials[1].double_bit_solutions_std_dev,
                            (float)trials[1].triple_bit_solutions_std_dev,
                            (float)trials[1].tripleplus_bit_solutions_std_dev );
                }

} // for (attempt...
                fclose( stream );
    // now take the best solution stored in trials location #1 and create a dump file
                stream1_flag = TRUE;  // enable writing of dump file
                // dump the active set in the dump file for archival purposes
                fprintf( stream1, "DUMP FILE\r\nActive set:\r\n" );
```

APPENDIX G

```
                utility_object.print_active_set(stream1);
                for ( i=0; i<1/*ACTIVE_SET_SIZE*/; i++.) {
                        tc.set_raw_value(875/*trials[1].active_set[i].raw_num*/);
                        tc.generate_stats();
5               } fclose( stream1 );
        /*
                printf( "\r\n" );
10              fprintf ( stream, "\r\n" );
                valid_set[10].print_pixel_column();
                valid_set[10].fprint_pixel_column ( stream );
                printf ( "\r\n" );
                fprintf ( stream, "\r\n" );

15              valid_set[10].set_element( 0, UNKNOWN );
                valid_set[10].set_element( 1, UNKNOWN );
                valid_set[10].set_element( 2, UNKNOWN );
                valid_set[10].set_element( 3, UNKNOWN );
                valid_set[10].set_element( 4, UNKNOWN );
20              valid_set[10].set_element( 5, UNKNOWN );
                valid_set[10].set_element( 6, UNKNOWN );

valid_set[10].generate_valid_solutions();
                printf ( "\r\n" );
                fprintf ( stream, "\r\n" );
25              valid_set[10].print_pixel_column();
                valid_set[10].fprint_pixel_column(stream);
                printf ( "\r\n" );
                fprintf ( stream, "\r\n" );

30              Pixel_column temp_column;
                U W O R D *     s o l u t i o n s _ p t r      =       n e w
        UWORD[valid_set[10].get_valid_solutions_sum()];
                valid_set[10].get_valid_solutions( solutions_ptr );
                printf ( "Valid Solutions are:\r\n" );
35              fprintf ( stream, "Valid Solutions are:\r\n" );
                for ( i=0; i<valid_set[10].get_valid_solutions_sum();i++ ) {
                        temp_column.set_raw_value(solutions_ptr[i]);
                        temp_column.print_pixel_column();
                        temp_column.fprint_pixel_column(stream);
40              printf ("\r\n" );
```

APPENDIX G

```
                    fprintf( stream, "\r\n" );
            }
            printf( "Solutions sum--> %u\r\n", valid_set[10].get_valid_solutions_sum() );
            delete solutions_ptr;

5          valid_set[10].generate_active_solutions();
            printf( "\r\n" );
            fprintf( stream, "\r\n" );
            valid_set[10].print_pixel_column();
            valid_set[10].fprint_pixel_column(stream);
10          printf( "\r\n" );
            fprintf( stream, "\r\n" );

Pixel_column temp1_column;
            solutions_ptr = new UWORD[valid_set[10].get_active_solutions_sum()];
15          valid_set[10].get_active_solutions( solutions_ptr );
            printf( "Active Solutions are:\r\n" );
            fprintf( stream, "Active Solutions are:\r\n" );
            for ( i=0; i<valid_set[10].get_active_solutions_sum();i++ ) {
                    temp1_column.set_raw_value(solutions_ptr[i]);
20                  temp1_column.print_pixel_column();
                    temp1_column.fprint_pixel_column(stream);
                    printf( "\r\n" );
                    fprintf( stream, "\r\n" );
            }
25          printf( "Solutions sum--> %u\r\n", valid_set[10].get_active_solutions_sum() );
            */

}

// element.h if !defined( ELEMENT_H )
30   #define ELEMENT_H class Element
     {
     public:
            Element( UBYTE color );           // constructor
35          Element();                                // default constructor
            UBYTE get_value();
            UBYTE get_color_set();
```

APPENDIX G

```
                UBYTE get_color();
                BOOLEAN set_color( UBYTE color );
                BOOLEAN set_element_value( UBYTE element_valueA );
                BOOLEAN set_color_set( UBYTE color_set );
5               ~Element();                              // desctructor
        private:
                UBYTE element_value;
                UBYTE element_color;
                UBYTE element_color_set;
10              void determine_element_parameters_by_color( );
                void determine_element_parameters_by_value( );
                void determine_element_parameters_by_color_set( );
        };

#endif // !defined( ELEMENT_H )

15      // Element.cpp include <stdio.h>
        #include "def.h"
        #include "global.h"
        #include "Element.h"
20      #include "Pixel_column.h"
        #include "Utilities.h"

Element::Element( )
        {
                element_color=RED;
25              element_color_set=ADDITIVE;
        }

Element::Element( UBYTE color )
        {
                element_color = color;
30              determine_element_parameters_by_color( );
        }

UBYTE Element::get_value()
        {
                return (UBYTE)element_value;
35      }

UBYTE Element::get_color_set()
```

APPENDIX G

```
        {
                return (UBYTE)element_color_set;
        }

UBYTE Element::get_color()
 5      {
                return (UBYTE)element_color;
        }

BOOLEAN Element::set_color( UBYTE color )
        {
10              element_color = color;
                determine_element_parameters_by_color();
                return TRUE;
        }

BOOLEAN Element::set_color_set( UBYTE color_set )
15      {
                element_color_set = color_set;
                determine_element_parameters_by_color_set();
                return TRUE;
        }

20      BOOLEAN Element::set_element_value( UBYTE element_valueA )
        {
                if ( (element_valueA >=0) && (element_valueA <=2) || UNKNOWN ) {  //
        Check Base 3
                        element_value = element_valueA;
25                      determine_element_parameters_by_value( );
                        return TRUE;
                }
                return FALSE;
        }

30      void Element::determine_element_parameters_by_color( )
        {
                switch ( element_color )
                {
                case(RED):
35                      element_value=0;
                        element_color_set=ADDITIVE;
                        break;
                case(GREEN):
```

APPENDIX G

```
                    element_value=1;
                    element_color_set=ADDITIVE;
                    break;
             case(BLUE):
 5                  element_value=2;
                    element_color_set=ADDITIVE;
                    break;
             case(CYAN):
                    element_value=0;
10                  element_color_set=SUBTRACTIVE;
                    break;
             case(MAGENTA):
                    element_value=1;
                    element_color_set=SUBTRACTIVE;
15                  break;
             case(YELLOW):
                    element_value=2;
                    element_color_set=SUBTRACTIVE;
                    break;
20           default:
                    element_value=UNKNOWN;
                    break;
             } // switch(color)
      }

25    void Element::determine_element_parameters_by_value( )
      {
             switch ( element_value )
             {
             case(0):
30                  if ( element_color_set == ADDITIVE )
                           element_color=RED;
                    if ( element_color_set == SUBTRACTIVE )
                           element_color=CYAN;
                    break;
35           case(1):
                    if ( element_color_set == ADDITIVE )
                           element_color=GREEN;
                    if ( element_color_set == SUBTRACTIVE )
                           element_color=MAGENTA;
40                  break;
             case(2):
                    if ( element_color_set == ADDITIVE )
```

APPENDIX G

```
                    element_color=BLUE;
            if ( element_color_set == SUBTRACTIVE )
                    element_color=YELLOW;
            break;
    default:
            break;
    } // switch(color)
} void Element::determine_element_parameters_by_color_set( )
{
    switch ( element_color_set )
    {
    case(ADDITIVE):
            if ( element_color == CYAN )
                    element_color=RED;
            if ( element_color_set == MAGENTA )
                    element_color=GREEN;
            if ( element_color_set == YELLOW )
                    element_color=BLUE;
            break;
    case(SUBTRACTIVE):
            if ( element_color == RED )
                    element_color=CYAN;
            if ( element_color_set == GREEN )
                    element_color=MAGENTA;
            if ( element_color_set == BLUE )
                    element_color=YELLOW;
            break;
    default:
            break;
    } // switch(color)
}

Element::~Element()
{
    // No code here
}

// global.h ifndef GLOBAL_H
```

APPENDIX G

```
    #define GLOBAL_H extern FILE *stream1; // output stream for solutions file
    extern BOOLEAN stream1_flag;
    extern const UWORD powers_of_three[];
5   extern const UWORD powers_of_two[];
    extern Pixel_column *global_set;
    extern UWORD global_set_size;
    extern Pixel_column *valid_set;
    extern UWORD valid_set_size;
10  extern Pixel_column *active_set;
    extern UWORD active_set_size;
    extern const UWORD mask7_length;
    extern const char mask7[54][11];
    extern const double weight_amount[3][8];
15  extern const UWORD normalization_array[3][8];
    extern ACTIVE_SET_STRUCT *trials;
    extern const UWORD perm_active_set[];
    extern const UWORD rnd_active_set[];
    extern const UWORD temp_active_set[];
20  #endif // global.cpp include <stdio.h>
    #include "def.h"
    #include "global.h"

25  FILE *stream1; // output stream for solutions file
    BOOLEAN stream1_flag;

const UWORD powers_of_two[] = {1,2,4,8,16,32,64,128,256};
    const UWORD powers_of_three[] = {1,3,9,27,81,243,729,2187,6561,19683,59049};
    const UWORD mask7_length = 54;

30  const UWORD perm_active_set[] = //84
                            {      869,
                                   902,
                                   923,
                                   925,
35                                 1247,
```

APPENDIX G

1249,
1261,
1262,
1265,
1274,
1280,
1312,
1319,
1355,
1558,
1598,
1600,
1654,
1735,
1747,
1760,
1762,
1765,
1766,
1771,
1879,
1886,
1897,
2495,
2603,
2607,
2624,
2706,
2720,
2738,
2765,
2769,
2774,
2775,
2777,
2813,
2819,
3741,
3747,
3783,
3785,
3786,
3791,

APPENDIX G

73

```
        3795,
        3822,
        3840,
        3854,
        3936,
        3953,
        3957,
        4065,
        4663,
        4674,
        4681,
        4789,
        4794,
        4795,
        4798,
        4800,
        4813,
        4825,
        4906,
        4960,
        4962,
        5002,
        5205,
        5241,
        5248,
        5280,
        5286,
        5295,
        5298,
        5299,
        5311,
        5313,
        5635,
        5637,
        5658,
        5691 };

const UWORD rnd_active_set[] = //46
    {   875,
        907,
        914,
        938,
        1285,
```

APPENDIX G

1307,
1315,
1357,
1555,
1562,
1603,
1666,
1751,
1874,
1882,
1895,
2489,
2615,
2625,
2639,
2705,
2721,
2814,
3746,
3818,
3839,
3855,
3921,
3935,
3945,
4071,
4678,
4686,
4809,
4894,
4957,
4998,
5005,
5203,
5245,
5253,
5275,
5622,
5646,
5653,
5685 };

APPENDIX G

```
const UWORD temp_active_set[] = //106
{
    869,
    875,902,907,914,923,938,1247,1249,1265,1280,
    1285,1307,1312,1315,1319,1357,1555,1558,1562,1600,
    1603,1666,1735,1747,1751,1760,1765,1874,1879,1882,
    1886,1895,2489,2495,2603,2607,2615,2624,2625,2639,
    2705,2706,2720,2721,2738,2769,2777,2813,2814,2819,
    3741,3746,3747,3791,3795,3818,3822,3839,3840,3854,
    3855,3921,3935,3936,3945,3957,4071,4663,4674,4678,
    4681,4686,4798,4800,4809,4813,4825,4894,4906,4957,
    4960,4962,4998,5002,5005,5203,5205,5241,5245,5248,
    5253,5275,5280,5298,5299,5311,5313,5622,5635,5637,
    5646,5653,5658,5685,5691
};

/*
const UWORD temp_active_set[] = //130
{
    //869,
    875,
    902,
    907,
    914,
    923,
    925,
    938,
```

APPENDIX G

1247,
1249,
//1261,
//1262,
//1265,
1274,
1280,
1285,
1307,
1312,
1315,
1319,
//1355,
1357,
1555,
1558,
1562,
//1598,
1600,
1603,
//1654,
1666,
1735,
1747,
1751,
1760,
//1762,
//1765,
//1766,
1771,
1874,
1879,
1882,
1886,
1895,
//1897,
2489,
2495,
2603,
2607,
2615,
2624,
2625,

APPENDIX G

2639,
2705,
2706,
2720,
2721,
2738,
//2765,
2769,
//2774,
//2775,
2777,
2813,
2814,
2819,
3741,
3746,
3747,
//3783,
//3785,
//3786,
3791,
3795,
3818,
3822,
3839,
3840,
3854,
3855,
3921,
3935,
3936,
3945,
//3953,
3957,
//4065,
4071,
4663,
4674,
4678,
4681,
4686,
//4789,
//4794,

APPENDIX G

```
                            //4795,
                            4798,
                            4800,
                            4809,
                            4813,
                            4825,
                            4894,
                            4906,
                            4957,
                            4960,
                            4962,
                            4998,
                            5002,
                            5005,
                            5203,
                            5205,
                            5241,
                            5245,
                            5248,
                            5253,
                            5275,
                            5280,
                            //5286,
                            //5295,
                            5298,
                            5299,
                            5311,
                            5313,
                            5622,
                            5635,
                            5637,
                            5646,
                            5653,
                            5658,
                            5685,
                            5691 };
*/
// for a height of seven only
const UWORD normalization_array[3][8] = {      0,3,0,0,0,0,0,0, 0,0,3,6,11,21,42,126,
```

APPENDIX G

0,0,4,8,8,0,0,0 };

// add height area later const double weight_amount[3][8] = { 0,0.80,0,0,0,0,0,0, 0,0,0.09,0.009,0.0009,0.00009,0.000009,0.0000009, 0,0,0.09,0.009,0.0009,0,0,0 };

```
// FORMAT IS 'TYPE[2] INDEX#(BASE 10)[2] MASK_DATA[7]in this case
const char mask7[54][11] = { "S\x01\x00X------",
                             "S\x01\x01-X-----",
                             "S\x01\x02--X----",
                             "S\x01\x03---X---",
                             "S\x01\x04----X--",
                             "S\x01\x05-----X-",
                             "S\x01\x06------X",
                             "C\x02\x00XX-----",
                             "C\x02\x01-XX----",
                             "C\x02\x02--XX---",
                             "C\x02\x03---XX--",
                             "C\x02\x04----XX-",
                             "C\x02\x05-----XX",
                             "C\x03\x00XXX----",
                             "C\x03\x01-XXX---",
                             "C\x03\x02--XXX--",
                             "C\x03\x03---XXX-",
                             "C\x03\x04----XXX",
                             "C\x04\x00XXXX---",
                             "C\x04\x01-XXXX--",
                             "C\x04\x02--XXXX-",
                             "C\x04\x03---XXXX",
                             "C\x05\x00XXXXX--",
                             "C\x05\x01-XXXXX-",
                             "C\x05\x02--XXXXX",
                             "C\x06\x00XXXXXX-",
                             "C\x06\x01-XXXXXX",
                             "C\x07\x00XXXXXXX",
                             "N\x02\x00X-X----",
                             "N\x02\x01X--X---",
```

APPENDIX G

```
                                            "N\x02\x02X---X--",
                                            "N\x02\x03X----X-",
                                            "N\x02\x04X-----X",
                                            "N\x02\x05-X-X---",
 5                                          "N\x02\x06-X--X--",
                                            "N\x02\x07-X---X-",
                                            "N\x02\x08-X----X",
                                            "N\x02\x09--X-X--",
                                            "N\x02\x10--X--X-",
10                                          "N\x02\x11--X---X",
                                            "N\x02\x12---X-X-",
                                            "N\x02\x13---X--X",
                                            "N\x02\x14----X-X",
                                            "N\x03\x00X-X-X--",
15                                          "N\x03\x01X-X--X-",
                                            "N\x03\x02X-X---X",
                                            "N\x03\x03X--X-X-",
                                            "N\x03\x04X--X--X",
                                            "N\x03\x05X---X-X",
20                                          "N\x03\x06-X-X-X-",
                                            "N\x03\x07-X-X--X",
                                            "N\x03\x08-X--X-X",
                                            "N\x03\x09--X-X-X",
                                            "N\x04\x00X-X-X-X" };

25    Pixel_column *global_set;
      UWORD global_set_size;
      Pixel_column *valid_set;
      UWORD valid_set_size;
      Pixel_column *active_set;
30    //UWORD active_set_size;
      ACTIVE_SET_STRUCT *trials;

// Pixel_column.h if !defined( PIXEL_COLUMN_H )
      #define PIXEL_COLUMN_H 35    class Pixel_column
      {
      public:
              Pixel_column( );
```

APPENDIX G

```
            Pixel_column( UBYTE height, UBYTE color_set, UBYTE *elements );    //
    constructor
            Pixel_column( UBYTE height, UBYTE color_set );
                    // constructor
 5          UBYTE get_height();
            UBYTE get_color_set();
            UBYTE get_type();
            UWORD get_raw_value();
            UWORD get_actual_value();
10          BOOLEAN set_height( UBYTE height );
            BOOLEAN set_color_set( UBYTE set_color_set );
            BOOLEAN set_type();
            BOOLEAN set_element( UBYTE element_number, UBYTE element_value );
            BOOLEAN set_raw_value ( UWORD value );
15          BOOLEAN set_actual_value( UWORD value );
            BOOLEAN is_raw_valid();
            BOOLEAN is_raw_active();
            BOOLEAN generate_valid_solutions();
            BOOLEAN generate_active_solutions();
20          BOOLEAN raw2element_set(UWORD raw_value, Element *pixel_column_ptr
    );
            BOOLEAN element_set2raw( UWORD *raw_value, Element *pixel_column_ptr
    );
            UWORD get_valid_solutions_sum();
25          BOOLEAN get_valid_solutions ( UWORD *global_solutions );
            UWORD get_active_solutions_sum();
            BOOLEAN get_active_solutions ( UWORD *global_solutions );
            UBYTE get_element_value ( UBYTE element_number );
            BOOLEAN print_pixel_column();
30          BOOLEAN fprint_pixel_column ( FILE *stream );
            BOOLEAN print_stats();
            BOOLEAN generate_stats();
            BOOLEAN get_actual_stats( ACTIVE_PC_STRUCT *the_actual_stats );

35          //BOOLEAN fprint_state (FILE *stream );
            ~Pixel_column();
                    // desctructor
    private:
            UBYTE pixel_column_height;
40          UBYTE pixel_column_color_set;
            UBYTE pixel_column_type;
            UWORD pixel_column_raw_value;
            UBYTE pixel_column_actual_value;
```

APPENDIX G

```
        Element *pixel_column_ptr;
        UWORD valid_solutions_sum;
        UWORD *valid_solutions;
        UWORD active_solutions_sum;
        UWORD *active_solutions;
        STATS *valid_stats;    // must declare dynamically
        STATS *actual_stats;   // must declare dynamically
};

#endif

// Pixel_column.cpp include <stdio.h>
include "def.h"
#include "global.h"
#include "Element.h"
#include "Pixel_column.h"
#include "Utilities.h"
#include <math.h>
#include <stdlib.h>
#include <conio.h>

Pixel_column::Pixel_column( )
{
        UWORD i;
        pixel_column_ptr = new Element[HEIGHT];
        for ( i=0; i<HEIGHT; i++ ){
                pixel_column_ptr[i].set_element_value(0);
        }
        pixel_column_height = HEIGHT;
        pixel_column_color_set = ADDITIVE;
        // just to initialize a block so there is something to delete before a new one is
        // allocated in the global solutions function
//      valid_solutions = new UWORD[2];
        active_solutions = new UWORD[pow(2,HEIGHT)];
}

Pixel_column::Pixel_column( UBYTE height, UBYTE color_set, UBYTE *elements )
{
        UWORD i;
        pixel_column_ptr = new Element[height];
        for ( i=0; i<height; i++ ){
```

APPENDIX G

```
                pixel_column_ptr[i].set_element_value( elements[i] );
            }
            pixel_column_height = height;
            pixel_column_color_set = color_set;
 5          // just to initialize a block so there is something to delete before a new one is
            // allocated in the global solutions function
        //  valid_solutions = new UWORD[1];
            active_solutions = new UWORD[pow(2,HEIGHT)];
        }

10      Pixel_column::Pixel_column( UBYTE height, UBYTE color_set )
        {
            UBYTE i;
            pixel_column_ptr = new Element[height];
            for ( i=0; i<height; i++ ){
15              pixel_column_ptr[i].set_element_value( 0 );
            }
            pixel_column_height = height;
            pixel_column_color_set = color_set;
            // just to initialize a block so there is something to delete before a new one is
20          // allocated in the global solutions function
        //  valid_solutions = new UWORD[1];
            active_solutions = new UWORD[pow(2,HEIGHT)];
        }

UBYTE Pixel_column::get_height()
25      {
            return pixel_column_height;
        }

UBYTE Pixel_column::get_color_set()
        {
30          return pixel_column_color_set;
        }

UBYTE Pixel_column::get_type()
        {
            return 0;
35      }

UWORD Pixel_column::get_raw_value()
        {
            element_set2raw( &pixel_column_raw_value, pixel_column_ptr );
```

APPENDIX G

```
                return pixel_column_raw_value;
        }

UWORD Pixel_column::get_actual_value()
        {
5               return 0;
        }

BOOLEAN Pixel_column::set_height( UBYTE height)
        {
                pixel_column_height = height;
10              element_set2raw( &pixel_column_raw_value, pixel_column_ptr );
                return TRUE;
        }

BOOLEAN Pixel_column::set_color_set( UBYTE color_set )
        {
15              UBYTE i;
                pixel_column_color_set = color_set;
                for( i=0; i<pixel_column_height; i++ ){
                        pixel_column_ptr[i].set_color_set( color_set );
                }
20              return TRUE;
        }

BOOLEAN Pixel_column::set_type()
        {
                return TRUE;
25      }

BOOLEAN  Pixel_column::set_element(  UBYTE  element_number,  UBYTE
        element_value )
        {
                pixel_column_ptr[element_number].set_element_value(element_value);
30              return TRUE;
        }

BOOLEAN Pixel_column::set_raw_value( UWORD value )
        {
                if ( (UDWORD)value >= powers_of_three[pixel_column_height] ) return
35      FALSE;
                raw2element_set( value, pixel_column_ptr );
                element_set2raw( &pixel_column_raw_value, pixel_column_ptr );
```

APPENDIX G

```
                return TRUE;
        }

BOOLEAN Pixel_column::set_actual_value( UWORD value )
        {
                return TRUE;
        }

Pixel_column::~Pixel_column()
        {
                delete [] pixel_column_ptr;
                //delete [] valid_solutions;
                delete [] active_solutions;
        }

UBYTE Pixel_column::get_element_value ( UBYTE element_number )
        {
                return pixel_column_ptr[element_number].get_value();
        }

BOOLEAN    Pixel_column::raw2element_set(UWORD    raw_value,   Element
        *pixel_column_ptr )
        {
                UWORD j;
                // MSB is the last or bottom element in a pixel column
                for ( j=0; j<pixel_column_height; j++ ) {
                        pixel_column_ptr[j].set_element_value(
        (raw_value/powers_of_three[j])%3 );
                }
                return TRUE;
        }

BOOLEAN   Pixel_column::element_set2raw(   UWORD   *raw_value,   Element
        *pixel_column_ptr )
        {
                UWORD i;
                BOOLEAN invalid_flag;
                invalid_flag = FALSE;
                *raw_value = 0;
                for ( i=0; i<pixel_column_height; i++ ) {
                        if    (    (pixel_column_ptr[i].get_value()    ==    255)    ||
        (pixel_column_ptr[i].get_value() == '?') ) { invalid_flag=TRUE; }
```

APPENDIX G

```
                    *raw_value = (*raw_value) + pixel_column_ptr[i].get_value() *
        powers_of_three[i];
                }
                if ( invalid_flag==TRUE ) {
                        *raw_value=INVALID;
                        return FALSE;
                }
                else
                        return TRUE;
        }

BOOLEAN Pixel_column::is_raw_valid( )
        {
                UWORD i;
                for (i=0; i<(pixel_column_height-1); i++ ) {
                        if ( pixel_column_ptr[i].get_value() >=3 ) return FALSE;
                        if( pixel_column_ptr[i].get_value()==pixel_column_ptr[i+1].get_value()
        ) return FALSE;
                }
                if ( pixel_column_ptr[i].get_value() == pixel_column_ptr[0].get_value() ) return
        FALSE; // check loop constraint
                return TRUE;
        }

BOOLEAN Pixel_column::is_raw_active( )
        {
                UWORD i, temp;
                for (i=0; i<ACTIVE_SET_SIZE; i++ ) {
                        temp = active_set[i].get_raw_value();
                        if ( pixel_column_raw_value == temp )
                                return TRUE;
                }
                return FALSE;
        }

BOOLEAN Pixel_column::generate_valid_solutions()
        {
                UWORD i,j,unknown_counter;
                UWORD unknown_positions[HEIGHT];
                UWORD k,total_possibilities;
                //determine the amount of UNKNOWNS and their respective positions
                for (i=0; i<HEIGHT; i++ ) {
```

APPENDIX G

```
                    unknown_positions[i] = FALSE;
            }
            unknown_counter=0;
            for (i=0; i<HEIGHT; i++ ){
 5                  if ( pixel_column_ptr[i].get_value() == UNKNOWN ) {
                            unknown_positions[unknown_counter++] = i;
                    }
            }
            if ( unknown_counter==0) return TRUE;
10          total_possibilities = powers_of_three[unknown_counter];
            delete [] valid_solutions;
            valid_solutions = new UWORD[total_possibilities];
            valid_solutions_sum = 0;
            for (k=0; k<total_possibilities; k++ ){
15                  for (j=0; j<unknown_counter; j++ ){
                            pixel_column_ptr[unknown_positions[j]]    =
       (k/powers_of_three[j])%3;
                    }
                    if ( is_raw_valid() ) {
20                          // capture its raw number and increase valid_solutions_sum
                            //printf ( "TOTAL=%u,  VS=%u\r\n",  total_possibilities,
       valid_solutions_sum );
                            element_set2raw(  &valid_solutions[valid_solutions_sum++],
       pixel_column_ptr );
25                  }
            }
            for (i=0; i<unknown_counter; i++ ) {
                    pixel_column_ptr[unknown_positions[i]] = UNKNOWN;
            }
30          return TRUE;
    }

BOOLEAN Pixel_column::generate_active_solutions()
    {
            UWORD i,j,unknown_counter;
35          UWORD unknown_positions[HEIGHT];
            UWORD k,total_possibilities;
            //determine the amount of UNKNOWNS and their respective positions
            for (i=0; i<HEIGHT; i++ ) {
                    unknown_positions[i] = FALSE;
40          }
            unknown_counter=0;
```

APPENDIX G

```
            for (i=0; i<HEIGHT; i++ ){
                if ( pixel_column_ptr[i].get_value() == UNKNOWN ) {
                    unknown_positions[unknown_counter++] = i;
                }
            }
            if ( unknown_counter==0) return TRUE;
            total_possibilities = powers_of_three[unknown_counter];
            if( stream1_flag )    fprintf ( stream1, "\t\tTotal  possibilities:  %u",
    total_possibilities );
            //delete [] active_solutions;
            //active_solutions = new UWORD[total_possibilities];
            active_solutions_sum = 0;
            for (k=0; k<total_possibilities; k++ ){
                for (j=0; j<unknown_counter; j++ ){
                    pixel_column_ptr[unknown_positions[j]]   =
    (k/powers_of_three[j])%3;
                }
                get_raw_value();
                if( stream1_flag ) fprintf ( stream1, "\r\n\t\t\t" );
                if( stream1_flag ) fprint_pixel_column(stream1);
                if ( is_raw_active() ) {
                    if( stream1_flag ) fprintf ( stream1, " -> Active!" );
                    // capture its raw number and increase active_solutions_sum
                    //printf ( "TOTAL=%u, VS=%u\r\n", total_possibilities,
    active_solutions_sum );
                    element_set2raw( &active_solutions[active_solutions_sum++],
    pixel_column_ptr );
                    //EXIT ROUTINE IF ACTIVE SOLUTIONS >1 TO SAVE TIME
    SINCE WE ARE NOT KEEPING TRACK OF THESE SEPARATLY
                    //if ( active_solutions_sum > 3 ) return TRUE;
                }
                else {
                    if ( !is_raw_valid() ) {
                        if( stream1_flag ) fprintf ( stream1, " -> Invalid" ); }
                    else {
                        if( stream1_flag ) fprintf ( stream1, " -> Non-Active" ); }

}
            }
            for (i=0; i<unknown_counter; i++ ) {
                pixel_column_ptr[unknown_positions[i]] = UNKNOWN;
            }
            if( stream1_flag ) fprintf ( stream1, "\r\n\t\tTotal active solutions for this error
```

APPENDIX G

```
            sequence: %u\r\n\r\n", active_solutions_sum );
                    return TRUE;
            }

UWORD Pixel_column::get_valid_solutions_sum()
  5         {
                    return valid_solutions_sum;
            }

BOOLEAN Pixel_column::get_valid_solutions ( UWORD *solutions )
            {
 10                 UWORD i;
                    for (i=0; i<valid_solutions_sum; i++ ) {
                            solutions[i] = valid_solutions[i];
                    }
                    return TRUE;
 15         }

UWORD Pixel_column::get_active_solutions_sum()
            {
                    return active_solutions_sum;
            }

20         BOOLEAN Pixel_column::get_active_solutions ( UWORD *solutions )
            {
                    UWORD i;
                    for (i=0; i<active_solutions_sum; i++ ) {
                            solutions[i] = active_solutions[i];
 25                 }
                    return TRUE;
            }

BOOLEAN Pixel_column::print_pixel_column()
            {
 30                 UWORD i;
                    UWORD temp;
                    temp = get_raw_value();
                    if (temp==INVALID)
                            printf ( "UNKNOWN\t" );
 35                 else
```

APPENDIX G

90

```
                        printf( "%u\t", temp );
                for( i=0; i<(HEIGHT-1); i++ ) {
                        temp = get_element_value(i);
                        if( temp==255 ) {
5                               printf( "?," );
                        }
                        else {
                                printf( "%u,", temp );
                        }
10              }
                temp = get_element_value(i);
                if( temp==255 ) {
                        printf( "? " );
                }
15              else {
                        printf( "%u", temp );
                }
                return TRUE;
        }

20      BOOLEAN Pixel_column::fprint_pixel_column ( FILE *stream )
        {
                UWORD i;
                UWORD temp;
                temp = get_raw_value();
25              if (temp==INVALID)
                        fprintf( stream, "UNKNOWN\t" );
                else
                        fprintf( stream, "%u\t", temp );
                for( i=0; i<(HEIGHT-1); i++ ) {
30                      temp = get_element_value(i);
                        if( temp==255 ) {
                                fprintf( stream, "?," );
                        }
                        else {
35                              fprintf( stream, "%u,", temp );
                        }
                }
                temp = get_element_value(i);
                if( temp==255 ) {
40                      fprintf( stream, "?," );
                }
                else {
```

APPENDIX G

```
                    fprintf( stream, "%u", temp );
            }
            return TRUE;
    }

5   BOOLEAN Pixel_column::generate_stats()
    {
            actual_stats = new STATS;
            UWORD i,j,k,l,original_raw;
            UWORD error_num;
10          actual_stats->single_bit_solutions = 0;
            actual_stats->double_bit_solutions = 0;
            actual_stats->triple_bit_solutions = 0;
            actual_stats->tripleplus_bit_solutions = 0;
            original_raw = get_raw_value();
15          if( stream1_flag ) fprintf( stream1, "\r\n\r\nProcessing Active Value: " );
            if( stream1_flag ) fprint_pixel_column( stream1 );
            if( stream1_flag ) fprintf( stream1, "\r\n" );
            for (i=1; i<(powers_of_two[HEIGHT]); i++ ) {
                    if( stream1_flag ) fprintf( stream1, "\tError sequence #%u\r\n\t\t", i );
20                  error_num = i;
                    for ( j=(HEIGHT); j!=0; j-- ) {
                            if ( error_num >= powers_of_two[j-1] ) {
                                    set_element( (UBYTE)(j-1), UNKNOWN );
                                    error_num -= powers_of_two[j-1];
25                          }
                    }
                    if( stream1_flag ) fprint_pixel_column(stream1);
                    if( stream1_flag ) fprintf( stream1, "\r\n" );
                    generate_active_solutions();
30                  if ( active_solutions_sum == 1 ) { actual_stats->single_bit_solutions++;}
                    if ( active_solutions_sum == 2 ) { actual_stats->double_bit_solutions++;}
                    if ( active_solutions_sum == 3 ) { actual_stats->triple_bit_solutions++;}
                    if    (    active_solutions_sum    >    3    )    {    actual_stats-
    >tripleplus_bit_solutions++;}
35                  set_raw_value ( original_raw );
            } // for
            printf( "*" );
            return TRUE;
    }

40  BOOLEAN Pixel_column::get_actual_stats( ACTIVE_PC_STRUCT *the_actual_stats
```

APPENDIX G

```
        )
        {
                the_actual_stats->single_bit_solutions = actual_stats->single_bit_solutions;
                the_actual_stats->double_bit_solutions = actual_stats->double_bit_solutions;
                the_actual_stats->triple_bit_solutions = actual_stats->triple_bit_solutions;
                the_actual_stats->tripleplus_bit_solutions    =    actual_stats->tripleplus_bit_solutions;
                delete actual_stats;
                return TRUE;
        }

BOOLEAN Pixel_column::print_stats( )
        {
                UWORD i,j;
                printf( "\r\n\r\nACTIVE STATS\r\n" );
                printf( "Single bit->%.1f, Double bit->%.1f, Triple bit->%.1f, 3+ bit->%.1f\r\n",
                        (float)(actual_stats->single_bit_solutions)*(100/MASK_LEN),
                (float)(100/MASK_LEN*actual_stats->double_bit_solutions),
                (float)(100/MASK_LEN*actual_stats->triple_bit_solutions),
                (float)(100/MASK_LEN*actual_stats->tripleplus_bit_solutions) );
                delete actual_stats;

return TRUE;

}

// Utilities.h if !defined( UTILITIES_H )
        #define UTILITIES_H class Utilities
        {
        public:
                Utilities();
                UWORD get_global_set_size();
                BOOLEAN create_global_set();
```

APPENDIX G

```
        BOOLEAN create_valid_set();
        BOOLEAN create_active_set();
        UWORD get_valid_set_size();
        UWORD get_active_set_size();
        void print_valid_set( FILE *stream );
        void print_global_set ( FILE *stream );
        void print_active_set ( FILE *stream );
        ~Utilities();

private:

};

#endif

// Utilities.cpp include <stdio.h>
include <stdlib.h>
#include <time.h>
#include "def.h"
#include "global.h"
#include "Element.h"
#include "Pixel_column.h"
#include "Utilities.h"

Utilities::Utilities( )
{
    UWORD i, trial_num;
    // initialize with something
    global_set = new Pixel_column[powers_of_three[HEIGHT]];
    global_set_size = powers_of_three[HEIGHT];
    valid_set = new Pixel_column[powers_of_three[HEIGHT]];
    valid_set_size = powers_of_three[HEIGHT];
    active_set = new Pixel_column[ACTIVE_SET_SIZE];
    trials = new ACTIVE_SET_STRUCT[2];
    // clear storage area
    for ( trial_num=0; trial_num<2; trial_num++ ) {;
        trials[trial_num].score_avg = 0;      // not used now
        trials[trial_num].score_std_dev = 0; // not used now
        trials[trial_num].single_bit_solutions_avg;
        trials[trial_num].double_bit_solutions_avg;
```

APPENDIX G

```
                    trials[trial_num].triple_bit_solutions_avg;
                    trials[trial_num].tripleplus_bit_solutions_avg;
                    trials[trial_num].single_bit_solutions_std_dev;
                    trials[trial_num].double_bit_solutions_std_dev;
                    trials[trial_num].triple_bit_solutions_std_dev;
                    trials[trial_num].tripleplus_bit_solutions_std_dev;
                    for ( i=0; i<ACTIVE_SET_SIZE; i++ ) {
                            trials[trial_num].active_set[i].raw_num = 0;
                            trials[trial_num].active_set[i].score = 0;
                            trials[trial_num].active_set[i].single_bit_solutions;
                            trials[trial_num].active_set[i].double_bit_solutions;
                            trials[trial_num].active_set[i].triple_bit_solutions;
                            trials[trial_num].active_set[i].tripleplus_bit_solutions;
                    }
            }
    }

UWORD Utilities::get_global_set_size()
    {
            return global_set_size;
    }

UWORD Utilities::get_valid_set_size()
    {
            return valid_set_size;
    }

UWORD Utilities::get_active_set_size()
    {
            return ACTIVE_SET_SIZE;
    }

BOOLEAN Utilities::create_global_set ( )
    {
            UWORD i;
            delete [] global_set;
            global_set = new Pixel_column[powers_of_three[HEIGHT]];
            global_set_size = powers_of_three[HEIGHT];
            valid_set_size=0;
            for ( i=0; i<powers_of_three[HEIGHT]; i++ ){
                    global_set[i].set_height(HEIGHT);
                    global_set[i].set_raw_value(i);
```

APPENDIX G

95

```
                }
                return TRUE;
        }

BOOLEAN Utilities::create_valid_set ( )
5       {
                UWORD i,j;
                delete [] valid_set;
                valid_set = new Pixel_column[powers_of_three[HEIGHT]]; // make it same size
        as global_set to be safe
10              valid_set_size=0;
                j=0;
                for ( i=0; i<global_set_size; i++ ){
                        if (global_set[i].is_raw_valid()) {
                                valid_set[j].set_height( global_set[i].get_height() );
15                              valid_set[j++].set_raw_value( global_set[i].get_raw_value() );
                                valid_set_size++; }
                }
                return TRUE;
        }

20      BOOLEAN Utilities::create_active_set ( )
        {
                // this funtion creates an active set from the valid set
                UWORD i;
                for ( i=0; i<(UWORD)TEMP_ACTIVE_SET_SIZE; i++ ) {
25                      active_set[i].set_raw_value( temp_active_set[i] );
                } return TRUE;
        }

30      /*
        BOOLEAN Utilities::create_active_set ( )
        {
                // this funtion creates a random active set from the valid set
                UWORD i,j, temp, t,m,N,n;
35              UBYTE state, next_state;
                float U;
                BOOLEAN terminate;
                terminate=FALSE;
```

APPENDIX G

```
            state = 1;
            next_state=0;
            U=(float)0;
            N=valid_set_size;
 5          n=ACTIVE_SET_SIZE;
            srand( (unsigned)time( NULL ) );
            for ( EVER ) {
                    switch ( state )
                    {
10                  case(1):
                            t=0; m=0;
                            next_state = 2;
                            break;
                    case(2):
15                          U = ( (float)rand() / (float)RAND_MAX );
                            next_state = 3;
                            break;
                    case(3):
                            if( ( ((N-t)*U) >= (n-m) )
20                                  next_state = 5;
                            else
                                    next_state = 4;
                            break;
                    case(4):
25                          active_set[m].set_raw_value( valid_set[t].get_raw_value() );
                            m++; t++;
                            if( m < n )
                                    next_state = 2;
                            else
30                                  terminate = TRUE;
                            break;
                    case(5):
                            t++;
                            next_state = 2;
35                          break;
                    }
                    if ( terminate ) break;
                    state = next_state;
            }
40          return TRUE;
    }

*/
```

APPENDIX G

```
        void Utilities::print_valid_set( FILE *stream )
        {
                UWORD i,j;
                printf ( "VALID SET\r\nVALID SET SIZE %u\r\n", valid_set_size );
 5              fprintf ( stream, "VALID SET\r\nVALID SET SIZE %u\r\n", valid_set_size );
                for (i=0; i<valid_set_size; i++ ) {
                        valid_set[i].print_pixel_column();
                        printf ( "\r\n" );
                        valid_set[i].fprint_pixel_column( stream );
10                      fprintf ( stream, "\r\n" );
                }
        } void Utilities::print_global_set( FILE *stream )
        {
15              UWORD i,j;
                printf ( "GLOBAL SET\r\nGLOBAL SET SIZE %u\r\n", global_set_size );
                fprintf ( stream, "GLOBAL SET\r\nGLOBAL SET SIZE %u\r\n", global_set_size
        );
                for (i=0; i<global_set_size; i++ ) {
20                      global_set[i].print_pixel_column();
                        printf ( "\r\n" );
                        global_set[i].fprint_pixel_column( stream );
                        fprintf ( stream, "\r\n" );
                }
25      } void Utilities::print_active_set( FILE *stream )
        {
                UWORD i,j;
                printf ( "ACTIVE SET\r\nACTIVE SET SIZE %u\r\n", ACTIVE_SET_SIZE );
30              fprintf ( stream, "ACTIVE SET\r\nACTIVE SET SIZE %u\r\n",
        ACTIVE_SET_SIZE );
                for (i=0; i<ACTIVE_SET_SIZE; i++ ) {
                        active_set[i].print_pixel_column();
                        printf ( "\r\n" );
35                      active_set[i].fprint_pixel_column( stream );
                        fprintf ( stream, "\r\n" );
                }
        }

Utilities::~Utilities( )
```

APPENDIX G

```
        {
            delete [] global_set;
            delete [] valid_set;
            delete [] trials;
5       }

//def.h if !defined( DEF_H )
define DEF_H typedef unsigned char UBYTE;
10      typedef char SBYTE;
        typedef unsigned short UWORD;
        typedef unsigned long UDWORD;
        typedef signed short SWORD;
        typedef unsigned char BOOLEAN;

15      #define ACTIVE_SET_SIZE 106 // 130//258//106
        #define PERM_ACTIVE_SET_SIZE 46
        #define RND_ACTIVE_SET_SIZE 84
        #define TEMP_ACTIVE_SET_SIZE 106 typedef struct
20      {
            UWORD len;
            UWORD cnt;
            UWORD max;
            UWORD min;
25          double temp;
            double avg;
            double std_dev;
        } STAT_DATA;

typedef struct
30      {
            // Format is: [Type of data group(Single(S), Contiguous(C), NonContiguous(N)]
```

APPENDIX G

```
//      [Subset of data group, S has none, C is 2-7, N is 2-4]
//      [An actual sample element of that group, Last element is SUMMARY]
//      STAT_DATA stat_array[4][8][20];
//      double weighted;
        UWORD single_bit_solutions;
        UWORD double_bit_solutions;
        UWORD triple_bit_solutions;
        UWORD tripleplus_bit_solutions;
} STATS;

typedef struct
{
        UWORD raw_num; // raw pixel_column number of this valid_idx
        double score;
        float single_bit_solutions;
        float double_bit_solutions;
        float triple_bit_solutions;
        float tripleplus_bit_solutions;
} ACTIVE_PC_STRUCT;

typedef struct
{
        ACTIVE_PC_STRUCT active_set[ACTIVE_SET_SIZE];
        double score_avg;
        double score_std_dev;
        float single_bit_solutions_avg;
        float double_bit_solutions_avg;
        float triple_bit_solutions_avg;
        float tripleplus_bit_solutions_avg;
        float single_bit_solutions_std_dev;
        float double_bit_solutions_std_dev;
        float triple_bit_solutions_std_dev;
        float tripleplus_bit_solutions_std_dev;
} ACTIVE_SET_STRUCT;

//????
#include "Element.h"
#include "Pixel_column.h"
//????

#define EVER ;;
#define FALSE 0
```

APPENDIX G

```
       #define TRUE 1
       #define INVALID 65330
       #define ADDITIVE (UBYTE)0
       #define SUBTRACTIVE (UBYTE)1
    5  #define RED (UBYTE)0
       #define GREEN (UBYTE)1
       #define BLUE (UBYTE)2
       #define CYAN (UBYTE)3
       #define MAGENTA (UBYTE)4
   10  #define YELLOW (UBYTE)5
       #define BLACK (UBYTE)6
       #define WHITE (UBYTE)7
       #define UNKNOWN (UBYTE)255
       #define HEIGHT (UWORD)8
   15  #define MASK_LEN (float)54
       #define SINGLE 0 // single bit errors
       #define CONTIGUOUS 1 // contiguous errors
       #define NONCONTIGUOUS 2 // noncontiguous errors
       #define SUMMARY 19 // last element of stat_array by definition
   20  #define WEIGHTED 0 // weighted summary average
       #define UNWEIGHTED 1 // unweighted summary average endif
```

APPENDIX G

```
Processing Raw Value: 875    2,0,1,2,1,0,1,0

Error sequence #1   ?,0,1,2,1,0,1,0

Total possibilities: 3

873   0,0,1,2,1,0,1,0 -> Invalid 874   1,0,1,2,1,0,1,0 -> Valid 875   2,0,1,2,1,0,1,0 -> Active!

Total active solutions for this error sequence: 1

Error sequence #2
    2,?,1,2,1,0,1,0

Total possibilities: 3

875   2,0,1,2,1,0,1,0 -> Active!

878   2,1,1,2,1,0,1,0 -> Invalid 881   2,2,1,2,1,0,1,0 -> Invalid

Total active solutions for this error sequence: 1

Error sequence #3
    ?,?,1,2,1,0,1,0

Total possibilities: 9

873   0,0,1,2,1,0,1,0 -> Invalid 874   1,0,1,2,1,0,1,0 -> Valid 875   2,0,1,2,1,0,1,0 -> Active!

876   0,1,1,2,1,0,1,0 -> Invalid 877   1,1,1,2,1,0,1,0 -> Invalid
```

APPENDIX H

```
        878  2,1,1,2,1,0,1,0 -> Invalid 879  0,2,1,2,1,0,1,0 -> Invalid 880  1,2,1,2,1,0,1,0 -> Valid 881  2,2,1,2,1,0,1,0 -> Invalid Total active solutions for this error sequence: 1

Error sequence #4
2,0,?,2,1,0,1,0

Total possibilities: 3

866  2,0,0,2,1,0,1,0 -> Invalid 875  2,0,1,2,1,0,1,0 -> Active!

884  2,0,2,2,1,0,1,0 -> Invalid

Total active solutions for this error sequence: 1

Error sequence #5
?,0,?,2,1,0,1,0

Total possibilities: 9

864  0,0,0,2,1,0,1,0 -> Invalid 865  1,0,0,2,1,0,1,0 -> Invalid 866  2,0,0,2,1,0,1,0 -> Invalid 873  0,0,1,2,1,0,1,0 -> Invalid 874  1,0,1,2,1,0,1,0 -> Valid 875  2,0,1,2,1,0,1,0 -> Active!

882  0,0,2,2,1,0,1,0 -> Invalid 883  1,0,2,2,1,0,1,0 -> Invalid 884  2,0,2,2,1,0,1,0 -> Invalid
```

APPENDIX H

Total active solutions for this error sequence: 1

Error sequence #6
2,?,?,2,1,0,1,0

Total possibilities: 9

866  2,0,0,2,1,0,1,0 -> Invalid 869  2,1,0,2,1,0,1,0 -> Active!

872  2,2,0,2,1,0,1,0 -> Invalid 875  2,0,1,2,1,0,1,0 -> Active!

878  2,1,1,2,1,0,1,0 -> Invalid 881  2,2,1,2,1,0,1,0 -> Invalid 884  2,0,2,2,1,0,1,0 -> Invalid 887  2,1,2,2,1,0,1,0 -> Invalid 890  2,2,2,2,1,0,1,0 -> Invalid Total active solutions for this error sequence: 2

Error sequence #7
?,?,?,2,1,0,1,0

Total possibilities: 27

864  0,0,0,2,1,0,1,0 -> Invalid 865  1,0,0,2,1,0,1,0 -> Invalid 866  2,0,0,2,1,0,1,0 -> Invalid 867  0,1,0,2,1,0,1,0 -> Invalid 868  1,1,0,2,1,0,1,0 -> Invalid 869  2,1,0,2,1,0,1,0 -> Active!

870  0,2,0,2,1,0,1,0 -> Invalid

APPENDIX H

```
871  1,2,0,2,1,0,1,0 -> Valid
872  2,2,0,2,1,0,1,0 -> Invalid
873  0,0,1,2,1,0,1,0 -> Invalid
874  1,0,1,2,1,0,1,0 -> Valid
875  2,0,1,2,1,0,1,0 -> Active!
876  0,1,1,2,1,0,1,0 -> Invalid
877  1,1,1,2,1,0,1,0 -> Invalid
878  2,1,1,2,1,0,1,0 -> Invalid
879  0,2,1,2,1,0,1,0 -> Invalid
880  1,2,1,2,1,0,1,0 -> Valid
881  2,2,1,2,1,0,1,0 -> Invalid
882  0,0,2,2,1,0,1,0 -> Invalid
883  1,0,2,2,1,0,1,0 -> Invalid
884  2,0,2,2,1,0,1,0 -> Invalid
885  0,1,2,2,1,0,1,0 -> Invalid
886  1,1,2,2,1,0,1,0 -> Invalid
887  2,1,2,2,1,0,1,0 -> Invalid
888  0,2,2,2,1,0,1,0 -> Invalid
889  1,2,2,2,1,0,1,0 -> Invalid
890  2,2,2,2,1,0,1,0 -> Invalid
Total active solutions for this error sequence: 2
```

APPENDIX H

| 27 | 28 k Value: 0,1,2,3,4,5,6,7 | 29 | 30 | 31 |
|---|---|---|---|---|
| 869 | 2,1,0,2,1,0,1,0 | 29.80 | 22.75 | 10.98 |
| 875 | 2,0,1,2,1,0,1,0 | 18.43 | 26.27 | 10.98 |
| 902 | 2,0,1,0,2,0,1,0 | 17.65 | 22.35 | 10.98 |
| 907 | 1,2,1,0,2,0,1,0 | 22.75 | 21.96 | 10.98 |
| 914 | 2,1,2,0,2,0,1,0 | 21.96 | 21.18 | 11.76 |
| 923 | 2,1,0,1,2,0,1,0 | 23.14 | 22.75 | 11.76 |
| 938 | 2,0,2,1,2,0,1,0 | 22.75 | 22.35 | 11.37 |
| 1247 | 2,1,0,1,0,2,1,0 | 18.43 | 23.53 | 17.65 |
| 1249 | 1,2,0,1,0,2,1,0 | 22.35 | 25.49 | 7.84 |
| 1265 | 2,1,2,1,0,2,1,0 | 18.43 | 23.14 | 17.65 |
| 1280 | 2,0,1,2,0,2,1,0 | 26.67 | 20.00 | 11.76 |
| 1285 | 1,2,1,2,0,2,1,0 | 22.75 | 25.10 | 9.41 |
| 1307 | 2,0,1,0,1,2,1,0 | 22.75 | 23.53 | 10.20 |
| 1312 | 1,2,1,0,1,2,1,0 | 17.65 | 22.35 | 10.98 |
| 1315 | 1,0,2,0,1,2,1,0 | 22.75 | 22.35 | 11.37 |
| 1319 | 2,1,2,0,1,2,1,0 | 20.00 | 23.53 | 10.59 |
| 1357 | 1,2,0,2,1,2,1,0 | 22.75 | 23.53 | 10.98 |
| 1555 | 1,2,1,0,1,0,2,0 | 18.43 | 25.49 | 9.80 |
| 1558 | 1,0,2,0,1,0,2,0 | 17.65 | 22.35 | 10.98 |
| 1562 | 2,1,2,0,1,0,2,0 | 22.75 | 21.96 | 11.76 |
| 1600 | 1,2,0,2,1,0,2,0 | 30.98 | 22.35 | 6.27 |
| 1603 | 1,0,1,2,1,0,2,0 | 18.43 | 26.27 | 10.98 |
| 1666 | 1,0,2,1,2,0,2,0 | 23.92 | 22.75 | 11.76 |
| 1735 | 1,2,0,1,0,1,2,0 | 30.98 | 21.96 | 11.37 |
| 1747 | 1,0,2,1,0,1,2,0 | 21.18 | 23.53 | 10.98 |
| 1751 | 2,1,2,1,0,1,2,0 | 18.43 | 26.67 | 10.20 |
| 1760 | 2,1,0,2,0,1,2,0 | 29.02 | 25.49 | 4.31 |
| 1765 | 1,0,1,2,0,1,2,0 | 29.80 | 20.78 | 12.55 |
| 1874 | 2,0,1,0,2,1,2,0 | 22.75 | 22.35 | 11.37 |
| 1879 | 1,2,1,0,2,1,2,0 | 25.49 | 24.31 | 7.06 |
| 1882 | 1,0,2,0,2,1,2,0 | 18.43 | 25.10 | 10.98 |
| 1886 | 2,1,2,0,2,1,2,0 | 17.65 | 22.35 | 10.98 |
| 1895 | 2,1,0,1,2,1,2,0 | 22.75 | 23.14 | 11.37 |
| 2489 | 2,1,0,2,0,1,0,1 | 18.43 | 26.67 | 10.59 |
| 2495 | 2,0,1,2,0,1,0,1 | 18.43 | 20.78 | 17.25 |
| 2603 | 2,0,1,0,2,1,0,1 | 21.18 | 22.35 | 8.63 |
| 2607 | 0,2,1,0,2,1,0,1 | 23.53 | 23.53 | 10.59 |
| 2615 | 2,1,2,0,2,1,0,1 | 18.43 | 25.49 | 10.98 |
| 2624 | 2,1,0,1,2,1,0,1 | 17.65 | 22.75 | 12.55 |
| 2625 | 0,2,0,1,2,1,0,1 | 22.75 | 22.75 | 12.94 |
| 2639 | 2,0,2,1,2,1,0,1 | 21.96 | 22.75 | 9.41 |
| 2705 | 2,1,0,1,0,2,0,1 | 18.43 | 24.31 | 11.76 |
| 2706 | 0,2,0,1,0,2,0,1 | 20.39 | 22.35 | 12.16 |
| 2720 | 2,0,2,1,0,2,0,1 | 22.35 | 21.18 | 11.37 |

APPENDIX I

| | | | | |
|---|---|---|---|---|
| 2721 | 0,1,2,1,0,2,0,1 | 25.88 | 20.39 | 11.37 |
| 2738 | 2,0,1,2,0,2,0,1 | 13.73 | 22.35 | 20.00 |
| 2769 | 0,2,1,0,1,2,0,1 | 25.10 | 23.53 | 7.84 |
| 2777 | 2,1,2,0,1,2,0,1 | 26.67 | 21.57 | 11.76 |
| 2813 | 2,1,0,2,1,2,0,1 | 24.31 | 23.53 | 9.80 |
| 2814 | 0,2,0,2,1,2,0,1 | 26.67 | 20.78 | 10.98 |
| 2819 | 2,0,1,2,1,2,0,1 | 18.43 | 21.18 | 17.25 |
| 3741 | 0,2,1,0,1,0,2,1 | 10.20 | 24.31 | 16.86 |
| 3746 | 2,0,2,0,1,0,2,1 | 22.75 | 22.35 | 12.16 |
| 3747 | 0,1,2,0,1,0,2,1 | 23.53 | 21.96 | 9.41 |
| 3791 | 2,0,1,2,1,0,2,1 | 24.71 | 22.35 | 9.41 |
| 3795 | 0,2,1,2,1,0,2,1 | 18.43 | 23.53 | 14.51 |
| 3818 | 2,0,1,0,2,0,2,1 | 18.43 | 26.27 | 10.59 |
| 3822 | 0,2,1,0,2,0,2,1 | 15.29 | 23.53 | 12.94 |
| 3839 | 2,1,0,1,2,0,2,1 | 23.92 | 23.53 | 10.98 |
| 3840 | 0,2,0,1,2,0,2,1 | 24.31 | 23.14 | 8.63 |
| 3854 | 2,0,2,1,2,0,2,1 | 17.65 | 22.35 | 10.98 |
| 3855 | 0,1,2,1,2,0,2,1 | 18.43 | 26.27 | 10.20 |
| 3921 | 0,2,0,1,0,1,2,1 | 18.43 | 27.84 | 11.76 |
| 3935 | 2,0,2,1,0,1,2,1 | 22.75 | 22.35 | 10.59 |
| 3936 | 0,1,2,1,0,1,2,1 | 20.39 | 21.96 | 11.76 |
| 3945 | 0,1,0,2,0,1,2,1 | 23.92 | 23.92 | 10.20 |
| 3957 | 0,2,1,2,0,1,2,1 | 28.63 | 22.75 | 8.63 |
| 4071 | 0,1,2,0,2,1,2,1 | 21.96 | 23.53 | 10.20 |
| 4663 | 1,0,2,1,0,1,0,2 | 20.78 | 19.61 | 12.16 |
| 4674 | 0,1,0,2,0,1,0,2 | 20.39 | 22.35 | 12.16 |
| 4678 | 1,2,0,2,0,1,0,2 | 25.88 | 20.78 | 13.33 |
| 4681 | 1,0,1,2,0,1,0,2 | 18.04 | 21.57 | 12.55 |
| 4686 | 0,2,1,2,0,1,0,2 | 25.88 | 21.57 | 11.76 |
| 4789 | 1,0,1,0,2,1,0,2 | 10.20 | 24.31 | 16.47 |
| 4795 | 1,2,1,0,2,1,0,2 | 18.43 | 21.96 | 14.90 |
| 4798 | 1,0,2,0,2,1,0,2 | 15.29 | 23.53 | 13.33 |
| 4800 | 0,1,2,0,2,1,0,2 | 25.10 | 23.14 | 7.45 |
| 4809 | 0,1,0,1,2,1,0,2 | 30.20 | 18.04 | 13.73 |
| 4894 | 1,2,0,1,0,2,0,2 | 21.57 | 21.96 | 13.33 |
| 4906 | 1,0,2,1,0,2,0,2 | 10.20 | 25.10 | 17.25 |
| 4957 | 1,2,1,0,1,2,0,2 | 18.43 | 25.49 | 9.80 |
| 4960 | 1,0,2,0,1,2,0,2 | 21.18 | 20.00 | 12.16 |
| 4962 | 0,1,2,0,1,2,0,2 | 15.29 | 24.31 | 12.55 |
| 4998 | 0,1,0,2,1,2,0,2 | 18.43 | 26.67 | 10.20 |
| 5002 | 1,2,0,2,1,2,0,2 | 17.65 | 22.75 | 12.55 |
| 5005 | 1,0,1,2,1,2,0,2 | 18.43 | 23.92 | 12.55 |
| 5203 | 1,0,2,0,1,0,1,2 | 18.43 | 23.92 | 11.37 |
| 5205 | 0,1,2,0,1,0,1,2 | 15.29 | 22.75 | 13.73 |
| 5241 | 0,1,0,2,1,0,1,2 | 23.53 | 23.14 | 10.20 |
| 5245 | 1,2,0,2,1,0,1,2 | 18.43 | 25.10 | 10.98 |
| 5248 | 1,0,1,2,1,0,1,2 | 17.65 | 22.35 | 10.98 |
| 5253 | 0,2,1,2,1,0,1,2 | 18.43 | 23.92 | 12.16 |
| 5275 | 1,0,1,0,2,0,1,2 | 18.43 | 24.31 | 10.20 |
| 5280 | 0,2,1,0,2,0,1,2 | 21.96 | 22.35 | 9.41 |

APPENDIX I

| | | | | |
|---|---|---|---|---|
| 5298 | 0,2,0,1,2,0,1,2 | 15.29 | 27.84 | 13.73 |
| 5299 | 1,2,0,1,2,0,1,2 | 22.35 | 24.31 | 12.16 |
| 5311 | 1,0,2,1,2,0,1,2 | 20.00 | 25.10 | 6.67 |
| 5313 | 0,1,2,1,2,0,1,2 | 23.53 | 23.53 | 9.41 |
| 5622 | 0,2,0,1,0,2,1,2 | 18.43 | 24.31 | 11.37 |
| 5635 | 1,0,2,1,0,2,1,2 | 18.43 | 20.00 | 16.47 |
| 5637 | 0,1,2,1,0,2,1,2 | 21.18 | 20.00 | 13.73 |
| 5646 | 0,1,0,2,0,2,1,2 | 22.75 | 22.75 | 10.98 |
| 5653 | 1,0,1,2,0,2,1,2 | 18.43 | 23.92 | 12.16 |
| 5658 | 0,2,1,2,0,2,1,2 | 20.39 | 21.96 | 11.76 |
| 5685 | 0,2,1,0,1,2,1,2 | 18.43 | 24.31 | 10.98 |
| 5691 | 0,1,2,0,1,2,1,2 | 10.20 | 24.31 | 14.51 |
| 32 | | 20.85 | 23.17 | 11.59 |
| | | 33 | | |

APPENDIX I

The invention claimed is:

1. A barcode for representing encoded data and being capable of being scanned by a barcode reader, said barcode comprising:
   a plurality of columns, each column being formed from a plurality of cells, and each column representing a raw value,
   each said cell in each said column having a color associated therewith, said color being either from a first set of colors of from a second set of colors, each said color within each said color set having a value assigned thereto,
   wherein in each said column, said cells are from either the first set of colors or said second set of colors,
   wherein adjacent columns are not formed from the same set of colors, and
   wherein continuous cells in each said cell column are not formed from said same color within said set of colors.

2. A barcode as defined in claim 1, wherein a raw value of each said column is computed by:

$$\sum_{n}^{n(t)} 3^k \text{CellValue}(k)$$

wherein n is the first position of the cells in the column, n(t) is the total number of cells in the cell column, k is position of the cell within the column and CellValue(k) is the value of a cell placed in position k.

3. A barcode as defined in claim 2, wherein said raw value of each said column is correlated to a data value, a Reed-Soloman value or a miscellaneous value, said data value, said Reed-Soloman value or said miscellaneous value representing said data encoded within said barcode.

4. A barcode as defined in claim 1, wherein said first set of colors are red, green and blue.

5. A barcode as defined in claim 4, wherein the color red has a value of 0, the color green has a value of 1, and the color blue has a value of 2.

6. A barcode as defined in claim 1, wherein said first set of colors are additive colors.

7. A barcode as defined in claim 1, wherein said first set of colors are cyan, magenta and yellow.

8. A barcode as defined in claim 7, wherein the color cyan has a value of 0, the color magenta has a value of 1, and the color yellow has a value of 2.

9. A barcode as defined in claim 1, wherein said first set of colors are subtractive colors.

10. A barcode as defined in claim 1, wherein said first set of colors are red, green and blue and said first set of colors are cyan, magenta and yellow.

11. A barcode as defined in claim 10, wherein the color red has a value of 0, the color green has a value of 1, and the color blue has a value of 2 and the color cyan has a value of 0, the color magenta has a value of 1, and the color yellow has a value of 2.

12. A barcode as defined in claim 1, wherein each said column is one cell wide by eight cells long.

13. A barcode as defined in claim 1, wherein ninety-four columns are provided.

14. A barcode as defined in claim 13, wherein the first forty-seven columns represent data values and the second forty-seven columns represent Reed-Solomon check-digit values.

15. A barcode as defined in claim 14, further including twelve columns for representing information of the structure of the barcode.

16. A barcode as defined in claim 1, wherein said columns which represent data have first and last columns, and further including finder columns adjacent to said first and last columns.

17. A barcode as defined in claim 16, wherein said finder columns are black in color.

18. A barcode as defined in claim 1, wherein said first column in said barcode being formed from one of said first or second sets of active colors and said last column in said barcode being formed from the other of said first or second sets of active colors.

19. A method of reading a barcode formed in accordance with claim 1, wherein each said column has a top cell and a bottom cell, said method comprising the steps of:
   (a) providing a barcode reader;
   (b) locating the top cell of the column to be decoded using said barcode reader;
   (c) scanning from said top cell toward the bottom of said column to be decoded until all of said cells in said column to be decoded have been traversed;
   (d) storing the color of each cell in said column to be decoded in an array;
   (e) repeating steps (a) through (d) for each column to be decoded until said each column has been decoded;
   (f) converting each array into a raw value; and
   (g) correlating said raw value to a data value, a Reed-Soloman value or a miscellaneous value, said data value, said Reed-Soloman value or said miscellaneous value representing said data encoded within said barcode.

20. A method in accordance with claim 19, wherein said barcode has first and last columns and a plurality of columns therebetween, and wherein said columns are decoded in order from first to last.

21. A method in accordance with claim 19, wherein in step (f), said array is converting into said raw value number by using the formula:

$$\sum_{n}^{n(t)} 3^k \text{CellValue}(k)$$

wherein n is the first position of the cells in the column, n(t) is the total number of cells in the cell column, k is position of the cell within the column and CellValue(k) is the value of a cell placed in position k.

22. A method in accordance with claim 19, wherein step (c) is performed by:
   (c1) determining the color of said top cell;
   (c2) scanning downwardly from said top cell to the cell proximate thereto using a predetermined scan angle until the cell proximate to said top cell is scanned;
   (c3) determining the color of the next-scanned cell;
   (c4) determining whether the color of the next-scanned cell is in the same set of colors as said top cell,
   (c5) wherein if the color of the next-scanned cell is not in the same set of colors as said top cell, changing the scan angle and scanning the another cell proximate to said top cell and determining whether the color of this last-scanned cell is in the same set of colors as the top cell;
   (c6) wherein if the color of the next-scanned cell is in the same set of colors as said top cell, the last-scanned cell is in the column and thereafter scanning downwardly therefrom using said predetermined scan angle to the cell proximate thereto;

(c7) scanning and determining the color of the last-scanned cell;

(c8) determining whether the color of the last-scanned cell is in the same set of colors as said previously-scanned cell, (c9) wherein if the color of the last-scanned cell is not in the same set of colors as said previously-scanned cell, changing the scan angle and scanning another cell proximate to said previously-scanned cell and determining whether the color of this last-scanned cell is in the same set of colors as the previously-scanned cell;

(c10) wherein if the color of the last-scanned cell is in the same set of colors as said previously-scanned cell, said last-scanned cell is the next cell in said column and thereafter, repeating steps (c6)–(c9) until the end of the column being scanned is reached.

23. A method in accordance with claim 19, wherein said barcode further includes a vertical finder pattern adjacent to said first column and a horizontal finder pattern said top cell of each said column, and wherein the top cell of the first column is located by using said barcode reader to locate said vertical finder pattern and said horizontal finder pattern; scanning said barcode to find the top right, bottom right and bottom left corners of said barcode to define the size of said barcode, approximating the position of said top cell of said first column using the size of said barcode.

24. A method in accordance with claim 23, wherein a center point of said top cell of said first column is approximated using said approximate size and shape of said top cell of said first column.

25. A method in accordance with claim 19, wherein if the barcode is damaged and said steps (a) through (g) cannot decode the entire length of one of said columns, the values obtained using steps (a) through (g) are saved in said array and the following steps are carried out to decode each column which have not been decoded by steps (a) through (g):

(h) locating the bottom cell of said column which has not been decoded using said barcode reader;

(i) scanning toward the top of said column which has not been decoded until all of said cells in said column which has not been decoded have been traversed and decoded;

(j) storing the color of each cell in said column which has not been decoded in said array; and (k) converting said array into a number which represents the data encoded within said barcode.

26. A method in accordance with claim 25, wherein step (i) is performed by:

(i1) determining the color of said bottom cell;

(i2) scanning upwardly from said bottom cell to the cell proximate thereto using a predetermined scan angle until the cell proximate to said bottom cell is scanned;

(i3) determining the color of the next-scanned cell;

(i4) determining whether the color of the next-scanned cell is in the same set of colors as said bottom cell, (i5) wherein if the color of the next-scanned cell is not in the same set of colors as said bottom cell, changing the scan angle and scanning the another cell proximate to said bottom cell and determining whether the color of this last-scanned cell is in the same set of colors as the bottom cell;

(i6) wherein if the color of the next-scanned cell is in the same set of colors as said bottom cell, said next-scanned cell is in the column being scanned and thereafter scanning upwardly therefrom using said predetermined scan angle to the cell proximate thereto;

(i7) scanning and determining the color of the last-scanned cell;

(i8) determining whether the color of the last-scanned cell is in the same set of colors as said previously-scanned cell, (i9) wherein if the color of the last-scanned cell is not in the same set of colors as said previously-scanned cell, changing the scan angle and scanning another cell proximate to said previously-scanned cell and determining whether the color of this last-scanned cell is in the same set of colors as the previously-scanned cell;

(i10) wherein if the color of the last-scanned cell is in the same set of colors as said previously-scanned cell, said last-scanned cell is the next cell in said column and thereafter, repeating steps (i7)–(i9) until the end of the column being scanned is reached.

27. A barcode as defined in claim 1, wherein each said column has top and bottom cells, said top and bottom cells being of different colors within said set of colors from which said cells in said column are formed.

28. A barcode as defined in claim 27, wherein a raw value of each said column is computed by:

$$\sum_{n}^{n(t)} 3^k \text{CellValue}(k)$$

wherein n is the first position of the cells in the column, n(t) is the total number of cells in the cell column, k is position of the cell within the column and CellValue(k) is the value of a cell placed in position k.

29. A barcode as defined in claim 28, wherein said raw value of each said column is correlated to a data value, a Reed-Soloman value or a miscellaneous value, said data value, said Reed-Soloman value or said miscellaneous value representing said data encoded within said barcode.

30. A method of reading a barcode formed in accordance with claim 27, wherein each said column has a top cell and a bottom cell, said method comprising the steps of:

(a) providing a barcode reader;

(b) locating the top cell of the column to be decoded using said barcode reader;

(c) scanning from said top cell toward the bottom of said column to be decoded until all of said cells in said column to be decoded have been traversed;

(d) storing the color of each cell in said column to be decoded in an array;

(e) repeating steps (a) through (d) for each column to be decoded until said each column has been decoded;

(f) converting each array into a raw value; and (g) correlating said raw value to a data value, a Reed-Soloman value or a miscellaneous value, said data value, said Reed-Soloman value or said miscellaneous value representing said data encoded within said barcode.

31. A method in accordance with claim 30, wherein said barcode has first and last columns and a plurality of columns therebetween, and wherein said columns are decoded in order from first to last.

32. A method in accordance with claim 30, wherein in step (f), said array is converting into said raw value number by using the formula:

$$\sum_{n}^{n(t)} 3^k \text{CellValue}(k)$$

wherein n is the first position of the cells in the column, n(t) is the total number of cells in the cell column, k is position of the cell within the column and CellValue(k) is the value of a cell placed in position k.

33. A method in accordance with claim 30, wherein step (c) is performed by:
   (c1) determining the color of said top cell;
   (c2) scanning downwardly from said top cell to the cell proximate thereto using a predetermined scan angle until the cell proximate to said top cell is scanned;
   (c3) determining the color of the next-scanned cell;
   (c4) determining whether the color of the next-scanned cell is in the same set of colors as said top cell, (c5) wherein if the color of the next-scanned cell is not in the same set of colors as said top cell, changing the scan angle and scanning the another cell proximate to said top cell and determining whether the color of this last-scanned cell is in the same set of colors as the top cell;
   (c6) wherein if the color of the next-scanned cell is in the same set of colors as said top cell, the last-scanned cell is in the column and thereafter scanning downwardly therefrom using said predetermined scan angle to the cell proximate thereto;
   (c7) scanning and determining the color of the last-scanned cell;
   (c8) determining whether the color of the last-scanned cell is in the same set of colors as said previously-scanned cell,
   (c9) wherein if the color of the last-scanned cell is not in the same set of colors as said previously-scanned cell, changing the scan angle and scanning another cell proximate to said previously-scanned cell and determining whether the color of this last-scanned cell is in the same set of colors as the previously-scanned cell;
   (c10) wherein if the color of the last-scanned cell is in the same set of colors as said previously-scanned cell, said last-scanned cell is the next cell in said column and thereafter, repeating steps (c6)–(c9) until the end of the column being scanned is reached.

34. A method in accordance with claim 30, wherein said barcode further includes a vertical finder pattern adjacent to said first column and a horizontal finder pattern said top cell of each said column, and wherein the top cell of the first column is located by using said barcode reader to locate said vertical finder pattern and said horizontal finder pattern; scanning said barcode to find the top right, bottom right and bottom left corners of said barcode to define the size of said barcode, approximating the position of said top cell of said first column using the size of said barcode.

35. A method in accordance with claim 34, wherein a center point of said top cell of said first column is approximated using said approximate size and shape of said top cell of said first column.

36. A method in accordance with claim 30, wherein if the barcode is damaged and said steps (a) through (g) cannot decode the entire length of one of said columns, the values obtained using steps (a) through (g) are saved in said array and the following steps are carried out to decode each column which have not been decoded by steps (a) through (g):
   (h) locating the bottom cell of said column which has not been decoded using said barcode reader;
   (i) scanning toward the top of said column which has not been decoded until all of said cells in said column which has not been decoded have been traversed and decoded;
   (j) storing the color of each cell in said column which has not been decoded in said array; and
   (k) converting said array into a number which represents the data encoded within said barcode.

37. A method in accordance with claim 36, wherein step (i) is performed by:
   (i1) determining the color of said bottom cell;
   (i2) scanning upwardly from said bottom cell to the cell proximate thereto using a predetermined scan angle until the cell proximate to said bottom cell is scanned;
   (i3) determining the color of the next-scanned cell;
   (i4) determining whether the color of the next-scanned cell is in the same set of colors as said bottom cell,
   (i5) wherein if the color of the next-scanned cell is not in the same set of colors as said bottom cell, changing the scan angle and scanning the another cell proximate to said bottom cell and determining whether the color of this last-scanned cell is in the same set of colors as the bottom cell;
   (i6) wherein if the color of the next-scanned cell is in the same set of colors as said bottom cell, said next-scanned cell is in the column being scanned and thereafter scanning upwardly therefrom using said predetermined scan angle to the cell proximate thereto;
   (i7) scanning and determining the color of the last-scanned cell;
   (i8) determining whether the color of the last-scanned cell is in the same set of colors as said previously-scanned cell,
   (i9) wherein if the color of the last-scanned cell is not in the same set of colors as said previously-scanned cell, changing the scan angle and scanning another cell proximate to said previously-scanned cell and determining whether the color of this last-scanned cell is in the same set of colors as the previously-scanned cell;
   (i10) wherein if the color of the last-scanned cell is in the same set of colors as said previously-scanned cell, said last-scanned cell is the next cell in said column and thereafter, repeating steps (i7)–(i9) until the end of the column being scanned is reached.

38. A method of encoding data into a barcode which can be read by a barcode reader, said method comprising the steps of:
   (a) forming a numerical table of a valid set, said valid set being formed by forming arrays in accordance with the following:
      (a1) providing a first set of colors;
      (a2) assigning values to each of said colors within said first set;
      (a3) providing a plurality of arrays of said values assigned to said first set, wherein continuous numbers in each said array are not the same;

(a4) providing a second set of colors;

(a5) assigning values to each of said colors within said second set;

(a6) providing a plurality of arrays of said values assigned to said second set, wherein continuous numbers in each said array are not the same;

(b) choosing predetermined ones of said valid set to represent data to be encoded within said barcode;

(c) correlating said predetermined ones of said valid set to the colors which are represented by the values within each valid set;

(c) forming said barcode by placing a plurality of columns adjacent to each other, each said column being formed from one of said valid sets of available color schemes.

39. A method in accordance with claim 38, wherein step (a6) further includes wherein the first number and the last number in each said array are not the same.

40. A method in accordance with claim 38, wherein said valid set is further limited by using a genetic algorithm to obtain an active set and wherein values from said active set are used to form said barcode.

\* \* \* \* \*

UNITED STATES PATENT AND TRADEMARK OFFICE
CERTIFICATE OF CORRECTION

PATENT NO.   : 6,070,805  
DATED        : June 6, 2000  
INVENTOR(S)  : Jeffrey R. Kaufman and Clive Hohberger Page 1 of 1

It is certified that error appears in the above-identified patent and that said Letters Patent is hereby corrected as shown below:

<u>Title page,</u>
Item [75], Inventors: "Clive Hohberger, Gurnee," should be -- Clive Hohberger, Glencoe, --

Signed and Sealed this

Twenty-fifth Day of December, 2001

*Attest:*

*Attesting Officer*

JAMES E. ROGAN  
*Director of the United States Patent and Trademark Office*